United States Patent [19]

Heuttner et al.

[11] 3,725,871
[45] Apr. 3, 1973

[54] MULTI FUNCTION POLLING TECHNIQUE

[75] Inventors: Robert E. Heuttner, Acton; Edward B. Tymann, Natick; Richard Nolin, North Andover, all of Mass.

[73] Assignee: Honeywell Information Systems Inc., Waltham, Mass.

[22] Filed: Feb. 11, 1971

[21] Appl. No.: 114,431

[52] U.S. Cl. ............................................340/172.5
[51] Int. Cl. .................................................G06f 9/18
[58] Field of Search ..................................340/172.5

[56] References Cited

UNITED STATES PATENTS

| | | | |
|---|---|---|---|
| 3,573,741 | 4/1971 | Gavril | 340/172.5 |
| 3,559,184 | 1/1971 | Rawlings | 340/172.5 |
| 3,539,998 | 1/1970 | Belcher | 340/172.5 |
| 3,210,733 | 10/1965 | Terzian | 340/172.5 |
| 3,283,308 | 11/1966 | Klein | 340/172.5 |
| 3,303,476 | 2/1967 | Moyer | 340/172.5 |
| 3,407,387 | 10/1968 | Looschen | 340/172.5 X |
| 3,413,612 | 11/1968 | Brooks | 340/172.5 |

*Primary Examiner*—Paul J. Henon
*Assistant Examiner*—Sydney R. Chirlin
*Attorney*—Ronald T. Reiling et al.

[57] ABSTRACT

Input devices or output devices connected to a common bus of a communications terminal are polled in response to a polling sequence specially coded to request information from either a single input device or number of input devices or status information from either input or output devices. The sequence is transmitted over a communications channel to control apparatus coupled to the bus. The control apparatus stores representations in accordance with the coding of address information items included within the sequence and initiates operations in response to and in correspondence with the stored representations.

41 Claims, 31 Drawing Figures

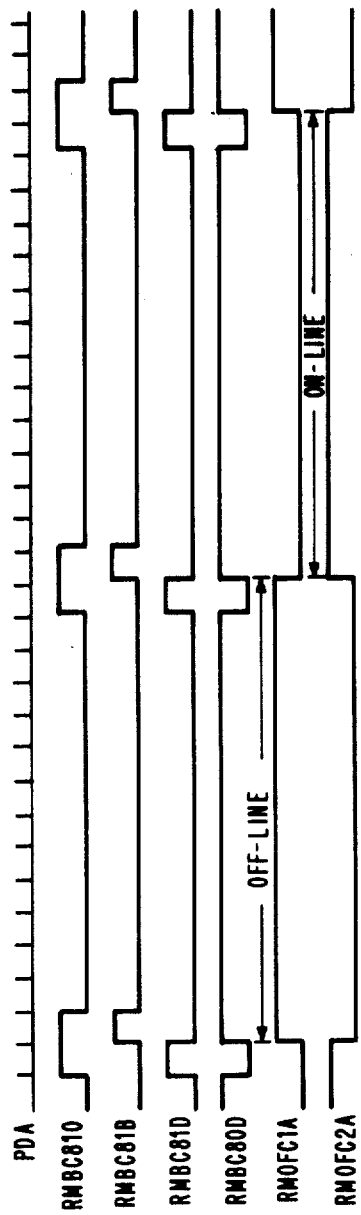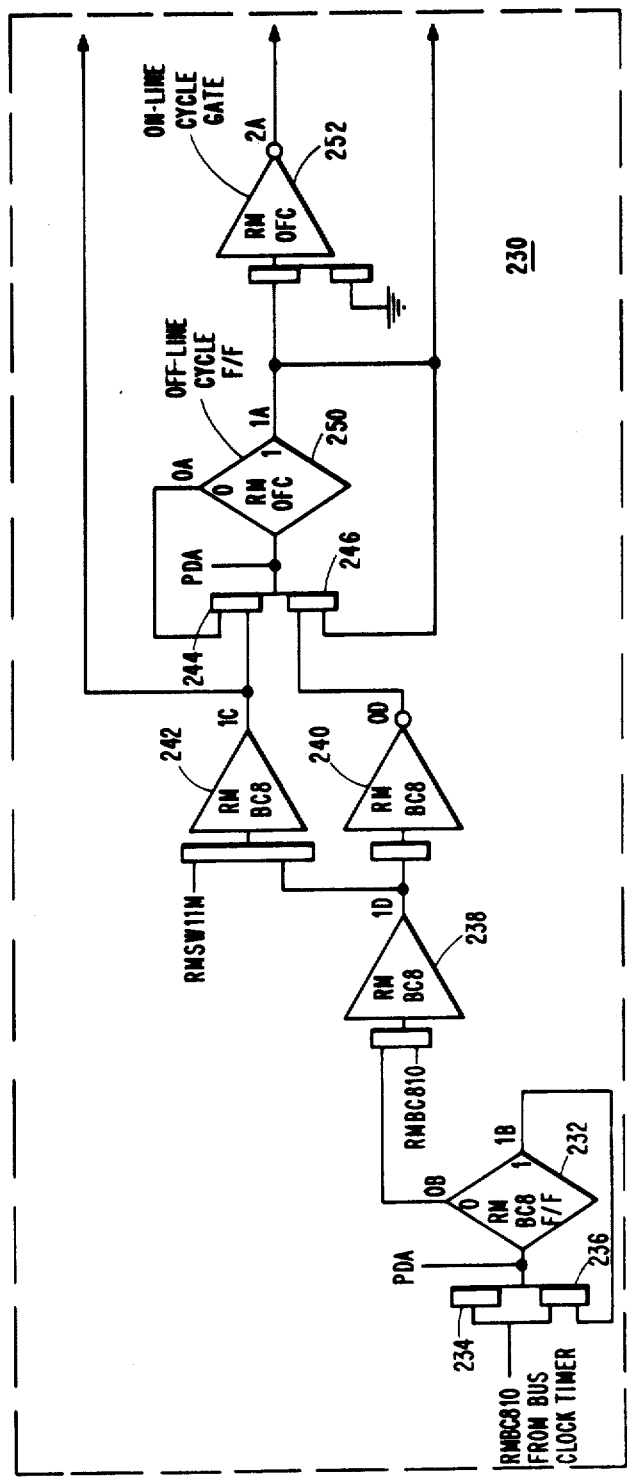
Fig.3a.

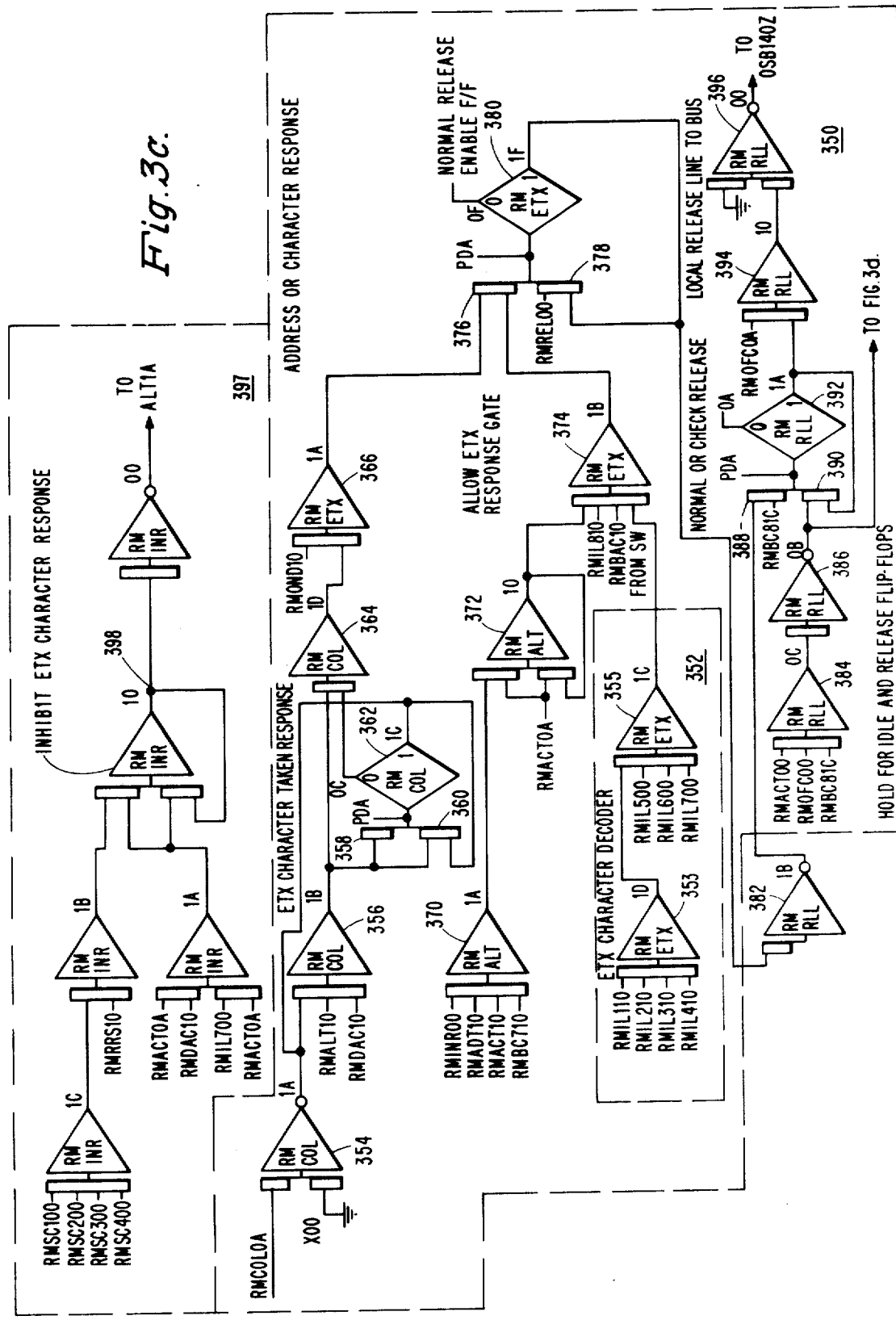

GDCA STATE TRANSITION TABLE

PRESENT STATE columns: Idle State, Ready State, On-Line State, Off-Line State, Audit Trail State

NEXT STATE columns: Idle State, Ready State, On-Line State, Off-Line State, Audit Trail State

VARIABLES columns: Idle State Switch, On-Line State Switch, Audit Trail State Switch, Off-Line State Switch, GDCA Check Condition, Device Data Ready, Execute Pushbutton, Normal Memory Release, Check Release Memory, Selection or Polling Address, Off-Line Cycle, Bus Strobe, Bus Busy Line

OUTPUT DEVICE CONTROL AREA

| Present State | Next State | Variables | Remarks |
|---|---|---|---|
| 1 0 0 0 0 | 0 0 0 1 0 | _ _ _ _ _ _ _ _ _ 1 0 _ 1 _ _ 1 _ _ | OPERATOR ACTION |
| 0 1 0 0 0 | 0 0 0 1 0 | _ _ _ _ _ _ 1 0 _ _ _ 1 _ | " " |
| 0 0 1 0 0 | 0 0 0 1 0 | _ _ _ _ _ _ 1 0 1 _ 1 _ _ 1 | " " |
| 0 0 1 0 0 | 0 0 0 1 0 | _ _ _ _ _ _ 1 0 _ _ _ 1 _ | " " |
| 0 0 0 0 1 | 0 0 0 1 0 | _ _ _ _ _ _ 1 0 _ 1 _ _ 1 | " " |
| 0 1 0 0 0 | 0 0 1 0 0 | _ _ 1 _ _ 0 _ _ _ 1 _ 1 0 | SELECTION ADDRESS |
| 0 0 0 0 1 | 0 0 1 0 0 | _ _ _ _ _ 1 _ 0 _ _ 1 _ 1 0 | " " |
| 1 0 0 0 0 | 0 0 0 0 1 | _ _ _ _ _ _ 1 0 1 _ _ 1 | OPERATOR ACTION |
| 0 1 0 0 0 | 0 0 0 0 1 | _ _ _ _ _ _ 1 0 _ _ _ 1 | " " |
| 0 0 1 0 0 | 0 0 0 0 1 | _ _ _ _ _ _ 1 0 1 _ _ 1 | " " |
| 0 0 1 0 0 | 0 0 0 0 1 | _ _ _ _ _ _ 1 0 _ _ _ 1 | " " |
| 0 0 0 1 0 | 0 0 0 0 1 | _ _ _ _ _ _ 1 0 _ _ _ 1 | " " |
| 1 0 0 0 0 | 0 1 0 0 0 | _ _ _ _ _ _ 1 0 1 _ _ 1 | OPERATOR ACTION / SCANNER RELEASE |
| 0 0 1 0 0 | 0 1 0 0 0 | _ _ _ _ _ _ 1 0 _ _ _ 1 | OPERATOR ACTION |
| 0 0 1 0 0 | 0 1 0 0 0 | _ _ _ _ _ _ 1 0 _ _ _ 1 | " " |
| 0 0 0 1 0 | 0 1 0 0 0 | _ _ _ _ _ _ 1 0 _ _ _ 1 | " " |
| 0 0 0 0 1 | 0 1 0 0 0 | _ _ _ _ _ _ 1 0 _ _ 1 1 | " " |
| 0 1 0 0 0 | 1 0 0 0 0 | 1 _ _ _ _ _ _ _ _ _ _ 1 1 | OPERATOR ACTION |
| 0 1 0 0 0 | 1 0 0 0 0 | _ _ _ _ _ _ _ 1 _ _ _ 1 1 | GDCA LOGIC |
| 0 0 1 0 0 | 1 0 0 0 0 | _ _ _ _ _ _ _ 1 1 _ _ _ 1 | SCANNER RELEASE |
| 0 0 1 0 0 | 1 0 0 0 0 | 1 _ _ _ _ _ _ _ 1 _ _ _ 1 | OPERATOR ACTION |
| 0 0 1 0 0 | 1 0 0 0 0 | 1 _ _ _ _ _ _ _ _ _ _ _ 1 | " " |
| 0 0 0 1 0 | 1 0 0 0 0 | 1 _ _ _ _ _ _ _ _ _ _ _ 1 | " " |
| 0 0 0 0 1 | 1 0 0 0 0 | 1 _ _ _ _ _ _ _ _ _ _ _ 1 | " " |
| 0 0 0 0 1 | 1 0 0 0 0 | _ _ _ _ _ _ _ 1 _ _ _ 1 1 | GDCA LOGIC |

INPUT DEVICE CONTROL AREA

| Present State | Next State | Variables | Remarks |
|---|---|---|---|
| 1 0 0 0 0 | 0 0 0 1 0 | _ _ _ _ _ _ 1 0 _ 1 _ _ 1 1 0 | OPERATOR ACTION |
| 0 1 0 0 0 | 0 0 0 1 0 | _ _ _ _ _ _ 1 0 _ _ _ 1 1 0 | " " |
| 0 0 1 0 0 | 0 0 0 1 0 | _ _ _ _ _ _ 1 0 1 _ 1 _ _ 1 1 0 | " " |
| 0 1 0 0 0 | 0 0 1 0 0 | _ _ 1 _ _ 0 _ _ _ 1 _ 1 0 | POLLING ADDRESS |
| 1 0 0 0 0 | 0 1 0 0 0 | _ _ _ _ _ _ 1 0 1 _ _ 1 | OPERATOR ACTION / SCANNER RELEASE |
| 0 0 1 0 0 | 0 1 0 0 0 | _ _ _ _ _ _ 1 0 _ 1 _ _ 1 | OPERATOR ACTION |
| 0 0 0 1 0 | 0 1 0 0 0 | _ _ _ _ _ _ 1 0 _ _ _ 1 | " " |
| 0 1 0 0 0 | 1 0 0 0 0 | 1 _ _ _ _ _ _ _ _ _ _ 1 1 | OPERATOR ACTION |
| 0 1 0 0 0 | 1 0 0 0 0 | _ _ _ _ _ _ _ 1 _ _ _ 1 1 | GDCA LOGIC |
| 0 0 1 0 0 | 1 0 0 0 0 | 1 _ _ _ _ _ _ _ 1 1 _ _ _ 1 | OPERATOR ACTION |
| 0 0 1 0 0 | 1 0 0 0 0 | _ _ _ _ _ _ _ 1 _ _ 1 _ _ 1 | OPERATOR ACTION REQ. |
| 0 0 0 1 0 | 1 0 0 0 0 | 1 _ _ _ _ _ _ _ _ _ _ 1 | OPERATOR ACTION |

GDCA STATE TRANSITION TABLE

*Fig. 5.*

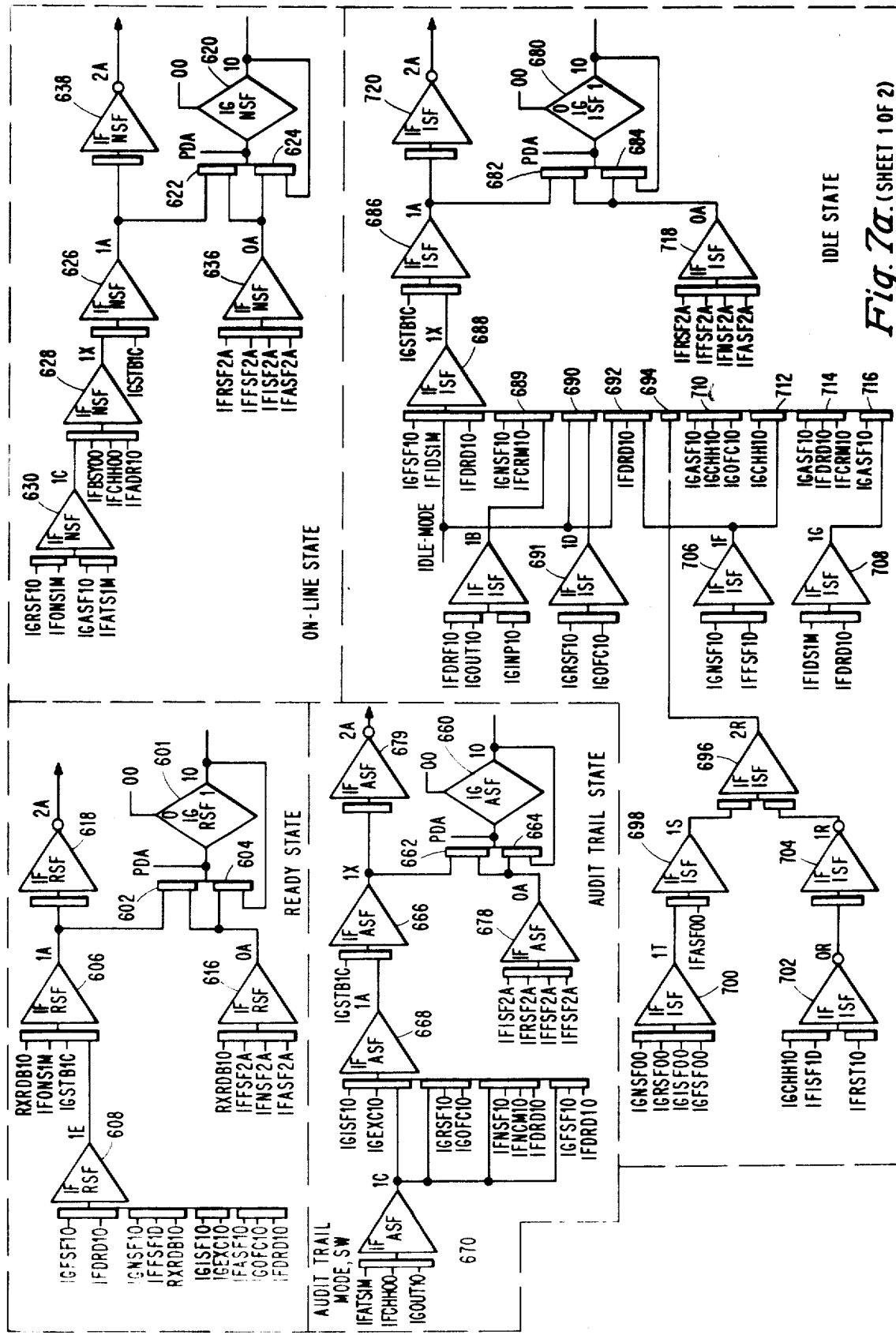
Fig. 7a. (SHEET 1 OF 2)

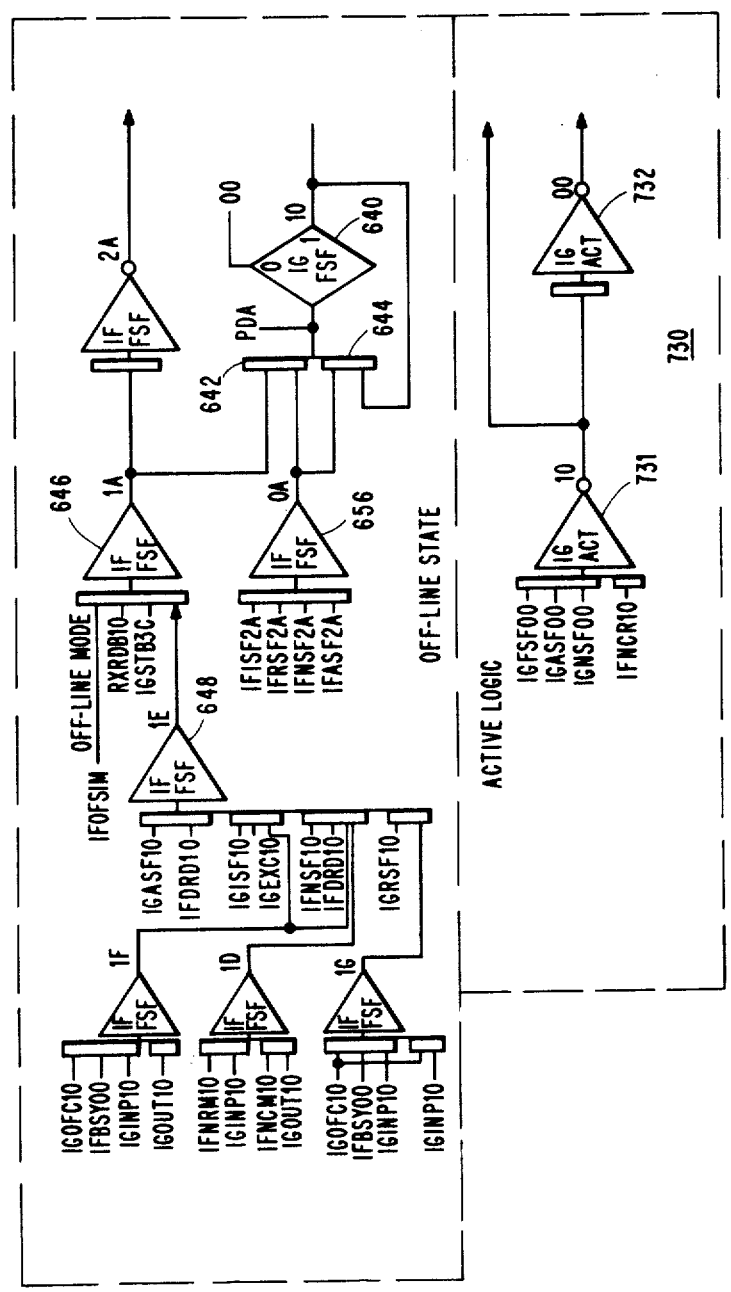
Fig. 7a. (SHEET 2 OF 2)

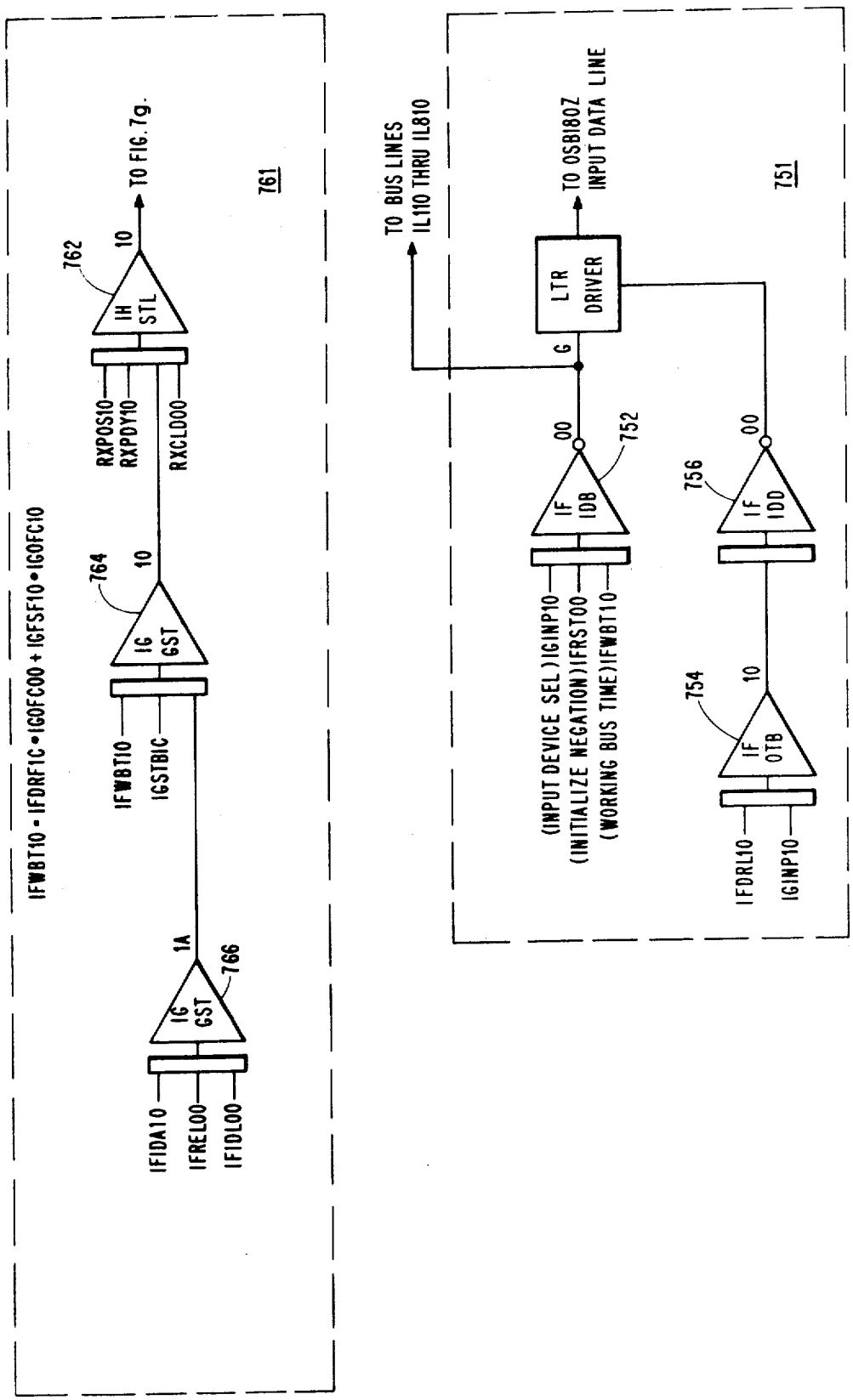
Fig. 7b. (SHEET 1 OF 4)

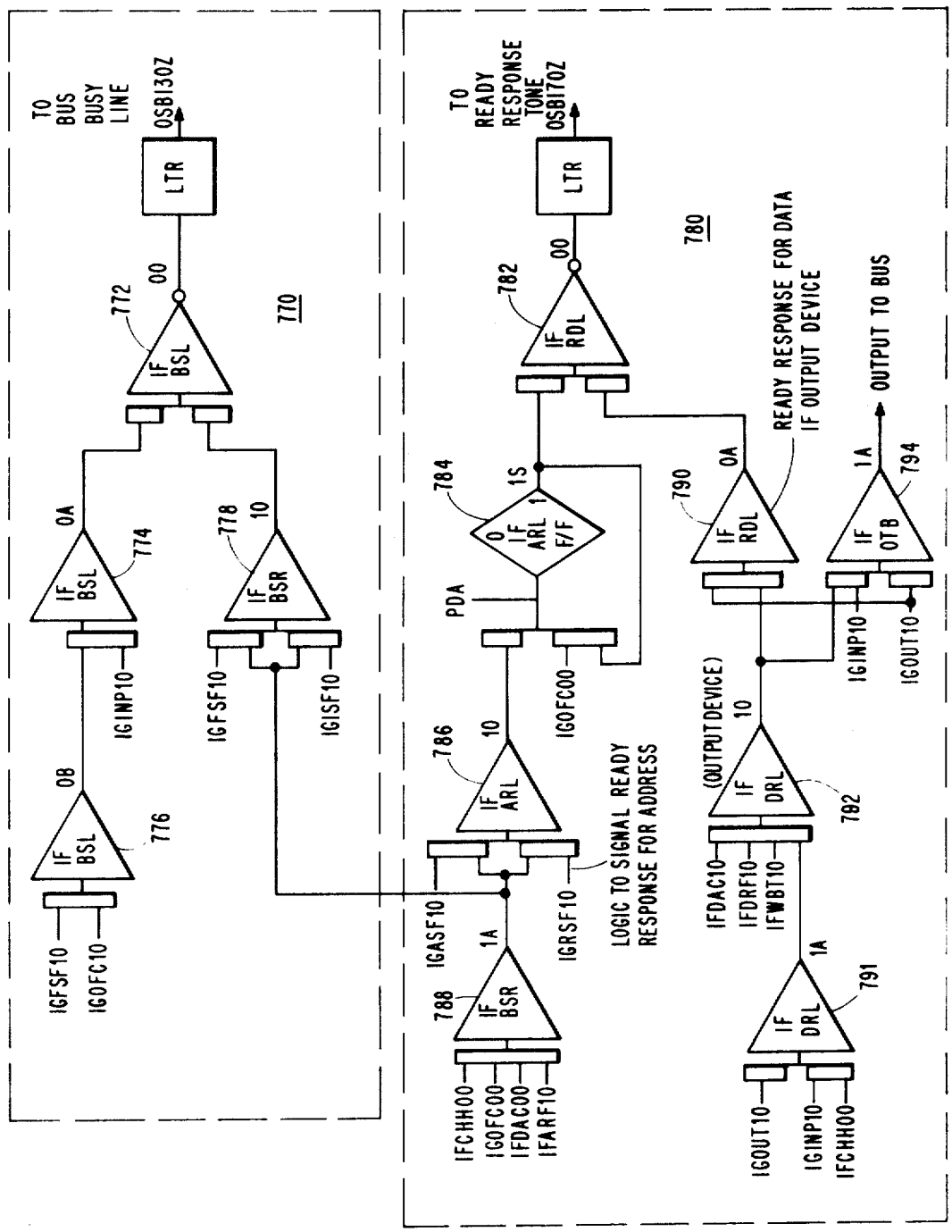
Fig. 7b. (SHEET 2 OF 4)

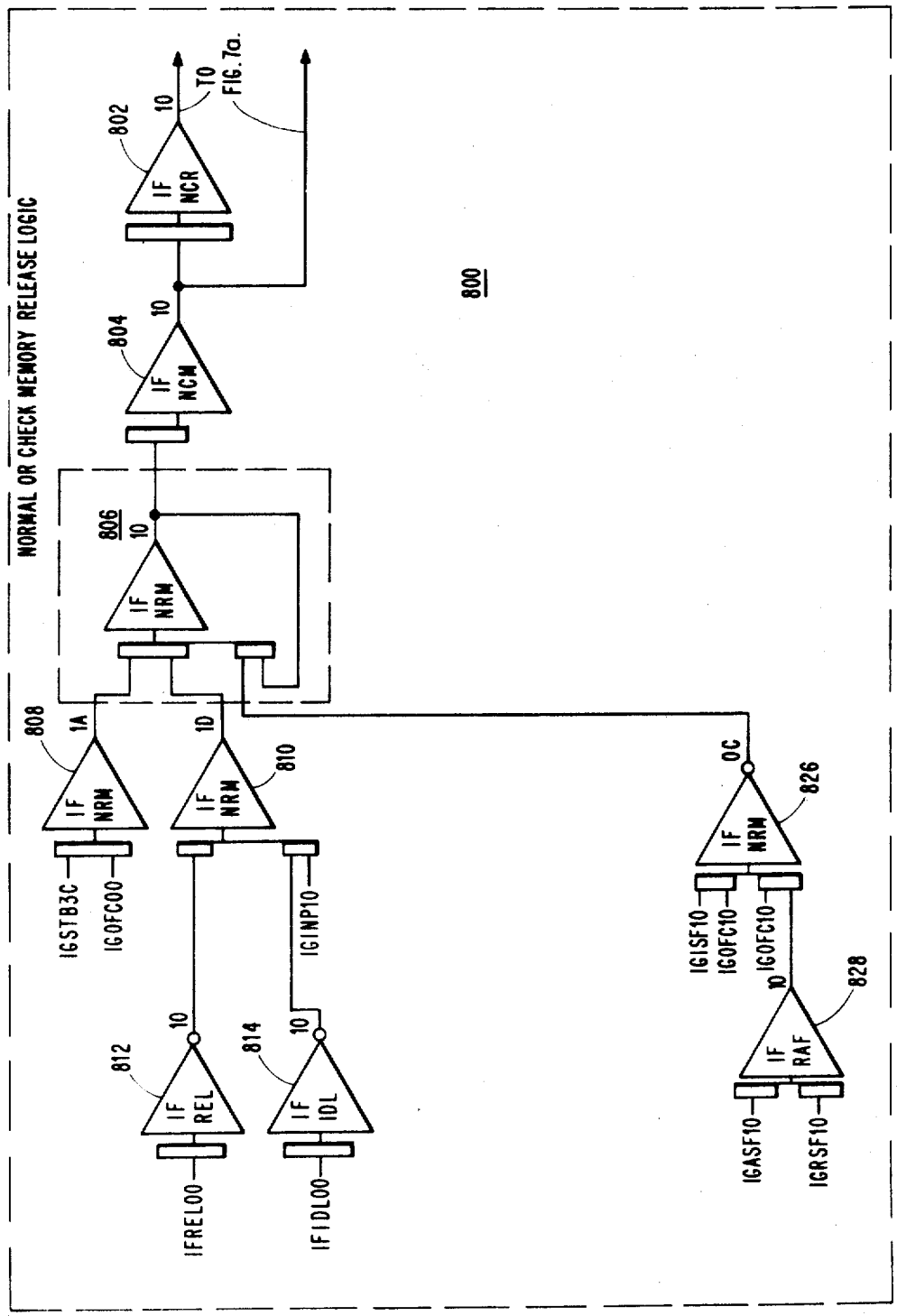
Fig. 7b. (SHEET 3 OF 4)

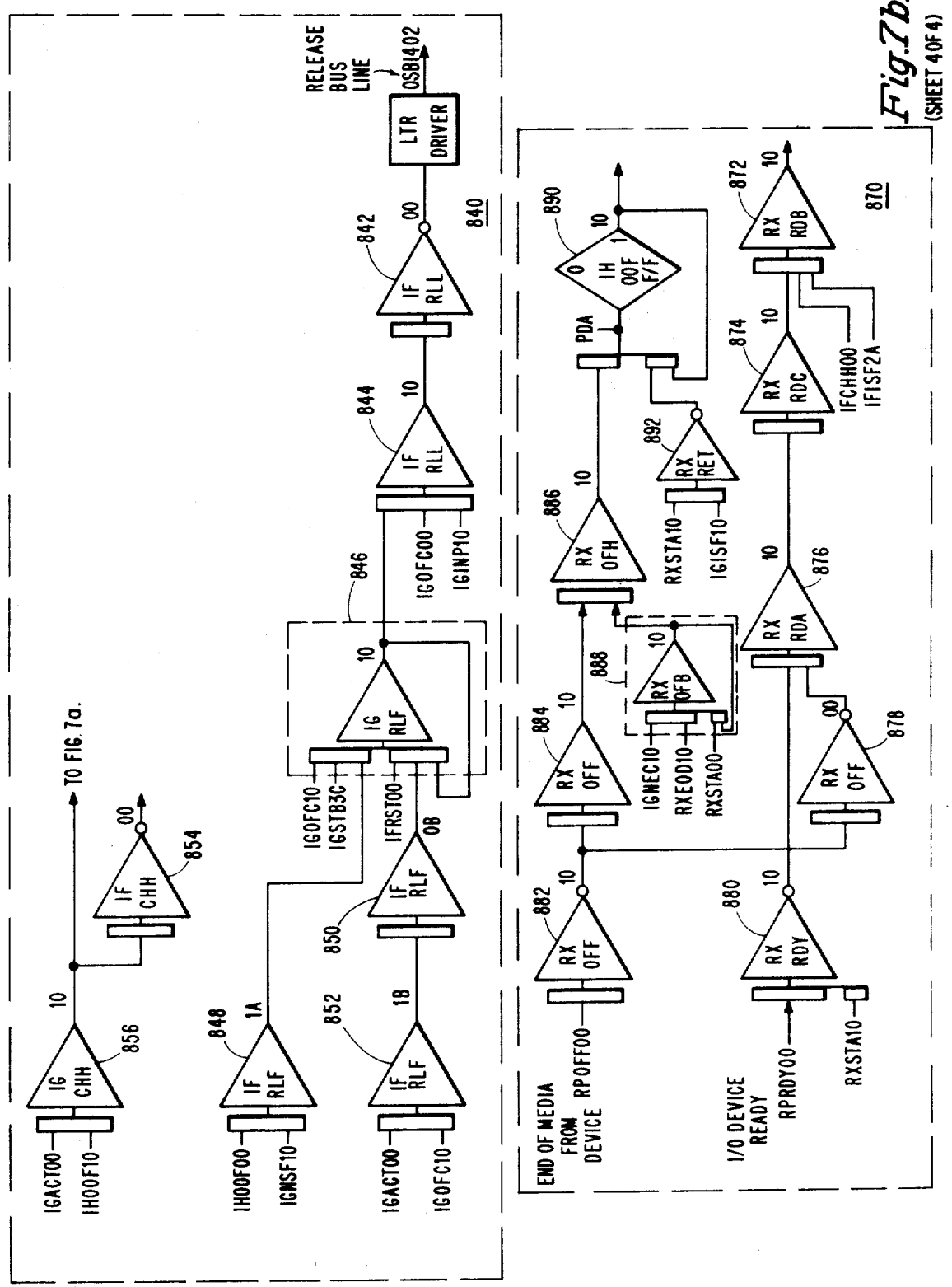
Fig.7b. (SHEET 4 OF 4)

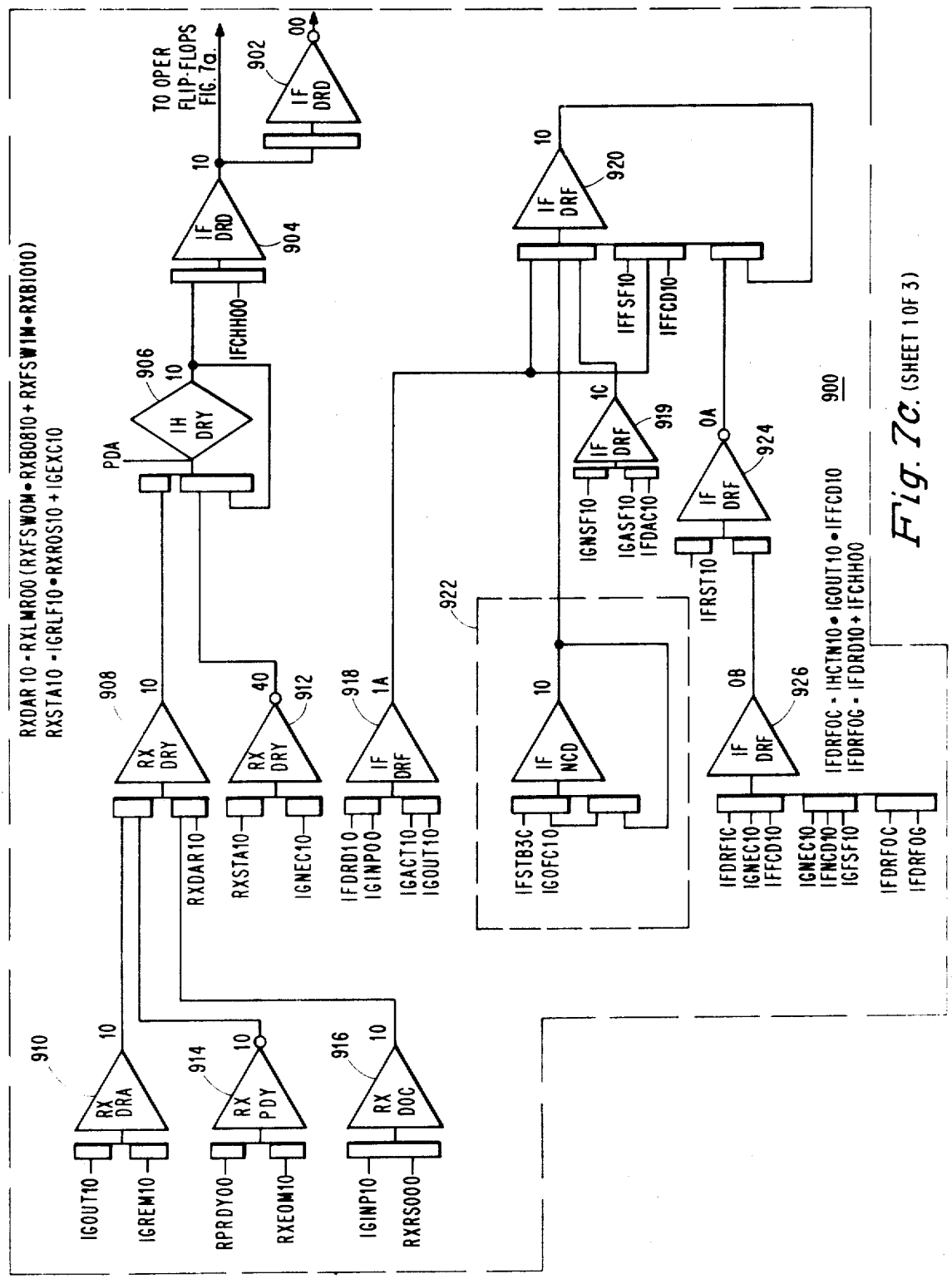
Fig. 7c. (SHEET 1 OF 3)

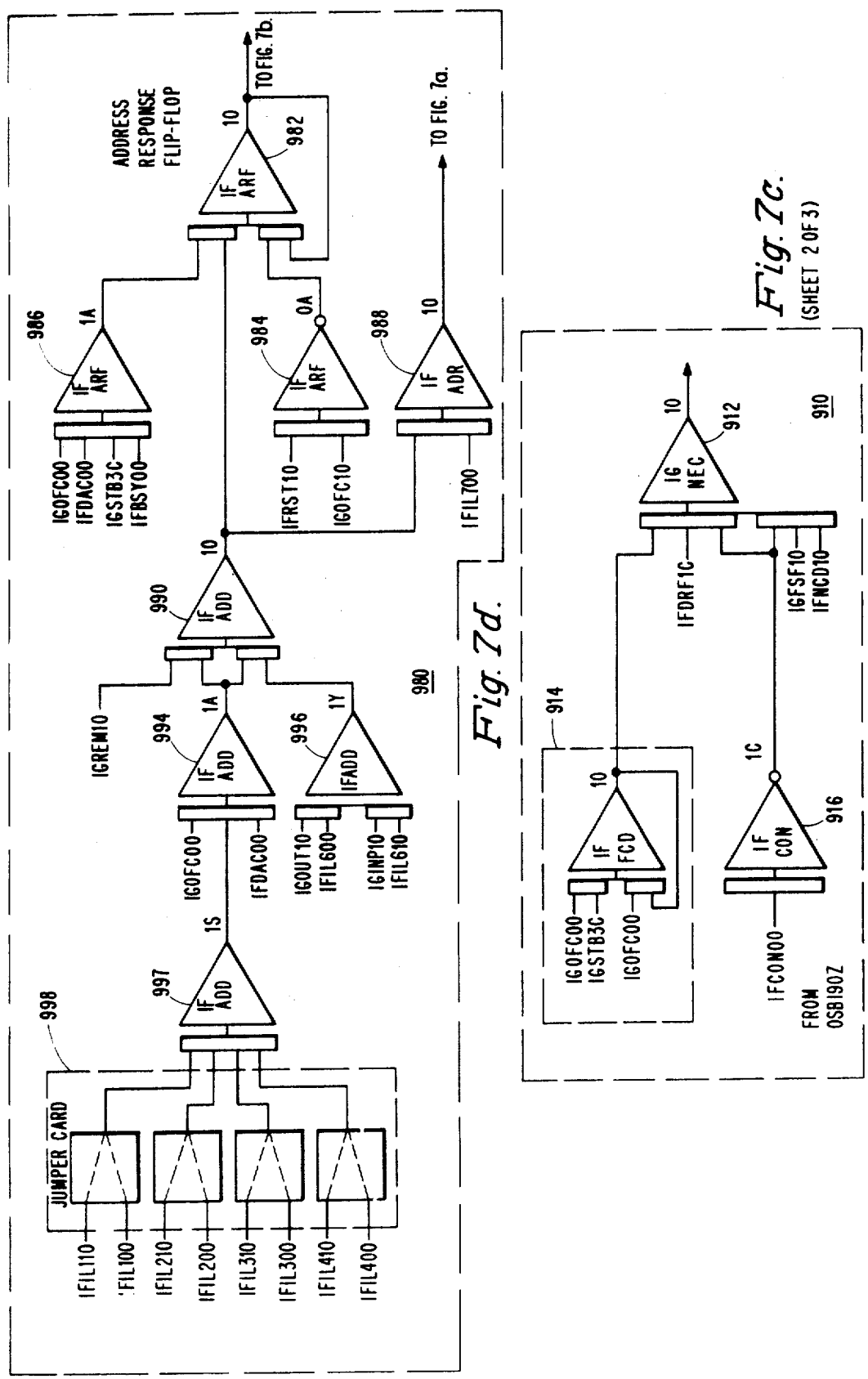

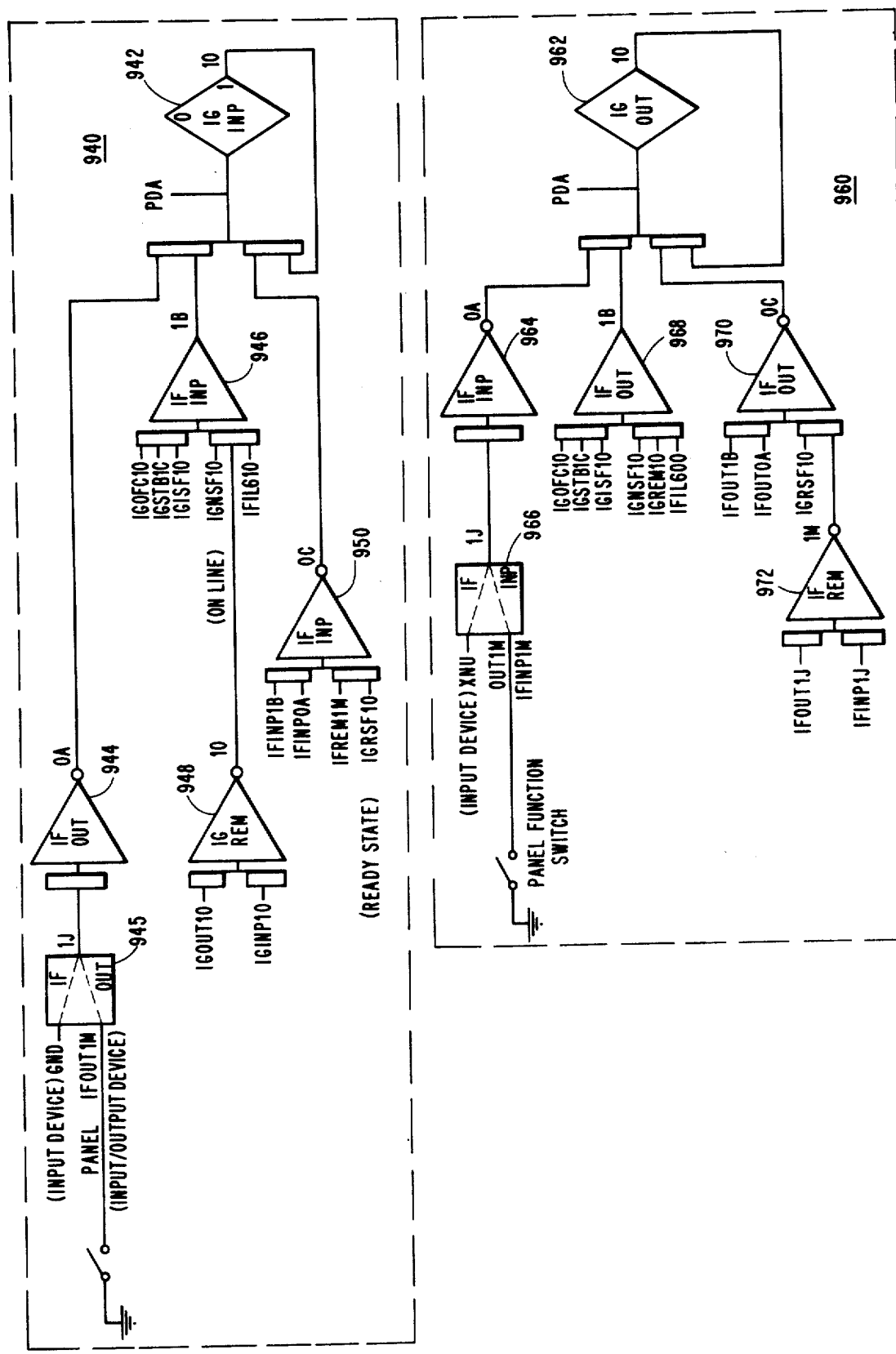
Fig. 7c. (SHEET 3 OF 3)

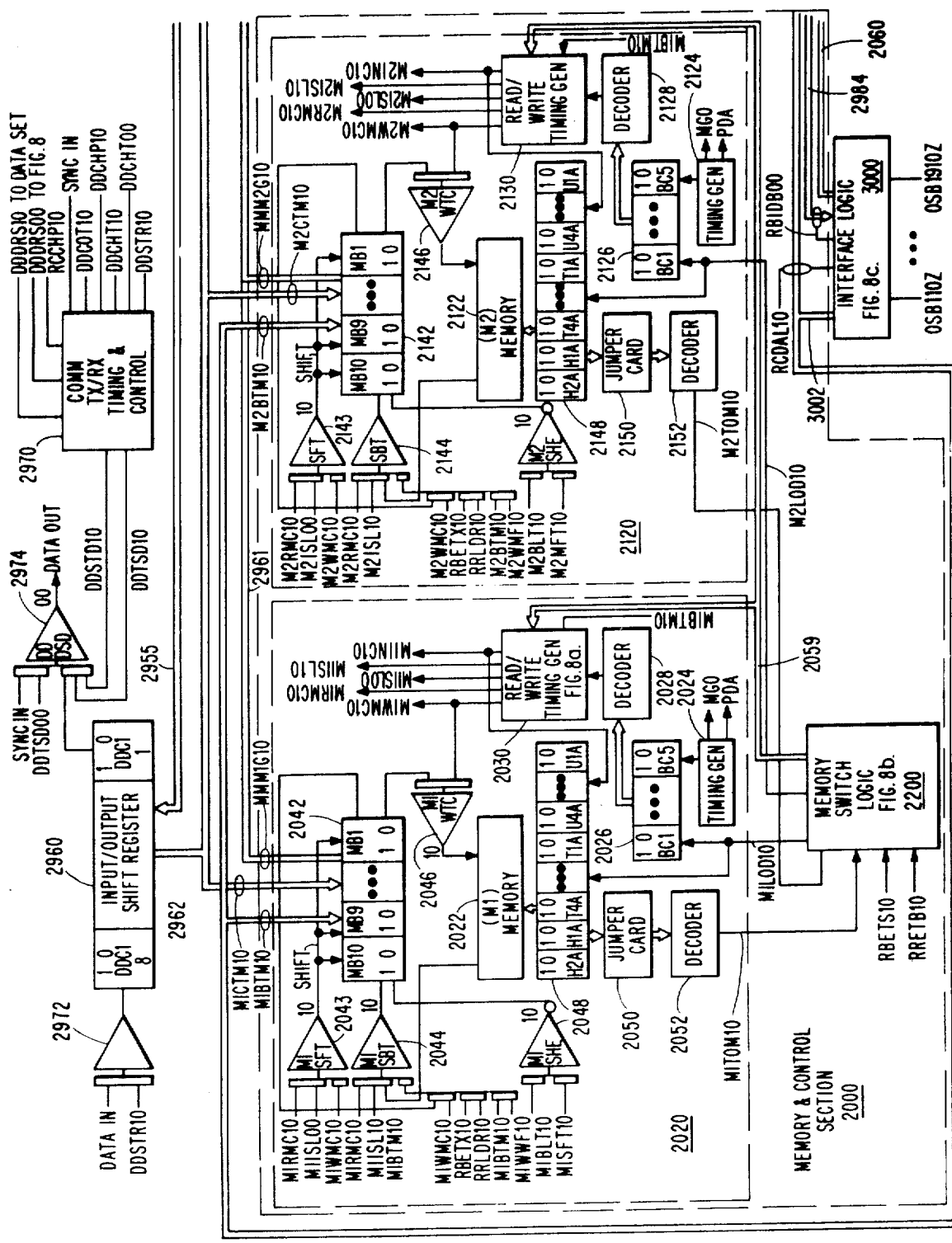
Fig. 8. (SHEET 1 OF 2)

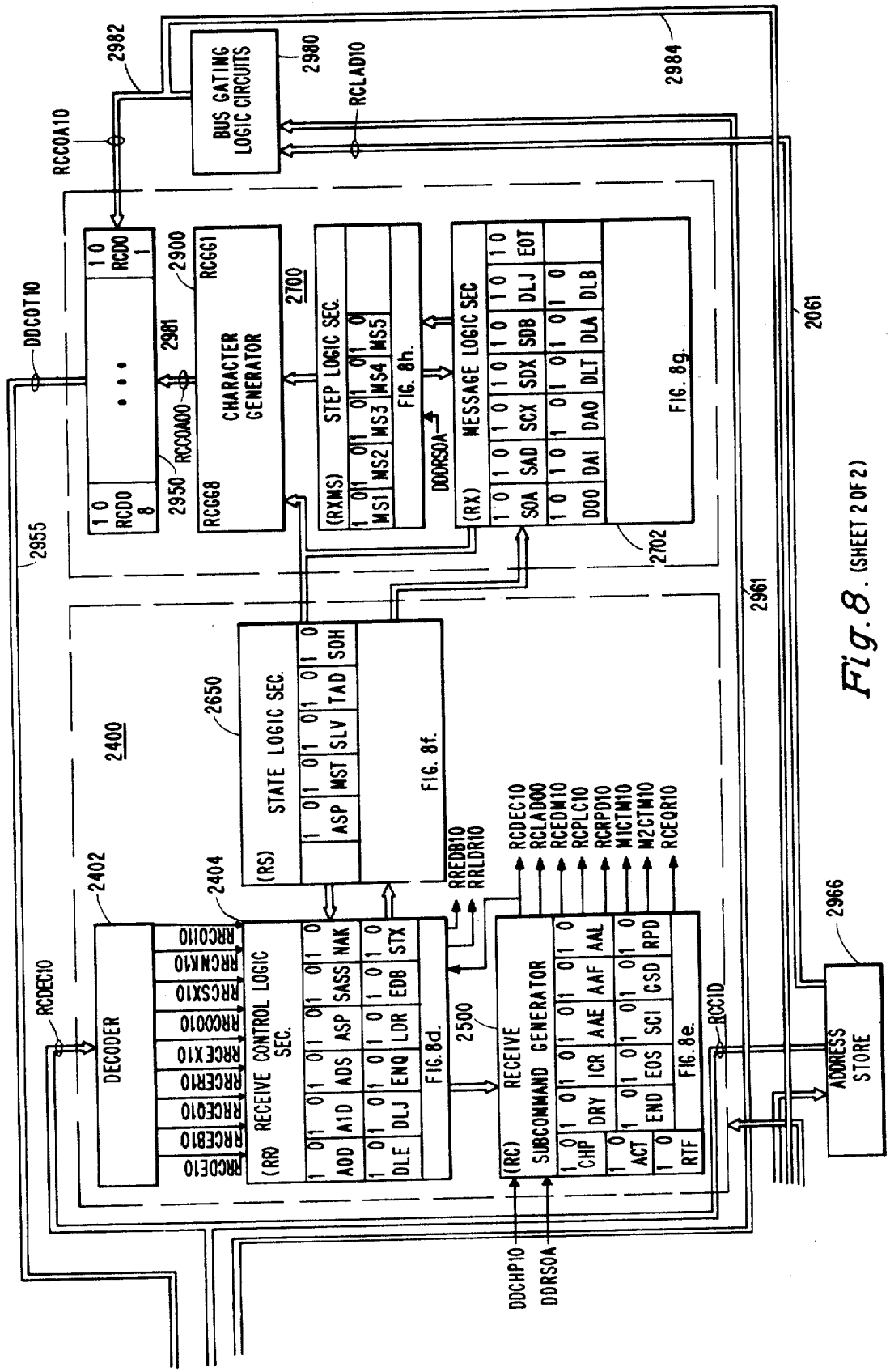
Fig. 8. (SHEET 2 OF 2)

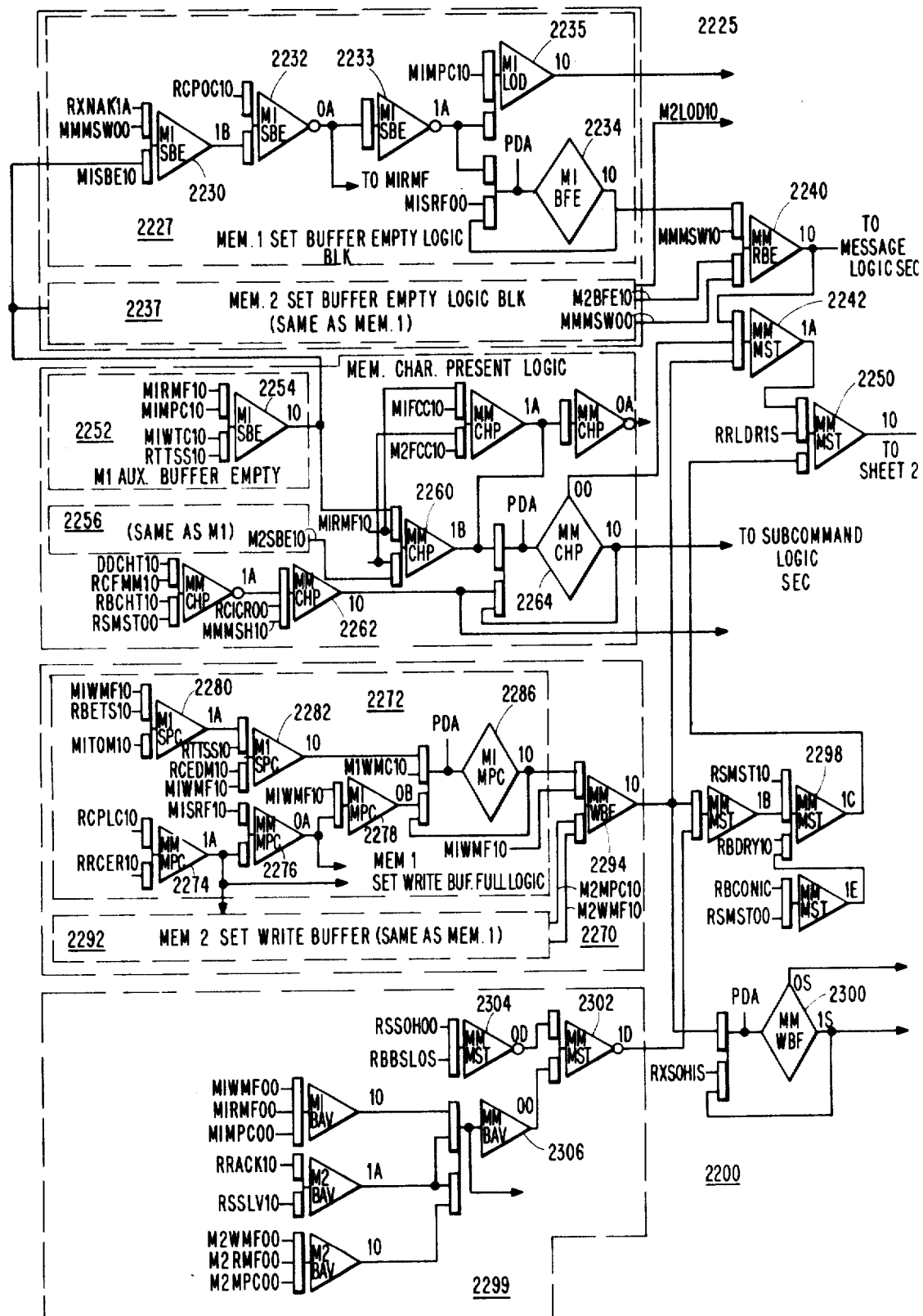
Fig. 8b. (SHEET 1 OF 2)

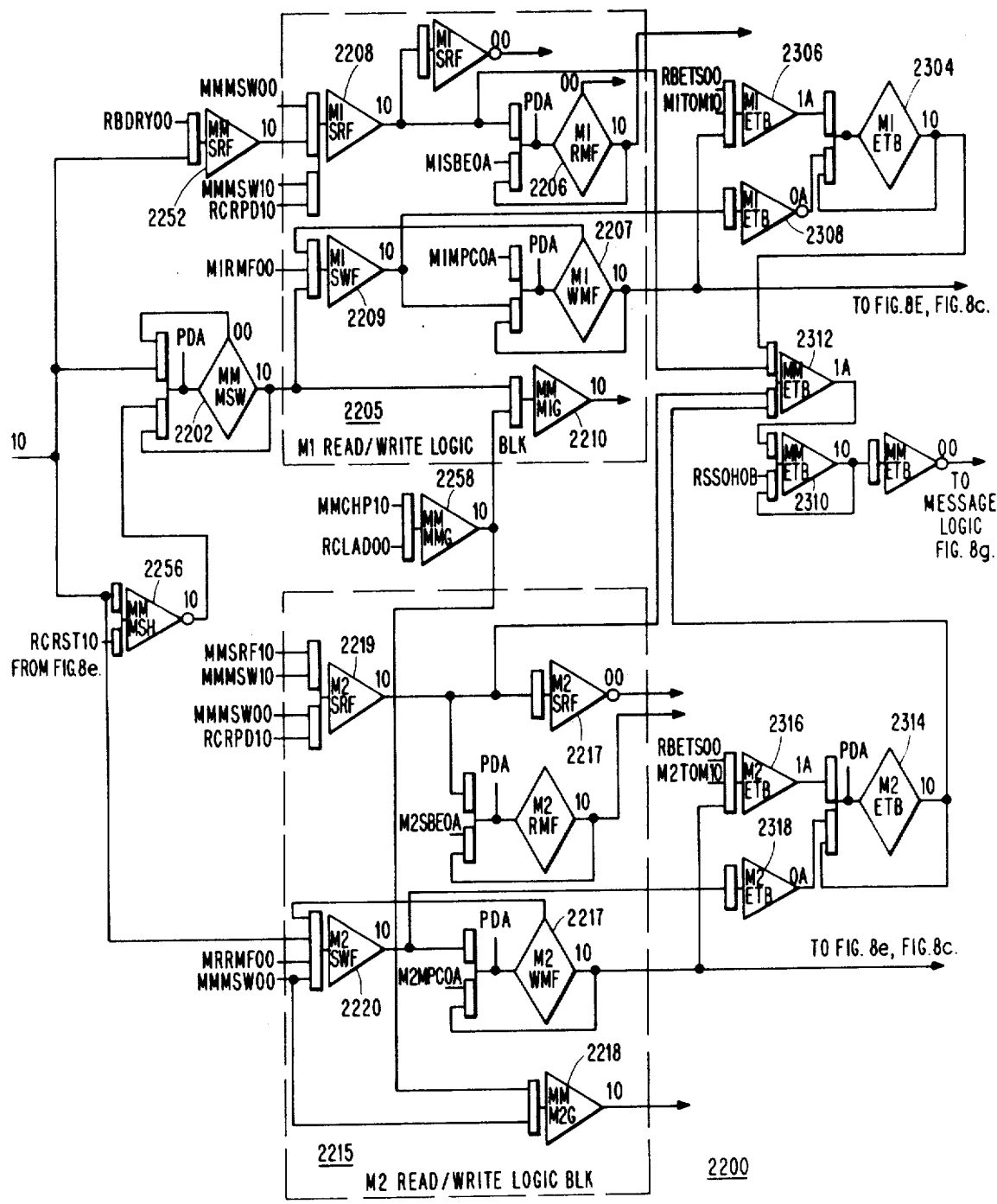
Fig. 8b. (SHEET 2 OF 2)

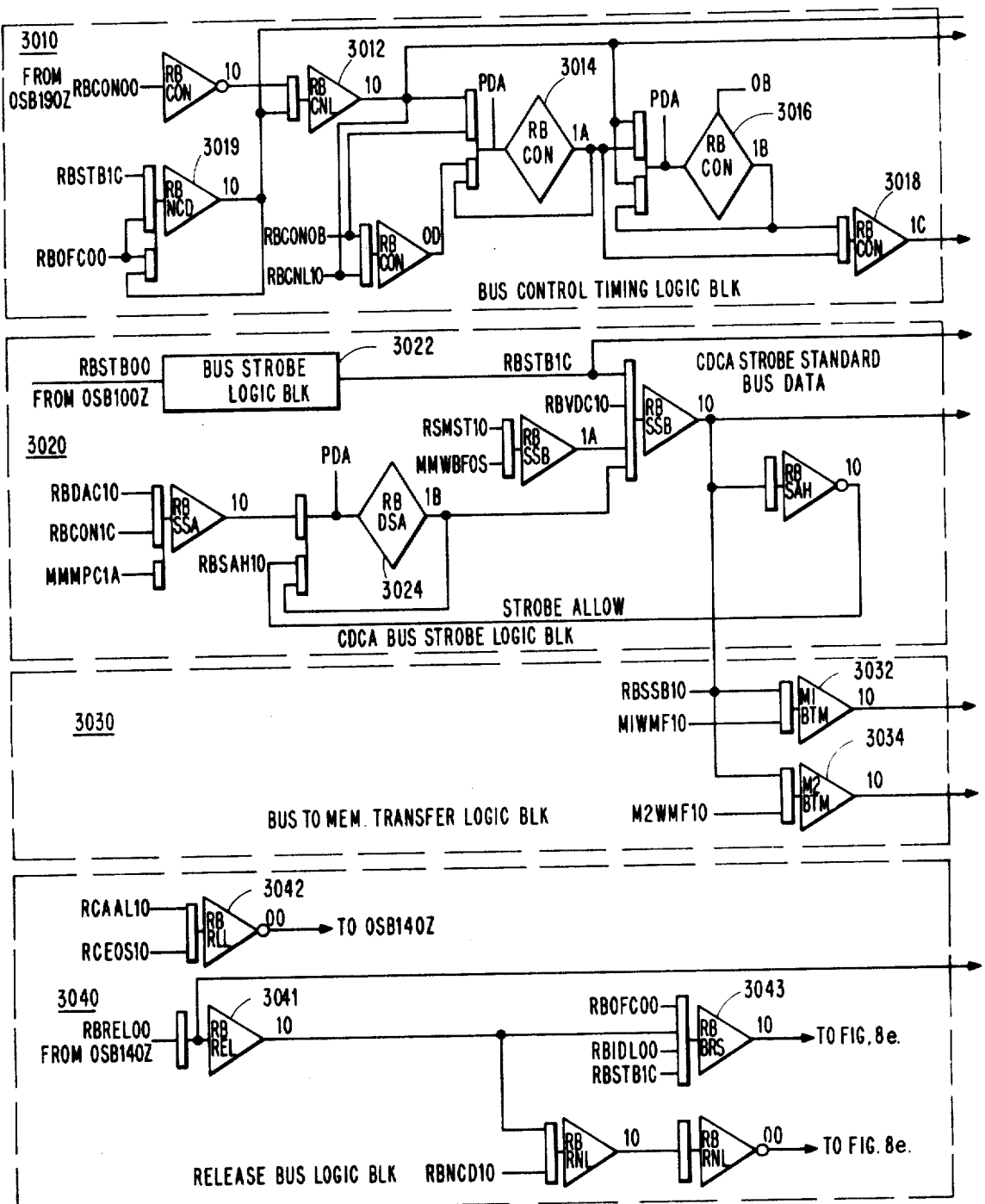
Fig. 8c. (SHEET 1 OF 4)

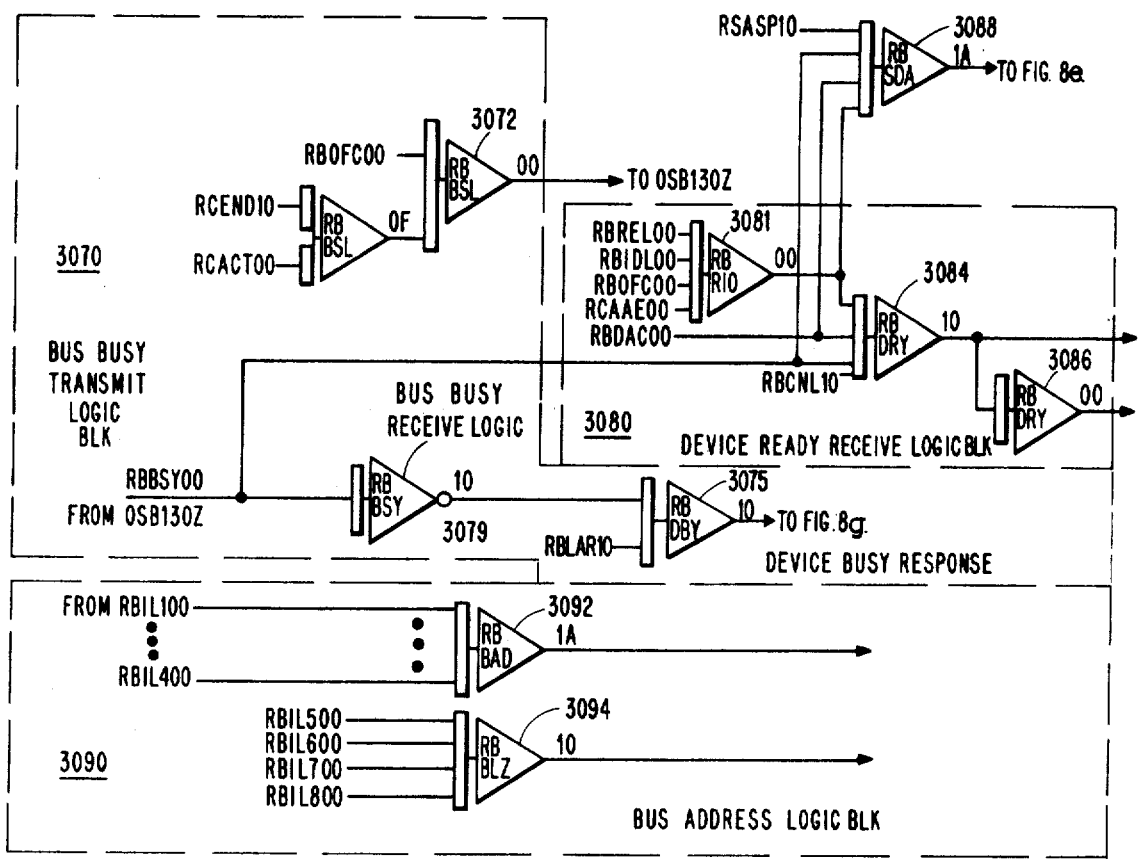
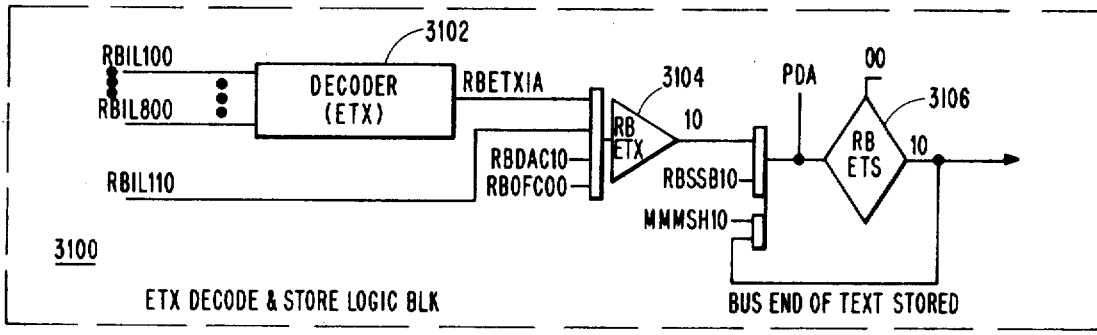
Fig. 8c.
(SHEET 3 OF 4)

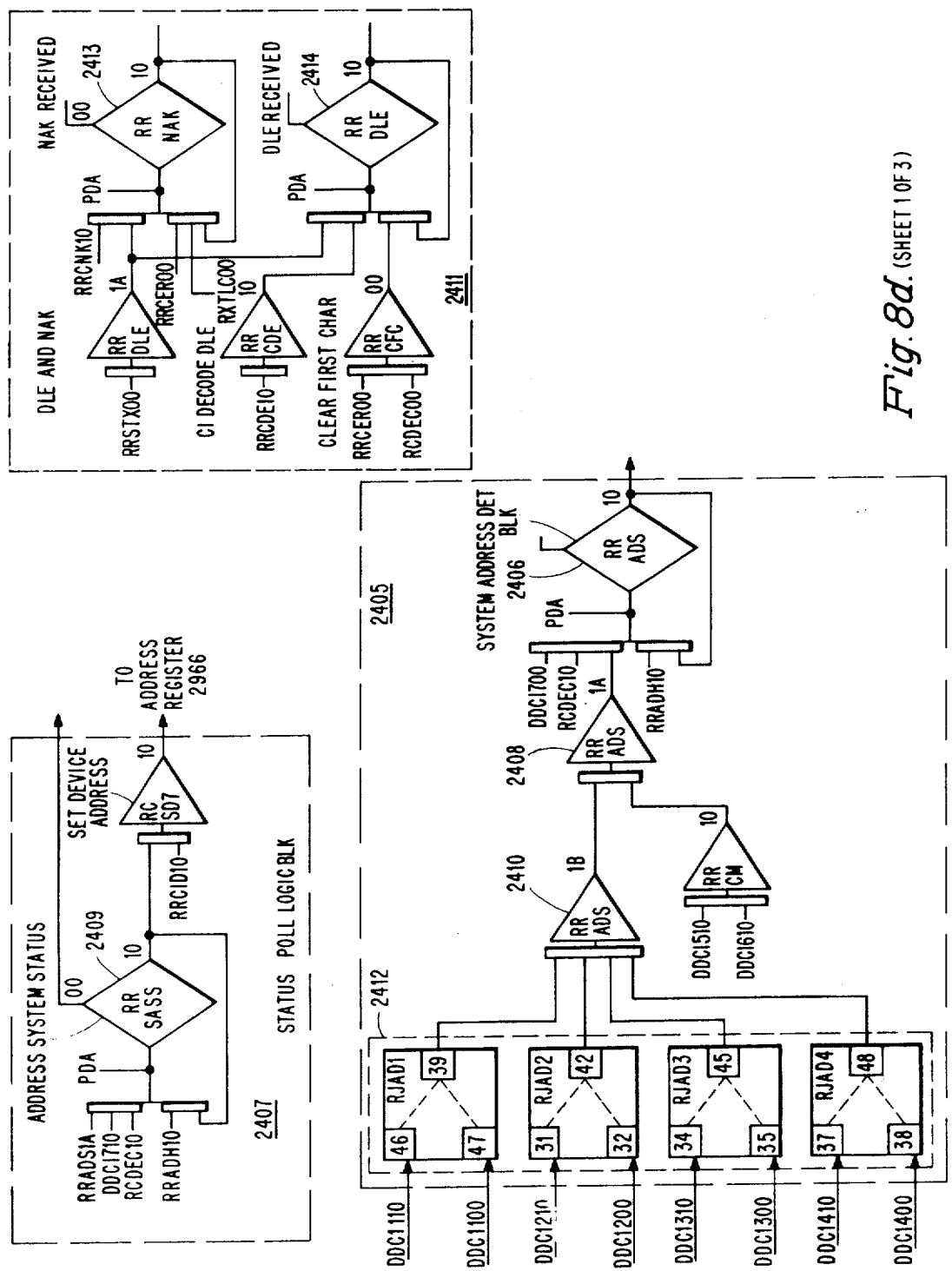
Fig. 8d. (SHEET 1 OF 3)

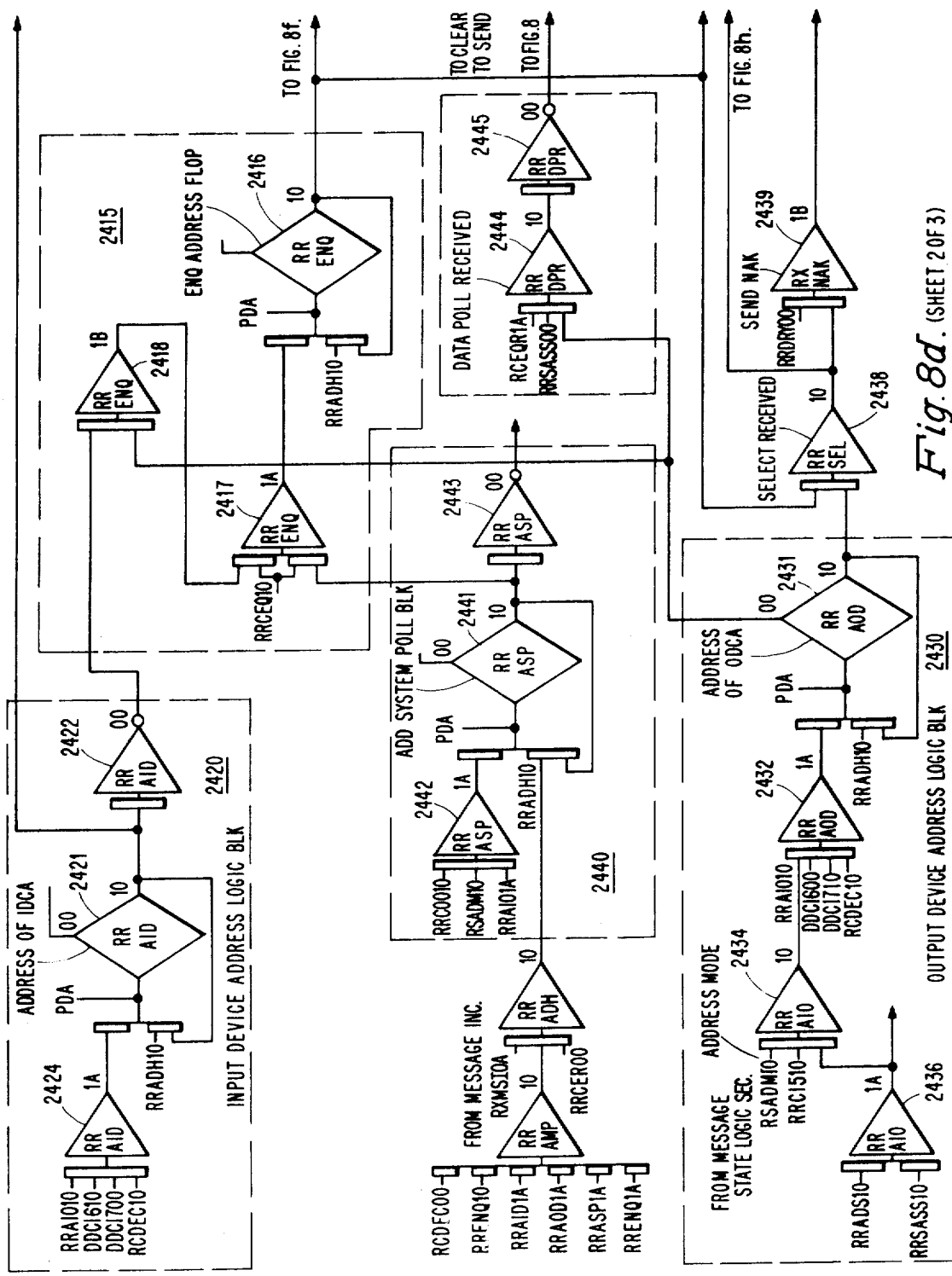

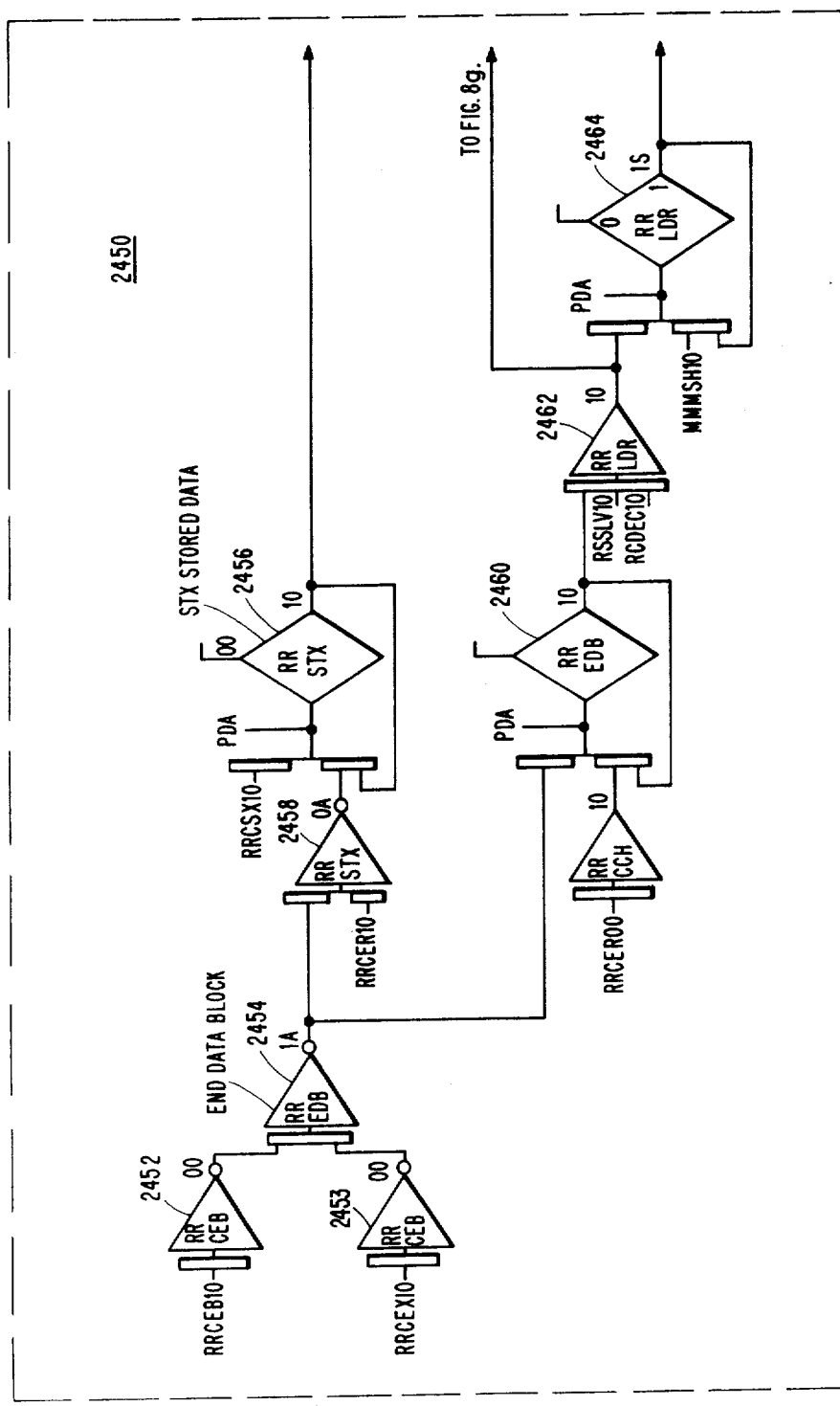
Fig. 8d. (SHEET 3 OF 3)

(SHEET 10 F 3)

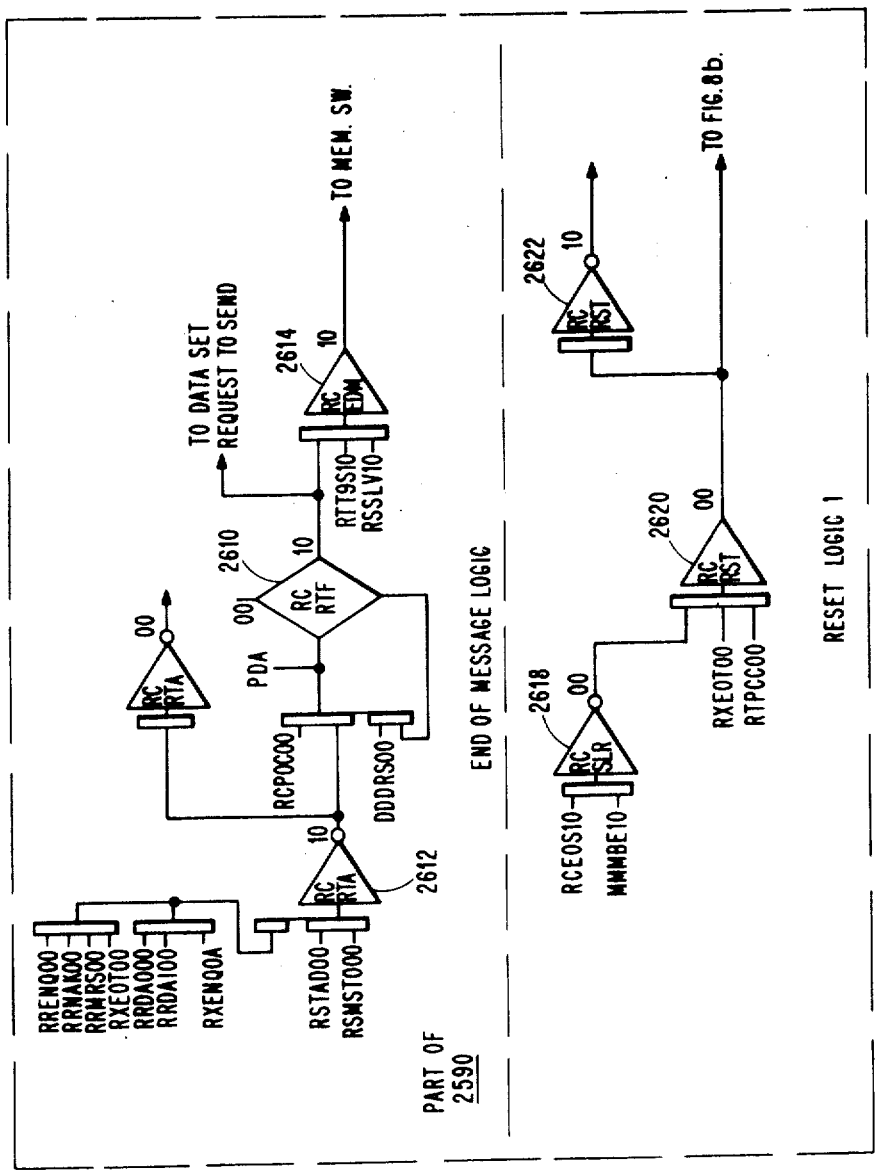
Fig. 8a. (SHEET 3 OF 3)

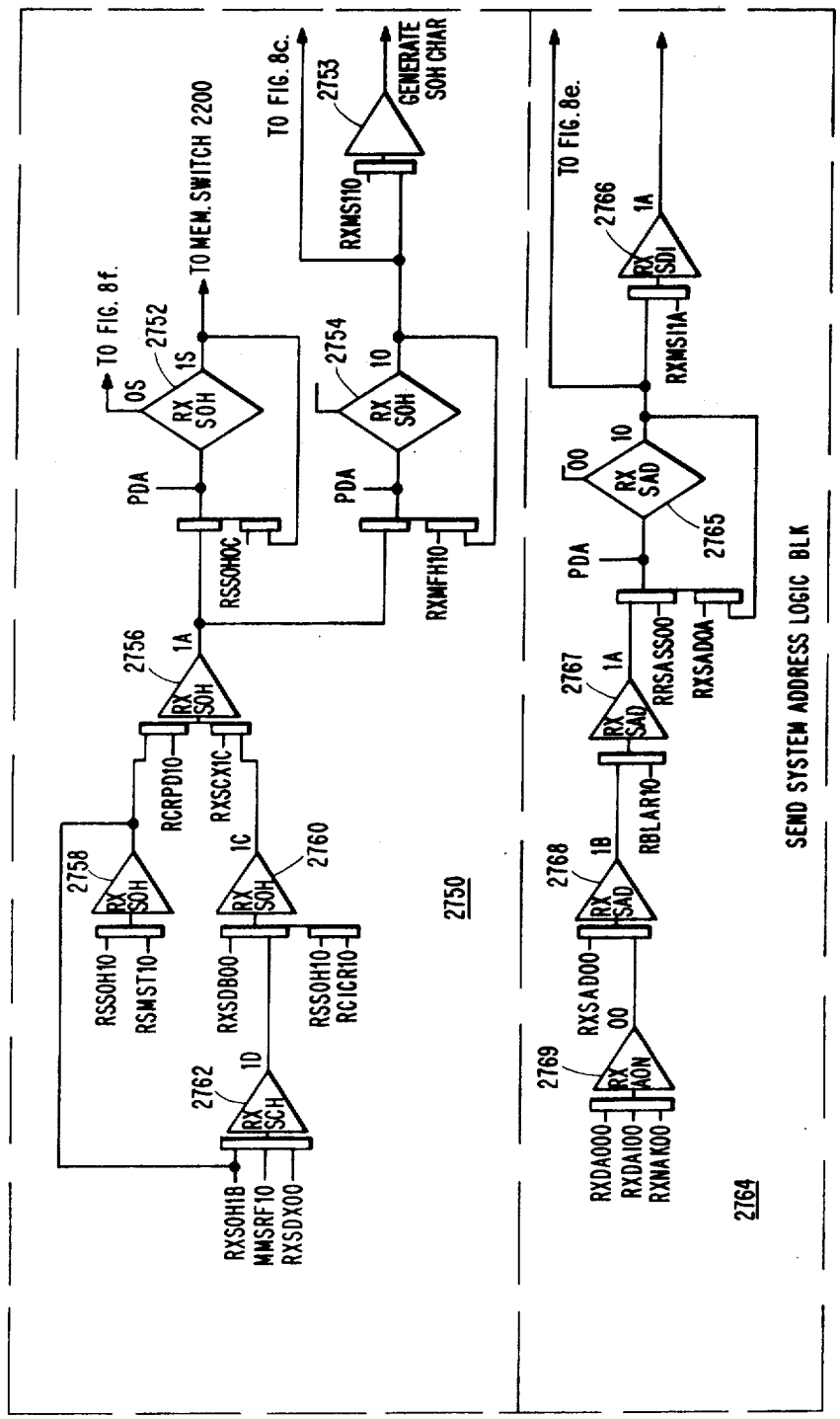
Fig. 8g. (SHEET 1 OF 4)

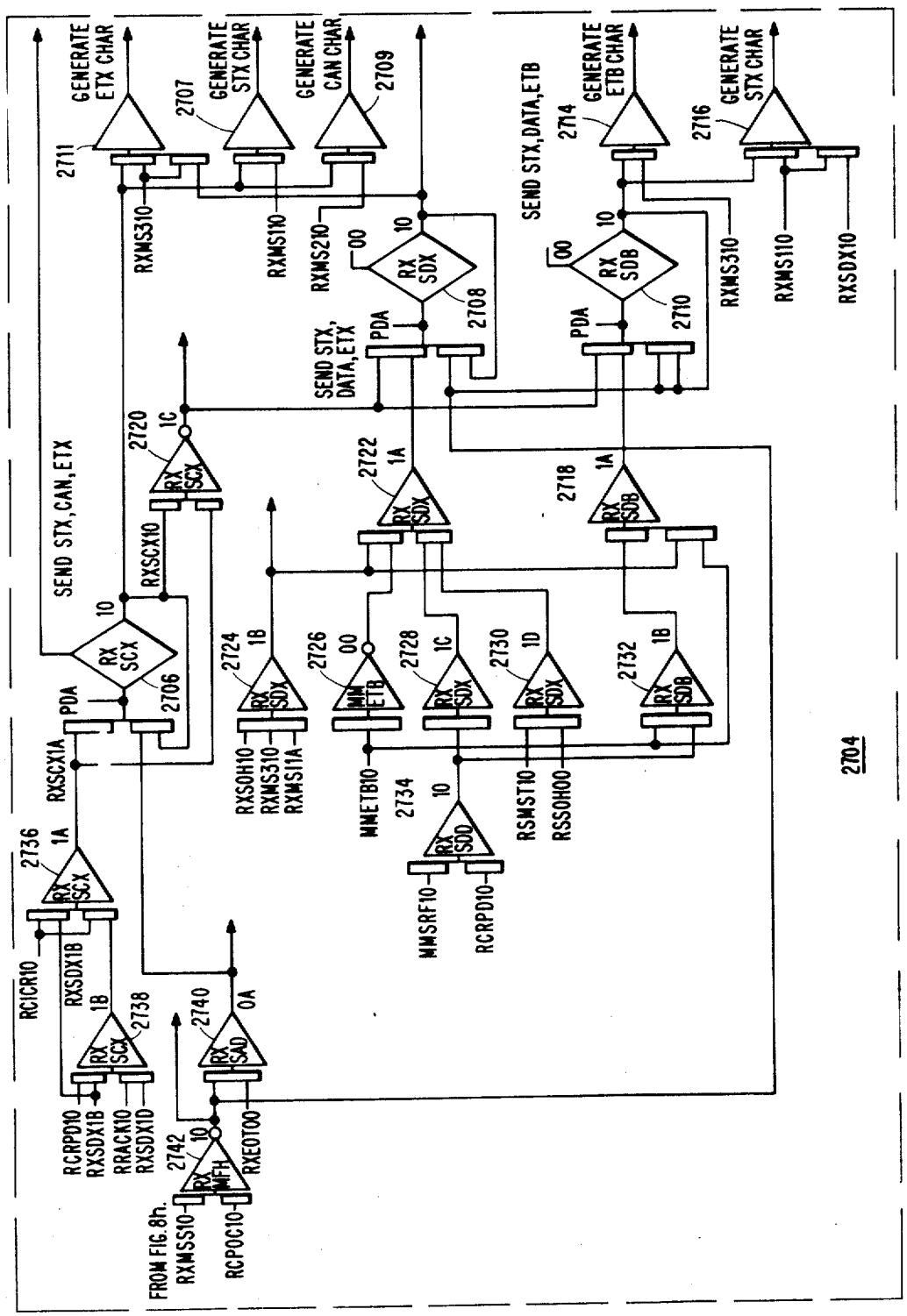
Fig. 8g. (SHEET 2 OF 4)

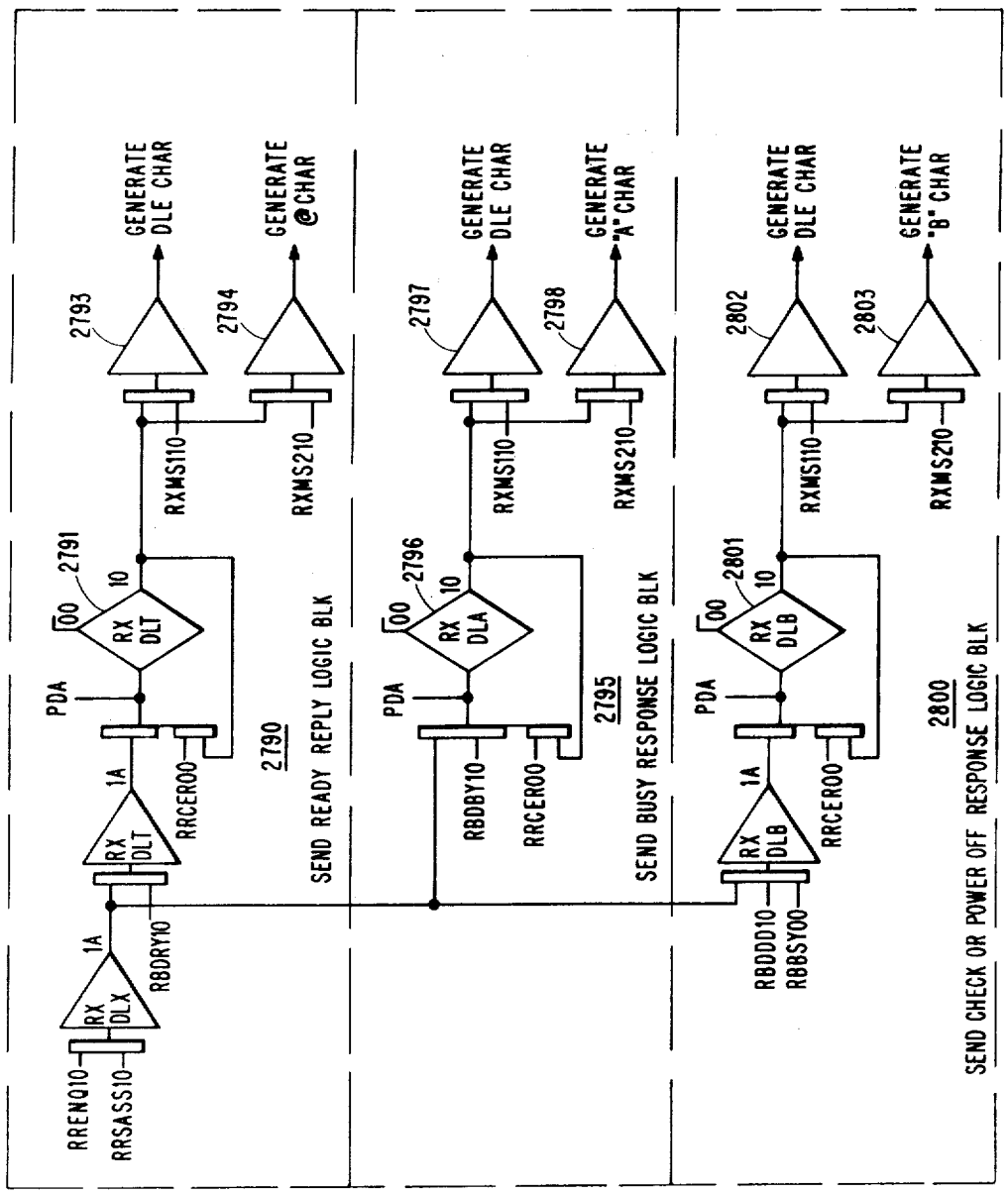
Fig. 8g. (SHEET 4 OF 4)

| BIT POSITIONS | | $b_8$ | $b_7$ | $b_6$ | $b_5$ | $b_4\ b_3\ b_2\ b_1$ |
|---|---|---|---|---|---|---|
| SYSTEM ADDRESS CHARACTER CODE | As | P | S | 1 | 1 | $a_t$ |
| DEVICE ADDRESS CHARACTER CODE | Ad | P | $\overline{I/O}$ | I/O | 1 | $a_d$ |

$a_d$ - (4 BIT)-DEVICE ADDRESS CODE $a_t$ - (4 BIT)-TERMINAL ADDRESS CODE

I/O - (1 BIT)-INDICATES INPUT (1) OR OUTPUT (0) DEVICE ADDRESS CODE

P - (1 BIT)-CHARACTER PARITY

S - (1 BIT)-STATUS (1) OR DATA (0) POLL

DEVICE POLL: (S=0; I/O=1; $a_d \neq$ 0000)
  DEVICE POLL REQUESTS DATA FROM THE SINGLE ADDRESSED ($a_d$) INPUT DEVICE SYSTEM POLL: (S=0; I/O=1; $a_d$ = 0000)
  SYSTEM POLL REQUESTS DATA FROM ALL TERMINAL INPUT DEVICES WHICH ARE READY TO TRANSMIT STATUS POLL: (S=1; $a_d \neq$ 0000)
  STATUS POLL REQUESTS STATUS INFORMATION FROM THE SINGLE ADDRESSED ($a_d$) INPUT OR OUTPUT DEVICE DEVICE SELECT: (S=0; I/O=0; $a_d \neq$ 0000)
  DEVICE SELECT REQUESTS DATA BE RECEIVED BY THE SINGLE ADDRESSED ($a_d$) OUTPUT DEVICE

*Fig. 9.*

MULTI FUNCTION POLLING TECHNIQUE

RELATED APPLICATIONS

1. "A Remote Terminal System" invented by Robert E. Huettner and Edward B. Tymann, filed on Feb. 12, 1971, Ser. No. 114,912 and assigned to the same assignee named herein.

2. A Communication Control Device utilized as an Input/Output Module for a Terminal System invented by Robert E. Huettner, Edward B. Tymann and Richard Nolin filed on Feb. 12, 1971, Ser. No. 114,852 and assigned to the same assignee named herein.

3. "An Automatic Terminal Deactivation Device" invented by Robert E. Huettner and Edward B. Tymann, filed on Feb. 12, 1971, Ser. No. 114,876 and assigned to the same assignee named herein.

BACKGROUND OF THE INVENTION

1. Field of Invention

This invention relates to a remote terminal which includes a plurality of data handling devices connected to share a common bus for transmitting and receiving information respectively.

2. Prior Art

In general, communication terminals provide a polling procedure or method for requesting data from a single input device. Accordingly, when a plurality of input devices are polled, this necessitates a number of separate polling messages to be transmitted by the data processing system and replies with respect thereto to be generated. Hence, the procedure of the prior art has been found exceedingly time consuming where a number of input devices are to be polled for data.

Additionally, polling procedures and terminals of the prior art do not provide the ability to request the status of the device independently of the data transfer operation relating to the device. That is, status information while it can be included within the data transmitted by the terminal, it is not transmitted unless the device has been polled for data. Further, the terminals of the prior art have been limited as to the quantities of data they can process thus limiting the number of different types of requests they can process.

Accordingly, it is an object of the invention to provide a multifunction polling technique which can be used to request information from a single input device of a remote terminal.

It is a further object of the invention to provide a multifunction polling procedure which can also request data from all of the input devices of a remote terminal which are ready to transmit data.

It is still a further object of the invention to provide a multi-function polling procedure which can also request status information from either a single input device or output device of the terminal system.

It is still a further object of the invention to provide a polling procedure using a polling sequence compatible with established communication procedures.

It is a specific object of the invention to provide apparatus which efficiently processes requests of different types notwithstanding differences in the quantities of data involved in processing such requests.

It is a more limited object of the present invention to provide a polling procedure together with communication apparatus which maximizes the use of common device addressing and control functions within a central control apparatus of the terminal system together with common status response and data transfer functions included within the individual device controllers associated with the data handling devices of the system.

SUMMARY OF THE INVENTION

The above and other objects are provided according to the basic concept of the invention through a polling method and apparatus which utilizes and is responsive to a predetermined multicharacter sequence. In particular, the polling sequence transmitted to the terminal includes a common polling sequence to which the address is expanded to include two characters wherein predetermined bits of these characters are coded to define the type of polling request and the type of information requested. In accordance with the preferred embodiment, certain bits within a first address character identify the terminal and specify whether the request is for status or data. Certain bits of a second address character define whether the request is a system poll or a device poll. That is, it specifies whether all of the devices are to be polled or just a single device is to be polled. Another bit within the same character defines whether the device is to be polled as an input device or an output device. Additionally, modification of the coding identifies the request as that of a device selection. That is, the same control sequence can be used to specify that a particular output device is to receive data.

In more particular terms, the common control sequence generated and transmitted by the data processing system causes the communications control apparatus of the remote terminal of the illustrated embodiment in accordance with the teachings of the invention to respond to the different types of requests mentioned above by conditioning the pertinent portions of the terminal for processing same. For example in responding to a status request, the communications apparatus is conditioned to generate the requisite control and identification signals for requesting status of a particular data handling device and in accordance with the device response generates a message indicating to the data processing system the nature of device response. A feature of the communications apparatus in processing status requests is that it executes the requests and returns the device to its original status while maintaining the terminal system in its original state.

The communications apparatus of the illustrated embodiment includes a memory system which it conditions to process various quantities of data as specified by the requests and the terminal system. Such apparatus is able to generate the appropriate information to be appended to each quantity of data transmitted to the data processing system as called for by the different types of polling requests.

The above and other objects of the present invention are achieved in an illustrative embodiment described hereinafter. Novel features which are believed to be characteristic of the invention, both as to its organization and method of operation, together with further objects and advantages, thereof will be better understood from the following description considered in connection with the accompanying drawings. It is to be expressly understood, however, that these drawings are for the purpose of illustration and description only and are not intended as definition of the limits of the invention.

BRIEF DESCRIPTION OF THE DRAWINGS

FIG. 3a shows in greater detail the timing logic of FIG. 3.

FIG. 3c shows in greater detail the normal release logic section of FIG. 3.

FIG. 5 summarizes the states of the pertinent control functions generated by the general device controller element of FIG. 1 during system operation.

FIG. 8 shows in a block diagram form the communications input/output device of FIG. 1.

FIG. 8b shows in greater detail the memory switching logic of FIG. 8.

FIG. 8d shows details of the Receive Control logic which forms a part of the command logic of FIG. 8.

FIG. 9 illustrates the coding of significant bit positions within the address characters of the common control procedure.

DESCRIPTION OF THE PREFERRED EMBODIMENT

In General

In the terminal system of the present invention, data is processed in a plurality of operator selectable modes depending on the particular application. For example, in data collection and merging operations, it becomes desirable to process a block or a data record from each input device. This mode, termed herein as a transaction mode, permits one transaction or one block of data to be read from each input device.

On the other hand, in other applications where tasks require extensive volumes of data to be moved to and from a remote site in large groups of batches, it becomes particularly desirable to have a single input device transfer data until it has exhausted its supply of data. This mode of operation is referred to as a "batch" mode of operation.

In addition to the above mentioned operator selectable data modes, the system of the present invention may operate "on-line" to a remotely located data processing system. When operated on-line, the remote data processing system can request and receive data from the input devices of the system or the data processing system can transmit data which will be transcribed by selected output devices of the system. Accordingly, the communications device for on line operation, is able to assume the control functions heretofore performed by the systems device scanner and initiate data transfers to and from the system in accordance with the data processing system requests.

Figure 1:
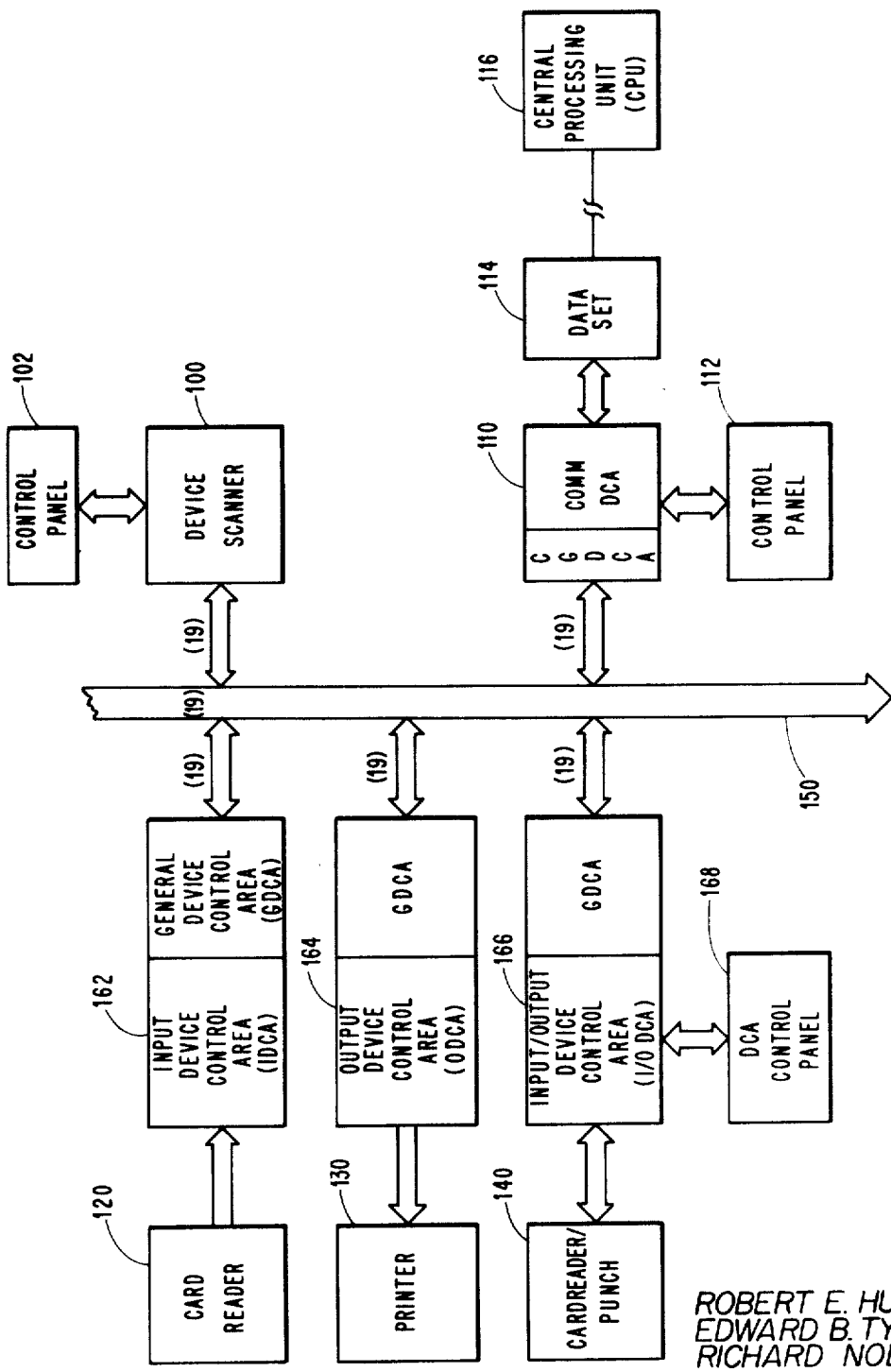
FIG. 1 is a diagrammatical illustration of a terminal system embodying the principles of the present invention.

FIG. 1 is a block diagram of the system of the present invention which includes input device control apparatus in the form of a device scanner 100, a communications control unit referenced as COMM DCA 110 and a plurality of peripheral input and output devices 120, 130, and 140 all of which connect in common to a bus 150.

As shown, the peripheral devices which include a card reader, a printer, a card reader/punch, communicate with the bus 150 to their respective control units 162, 164, and 166. These control units labeled input DCA, output DCA, and input/output DCA respectively include control logic, individual buffer storage, interface circuits and power supplies required to regulate the operation of its associated peripheral device.

Each of the peripheral control units have a standard logic interface area termed herein as a general device control area (GDCA) which provides an interface to the bus 150. The bus 150 consists of 19 lines that include 8 information lines for transferring address and data information, cycle timing signal lines, and several control lines. The lines which form a part of the interface is disclosed in FIG. 2 and will be described herein.

The device scanner 100 is operative to regulate the transfer of data from each of the input devices by generating the requisite timing cycles used in conjunction with such data transfers and pertinent the control signals for controlling these transfers. When the scanner 100 causes an input device to be activated, it then is operative to monitor the activity of the bus 150 during the transfer operation.

In particular, when the system operates in a transaction mode, the device scanner 150 is operative to terminate a transfer of a block of data by generating a release control signal over the bus 150 when it detects that a special control character has been placed on the bus by the input device. Additionally, the scanner 100 monitors the data transfer operation and in the event of its detecting a failure in either a sending or receiving peripheral device from the terminal bus 150. The manner in which the device scanner accomplishes it is described in the copending application titled "An Automatic Terminal Deactivation Device" invented by Robert E. Huettner and Edward M. Tyman assigned to the assignee named herein.

In general, the COMM DCA 110 in accordance with the present invention provides a modular interface between the remote terminal system and a communications channel or facility (i.e. a modular-demodulator unit-modem). This unit allows the terminal system to operate efficiently on line to a remotely located data processing system. In particular, the unit operates as either an input or output unit for transferring data from the remotely located data processing system to the output devices of the terminal system. This is facilitated through the use of a memory buffer system which provides for simultaneous processing of transfers from devices to the buffer memory and from the buffer memory to the communications facility and vice versa. Moreover, the COMM DCA 110 is operative to provide the requisite checking and automatic blocking of messages. In particular, DCA 110 will transfer segments of blocks of information of a size established by the user alternately will transfer automatically blocks of information of a predetermined size automatically.

The detail logic for each of the blocks of FIG. 1 will only be described in as much detail as is necessary to understand the present invention Specifically, the scanner logic disclosed in FIGS. 3a through 3c will be described very generally. Similarly, the FIGS. 4 through 7 and 7a through 7g will also be described only as is necessary to the understanding of the present invention. For a detailed description, reference may be made to the copending application of Robert Huettner and Edward Tymann titled "Remote Terminal System."

THE DESCRIPTION OF DEVICE SCANNER LOGIC

General

The device scanner 100 as mentioned establishes the timing for the system wherein it generates the "ON" and "OFF" LINE bus cycles which define the time interval during which a single data character may be transferred over the terminal bus 150 during on-line and off-line operation. The "ON" and "OFF" LINE bus cycles are equally divided and can be varied in frequency by switches provided on a control panel 102 associated with the device scanner 100. Additionally, the scanner 100 is operative to generate a strobe pulse occurring midway between each ON-LINE and OFF-LINE bus cycle for defining a time period during which information on the bus 150 may be accurately sampled. Also, the scanner 100 generates a four bit binary address code which is received by the general device control area (GDCA) of the input/output device controllers 120,130,140 and the communication general device control area (CGDCA) of the COMM DCA 110.

Figure 3:
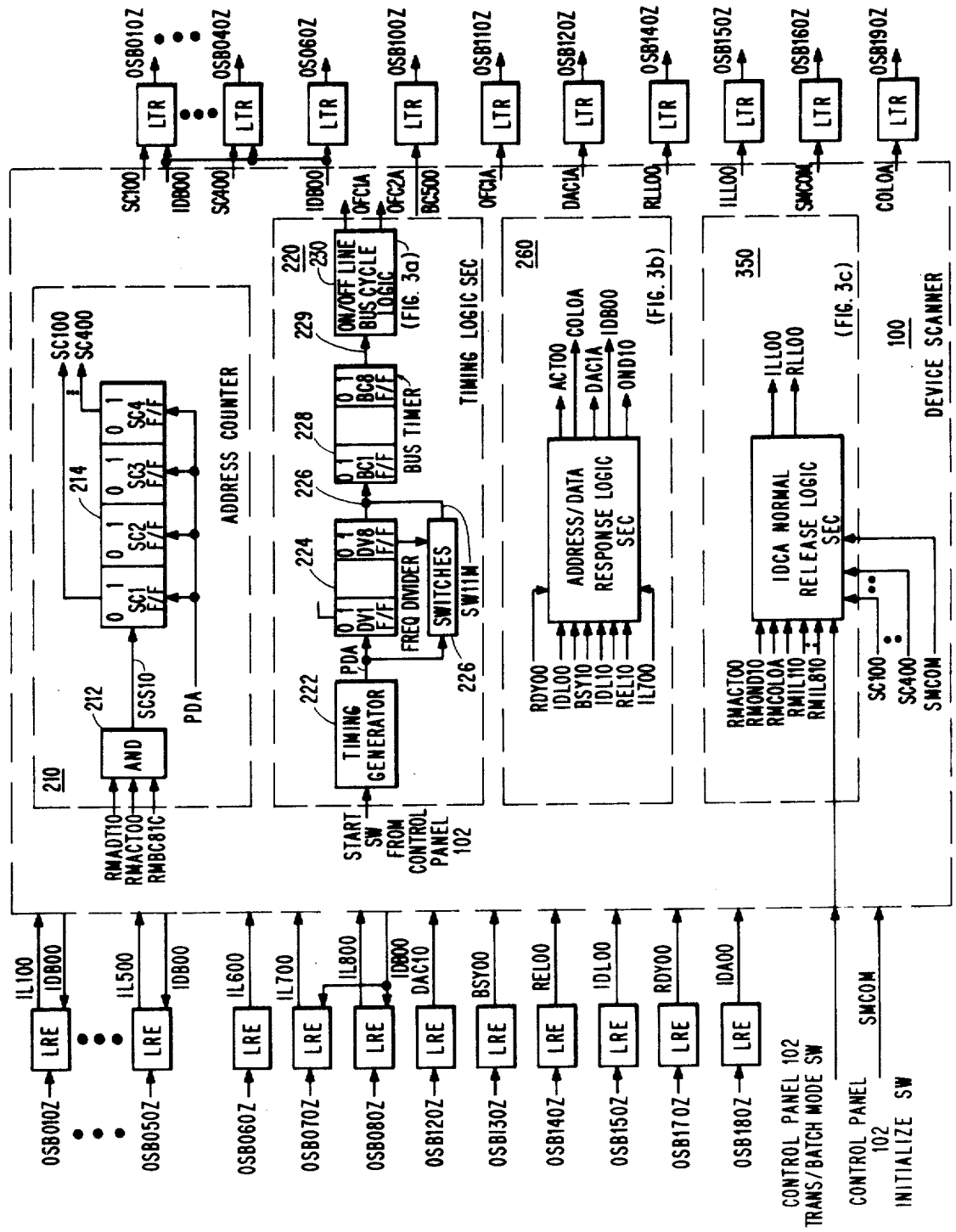
FIG. 3 is a blocked diagram of the device scanner of FIG. 1.

With reference to FIG. 3, it is seen that the scanner 100 comprises four sections. These sections include a Device Scanner Address Counter Section 210, a Timing Logic Section 220, an Address/Data Response Logic Section 260, and a Release Logic Section 350. These sections are illustrated in greater detail in the FIGS. 3a through 3c as designated in each of the section blocks of FIG. 3.

TERMINAL BUS 150

Figure 2:
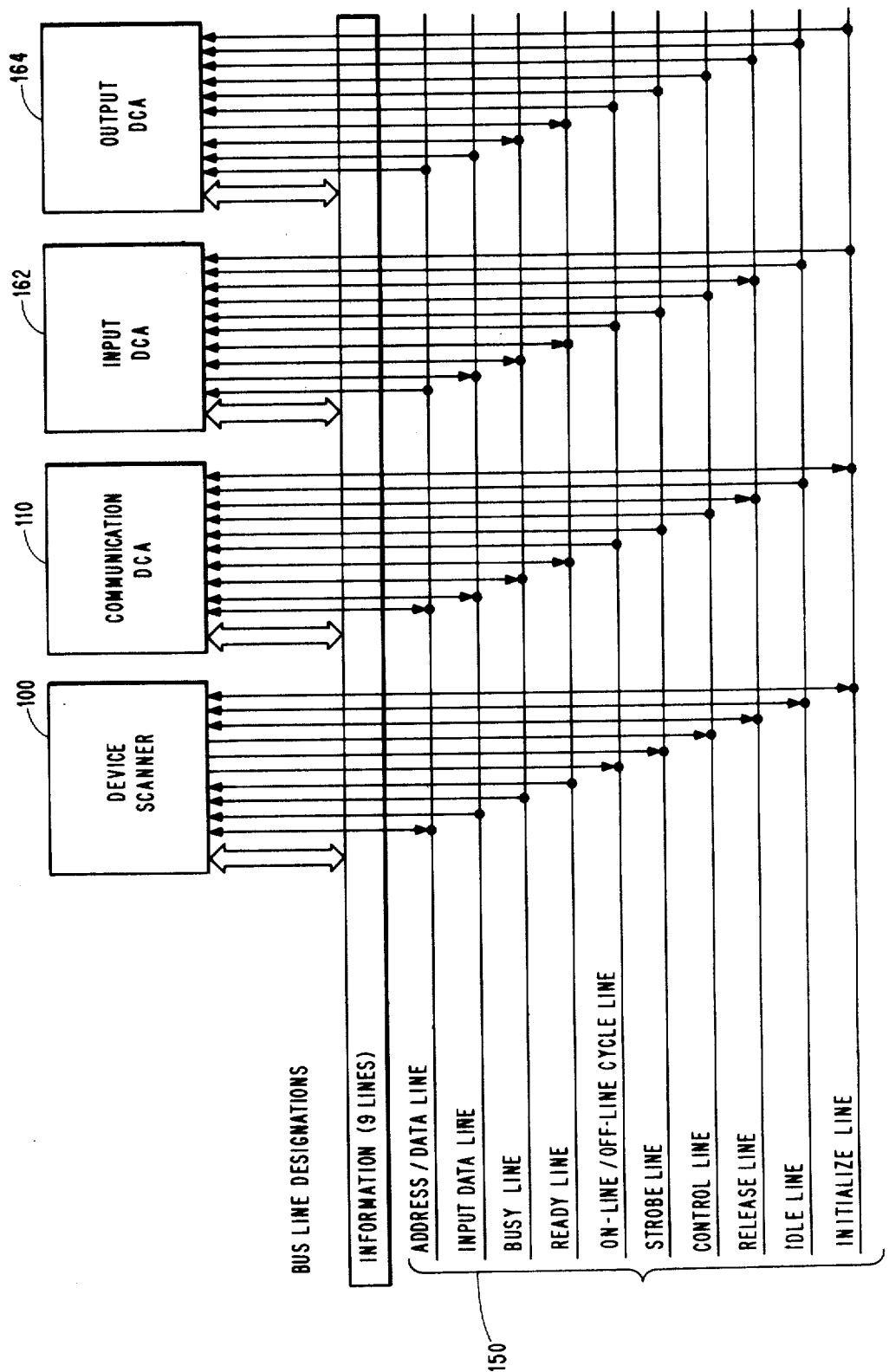
FIG. 2 shows the bus 150 of FIG. 1 in greater detail.

Before discussing the above Figures, reference is made to FIG. 2 mentioned above. A general description of each bus line which forms the bus 150 is summarized in the following table.

TABLE

INTERCONNECTING LINES

| FUNCTION | SIGNAL LINE | DESCRIPTION |
| --- | --- | --- |
| IL110/IL100 Through IL910/IL900 | Information (OSB010Z Through OSB090Z) | Lines 1 through 9 are used to transfer both data and address information. During On-Line cycles, the condition of the ADDRESS/DATA line specifies the content of the information lines. During OFF-LINE cycles, the lines are used only for data transfer. When used for address information line $I_1$ through $I_4$ contain the DCA address, line $I_5$ specifies whether the addressed DCA is to operate as an IDCA or an ODCA, and line $I_7$ specifies either an activation address or status poll address. When used for data transfer, input DCA's place data on line $I_1$ through $I_8$ and output DCA's receive data from these lines. Line $I_9$ is a spare line provided for future expansion. |
| OFC00/ OFC10 | ON/OFF LINE CYCLE OSB110Z | The ON/OFF LINE SIGNAL is generated continuously by the Device Scanner and provides time sharing of the bus 150. The On-line condition allows addressing, address response, and On-line data transfers. The off-line conditions allows Off-line data transfer only. |

| Signal | Name | Description |
|---|---|---|
| DAC00/<br>DAC10 | ADDRESS/<br>DATA<br>(OSB120Z) | The condition of this line specifies the content of the Information lines during On-line operation.<br><br>The address condition allows all DCA's to recognize and respond to addresses on the information lines. The data condition allows On-line DCA's to transfer data over the information lines. |
| STB10/<br>STB00 | STROBE<br>(OSB100Z) | The Strobe signal is generated by the Device Scanner during each ON-LINE and OFF-LINE cycle. This signal specifies the valid interval for all signals appearing on the SB. DCA's sample the Information, Idle, and Release lines during the Strobe Interval. This signal also provides timing for internal DCA functions. |
| BSY10/<br>BSY00 | BUSY<br>(OSB130Z) | The Busy signal inhibits On-line activation of DCA's while the COMM DCA is in the quiescent (receive) state. It is also used for On-line address/status response, to inhibit On-line data timeout, and to prevent more than one IDCA from entering the Off-line mode. A signal on the Busy line inhibits address recognition in all IDCA's. DCA's addressed while in the Idle, Off-line, or On-line mode respond by generating a Busy signal. An Off-line IDCA will maintain a signal on the Busy line to prevent any other IDCA from entering the Off-line state. |
| IDA10/<br>IDA00 | INPUT DATA<br>(OSB180Z) | An activated IDCA will transfer a character to the information lines and then maintain the Input Data signal on this line until a signal on the CONTROL line is detected. The activated IDCA then resets the Input Data signal until the next character is ready for transfer. Activated ODCA's will accept data from the information lines only when the Input Data signal is present |
| RDY10/<br>RDY00 | READY<br>(OSB170Z) | Used to indicate that addressed DCA's are activated and to acknowledge single character transfer during On-line and Off-line operation. The Scanner senses the transition and generates a signal on the CONTROL line indicating affirmative response to an IDCA or COMM DCA. |
| SMC10/<br>SMC00 | INITIALIZE<br>(OSB160Z) | Used to interrupt all activity and initialize the terminal. The Initialize signal switches all DCA's to the Idle State. |
| CON00/<br>CON00 | CONTROL<br>(OSB190Z) | Generated by the Scanner to indicate affirmative address response or Next Character Requested in response to a a change in state in the Ready line |
| REL10/<br>REL00 | Release<br>(OSB140Z) | The condition of this line determines when all DCA's in an On-line state will be switched to their ready state except for DCA's in the audit trail mode which remain in the On-line mode. |
| | | ON-LINE IDCA's change the condition of this line to indicate transmission of an input data transfer operation when the system is operating in the batch mode. |
| | | The device scanner changes the condition of this line to indicate to an IDCA the termination of an input data transfer operation when the system is operating in the block mode. |
| IDL10/<br>IDL00 | Idle<br>(OSB150Z) | The conditions of both the Idle and Release line are used to deactivate DCA's by switching them from the on-line or other active state to the idle state. Both lines when switched to the same state will switch an IDCA from the on-line state to the idle state Both lines when switched to the same state will switch an IDCA from the on-line state to the idle state. When the idle line is in a predetermined state, it will switch an ODCA in either the on-line or audit trail mode which has not generated an Ready response from that state to the idle state. ODCA's which have generated a ready response are switched to the ready state. |

As previously mentioned, the device scanner 100 interconnects with the various other portions of the system through the terminal bus 150. The lines which comprise the bus are shown in FIG. 2 and a description of the function each line performs is summarized in the above mentioned table.

In general, the standard bus 100 includes all required data and control signals with the exception of power and indicator lines. The bus 150 represents binary information by two direct current levels (i.e. two wire balanced system). Some of the lines are arranged for bidirectional transfers of information whereby a device may receive and transmit signals along the same line. More particularily, some (13) of the bus lines are employed in transmit operations such as transferring information to the COMM DCA, IDCA's or ODCA's and are designated as follows:
1. OSBO10Z through OSBO40Z;
2. OSB080Z through OSB020Z;
3. OSB140Z through OSB160Z; and,
4. OSB190Z.

Also, some (14) lines, including some of the above lines, are used for receiving information from the COMM DCA, PANEL and/or DCA's and these lines are designated as follows:
1. OSB010Z through OSB080Z;
2. OSB120Z through OSB150Z; and,
3. OSB170Z through OSB180Z.

Referring to FIG. 3, it will be noted that each of the above transmit-receive lines are preceded and followed respectively by a block in the form of a logic circuit labeled LTR. This circuit, as shown, has a transmit or data input applied thereto and a gate input which determines whether the circuit operates as a transmitter or as a receiver. When operated only as a receiver, it is labeled LRE. This circuit may be conventional in design and comprise a pair of differential amplifiers. Also, this unit may take the form of a driver/receiver circuit invented by Nelson W. Burke disclosed in a patent application titled "Bidirectional Line Driver-Receiver Circuit" bearing Ser. No. 863,807, assigned to the same assignee named herein.

Moreover, it should be noted that as concerns the internal logic of this system a binary ONE corresponds to a positive voltage level (e.g. 5 volts) while a binary ZERO corresponds to low voltage level (e.g. 0 volts). In the system when none of the devices connected to the bus, have enabled their transmitting circuits, the bus lines are at zero volts level. Accordingly, each of the internal logic levels are inverted before they are applied to the LTR circuit and they are inverted after they are received from an LRE circuit. Therefore, in this arrangement a binary ZERO is defined as a ZERO volts level on the bus and a binary ONE is defined as a negative voltage level (−2 volts).

The device scanner 100 as shown by FIG. 3 also receives inputs from a control panel 116. The controls which are important to the operation of the device scanner 100 include a BATCH/BLOCK switch and an INITIALIZE switch. As FIG. 3 shows, the BATCH/BLOCK switch when in the BLOCK position causes a function BAO10 to be generated while depressing the INITIALIZE switch produces the function SMCOM. For further details as to the other controls and indicators this panel could include, reference may be made to the article titled "H-2440 Remote Transmission Terminal" which appears in Volume Four-Number Two issue of the Honeywell Computer Journal, Copyright 1970.

Before referring to the logic diagrams herein, it should be noted that in order to facilitate the explanation of how various gates and storage elements are enabled and are switched, Boolean or logic equations are given either together with the logic or in place of the logic. It will be evident that these equations may be implemented using AND and OR gates or equivalents thereof wherein the dot symbol (.) indicates the use of an AND gate and the plus, (+) indicates the use of an OR gate.

It will be noted that most of the flip-flops disclosed are clocked or synchronous flip-flops and are designated by a diamond shaped block in the drawings. These symbols and other symbols for AND gates, OR gates amplifiers, inverters and storage devices are summarized in FIG. 6.

Figure 6:
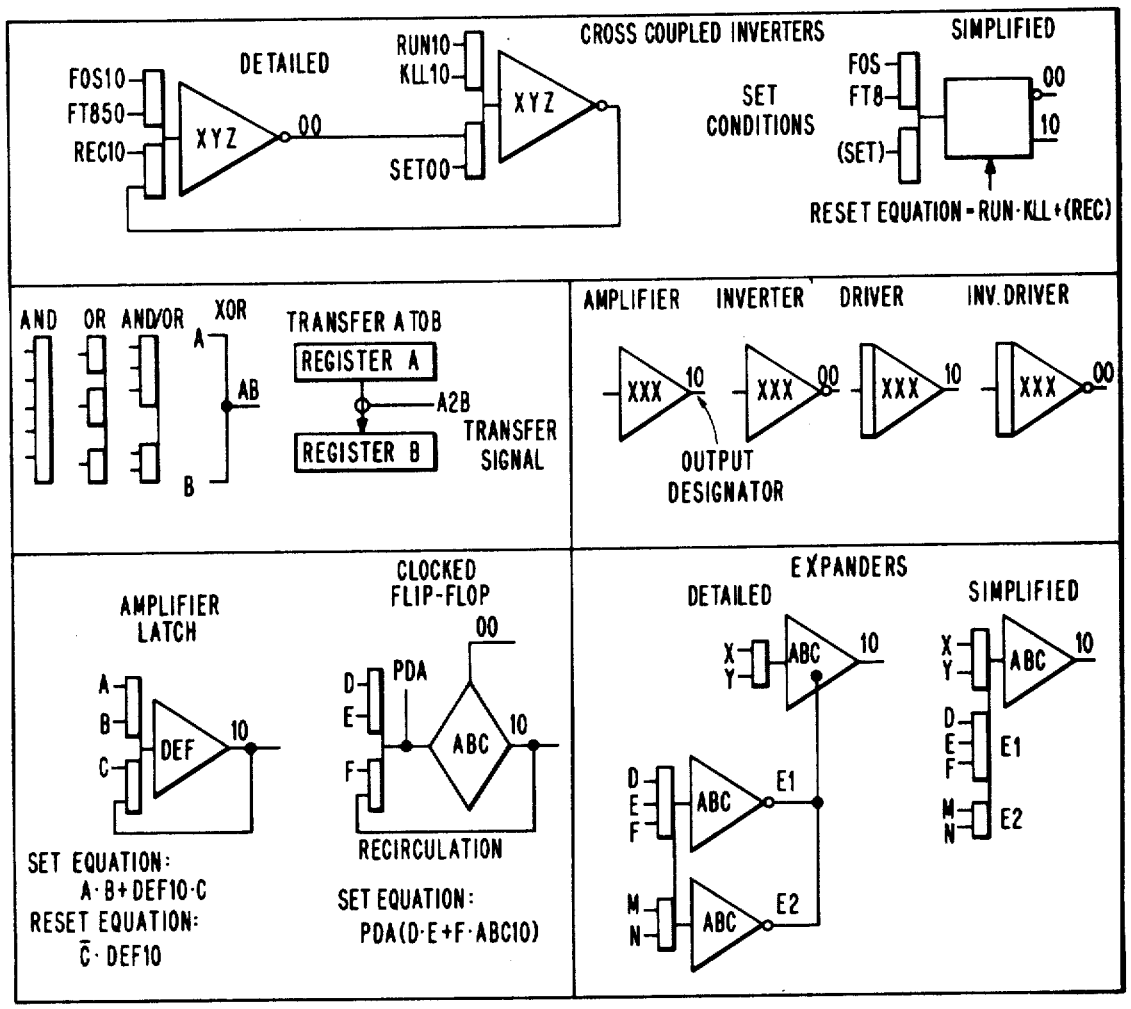
FIG. 6 illustrates a table of symbols used in the logic diagrams illustrating the invention.

Referring to FIG. 6, it will be noted that the set and reset equations are given for the various types of flip-flops storage elements (i.e. those SFF, amplifier latch etc). Further, it will be noted that the "ONE" output terminal of a flip-flop is designated by a 10 while the "-ZERO" output terminal of the flip-flop is designated by a 00. Also, double lines and single lines are used in the Figures to indicate single and multi-conductor lines respectively. The gating functions or transfer functions are designated by a circle around the conductor or conductors they enable.

DEVICE SCANNER LOGIC SECTIONS

Introduction

FIG. 3 shows the various functions applied as inputs to the device scanner 100 and its major sections. Additionally, FIG. 3 shows the various output functions generated by its sections.

SCANNER TIMING SECTION

The device scanner 100 establishes the overall timing for the terminal system. The scanner's timing section as shown in FIG. 3 includes a Frequency Divider Logic Section 224, a Bus Clock Timer Section 228, and On/Off Line Bus Cycle Logic Section 220.

The Frequency Divider Logic Section 224 controls the frequency, or more specifically, the time periods of the ON-LINE and OFF-LINE bus cycles. In the present system, each cycle is of the same duration and can be varied by switches from 50.4 to 403.2 microseconds.

It will be appreciated that the device scanner 100 time shares the standard bus 150 between the basic terminal operating modes (i.e., local transfers and remote transfers) by generating a continuing sequence of these ON-LINE and OFF-LINE cycles by switching of the state of the function RMOFCOO applied to bus line OSB110Z.

This section includes a master oscillator and synchronous flip-flop divider network for generating in a conventional manner, the desired with clock pulses herein referred to as PDA pulses. The PDA pulses are fed to the various logic elements of the system for synchronizing the operation thereof.

Additionally, the PDA pulses are fed to a further divider network, the outputs of which are used to define the time duration of the aforementioned ON-LINE and OFF-LINE cycles. In its simplest form, the divider network includes a six bit synchronous counter including stages DV1 through DV6 which are resettable through switches connected at its various stages. Accordingly, different settings of these switches divide the input clock frequency by different amounts thereby establishing a number of different time intervals or periods for the ON-LINE and OFF-LINE cycles as described herein.

As shown by FIG. 3, the selected width pulse output of the Frequency Divider Logic Section 224 is fed along line 226 to the Bus Clock Timer Section 226. This section includes an eight bit shift register whose stages are designated BC1 through BC8 and whose outputs are used to generate the ON-LINE/OFF-LINE bus cycles, a bus cycle strobe designated as function BC500 and other timing functions including RMBC110, RMBC0100, RMBC310, RMBC410, RMBC510, RMBC610, and RMBC810 used for synchronizing the operation of the internal logic of the scanner 100. Accordingly, the logic section 228 divides each ON-LINE and OFF-LINE cycle into a number of time slots or intervals which are defined by the above mentioned functions. In greater detail, the normal bus cycle time of 50.4 microseconds is divided into two alternating periods of 25.2 microseconds. Each 25.2 microsecond period is divided by the Clock Section shift register into seven equal intervals of 3.6 microseconds. The timing function RMBC810 of the Bus Clock Timer is fed to the Bus Logic Section of FIG. 3a.

As shown by FIG. 3a, the Bus Logic section 230 includes a flip-flop 232 with set and reset AND gates 234 and 236, an OFF-LINE/cycle flip-flop 250 with AND gates 244 and 246 gate buffer amplifier (GBA) stages 238 and 240, and gate buffer inverter (GBI) stages 240 and 252. In operation, when Bus Clock Timer section 228 forces the function RMBC810 high, applied via line 229, this resets flip-flop 232 to its ZERO state which generates the function RMBC80B. The presence of RMBC80B and RMBC810 forces an output RMBC81D which stays high for one clock period or PDA when flip-flop 232 is set to its ONE state via its recirculation gate 236.

During normal operation, the divider switch is in a normal position which forces function RMSW11M high. The functions RMSW11M and RMBC810 enable AND gate 242 which in turn forces RMBC81C high which sets OFF-LINE cycle flip-flop 250 to its "ONE" state. The function RMBC80D generated by recirculation gate 246 serves to hold cycle flip-flop 250 in its "ONE" state until it resets at the next time function RMBC810 comes high. The ON-LINE Bus cycle function is generated by inverting the "ONE" output RMOFC1A of the flip-flop 250. The timing relationships between the functions discussed above are as shown in the timing diagram of FIG. 3a.

Figure 3B:
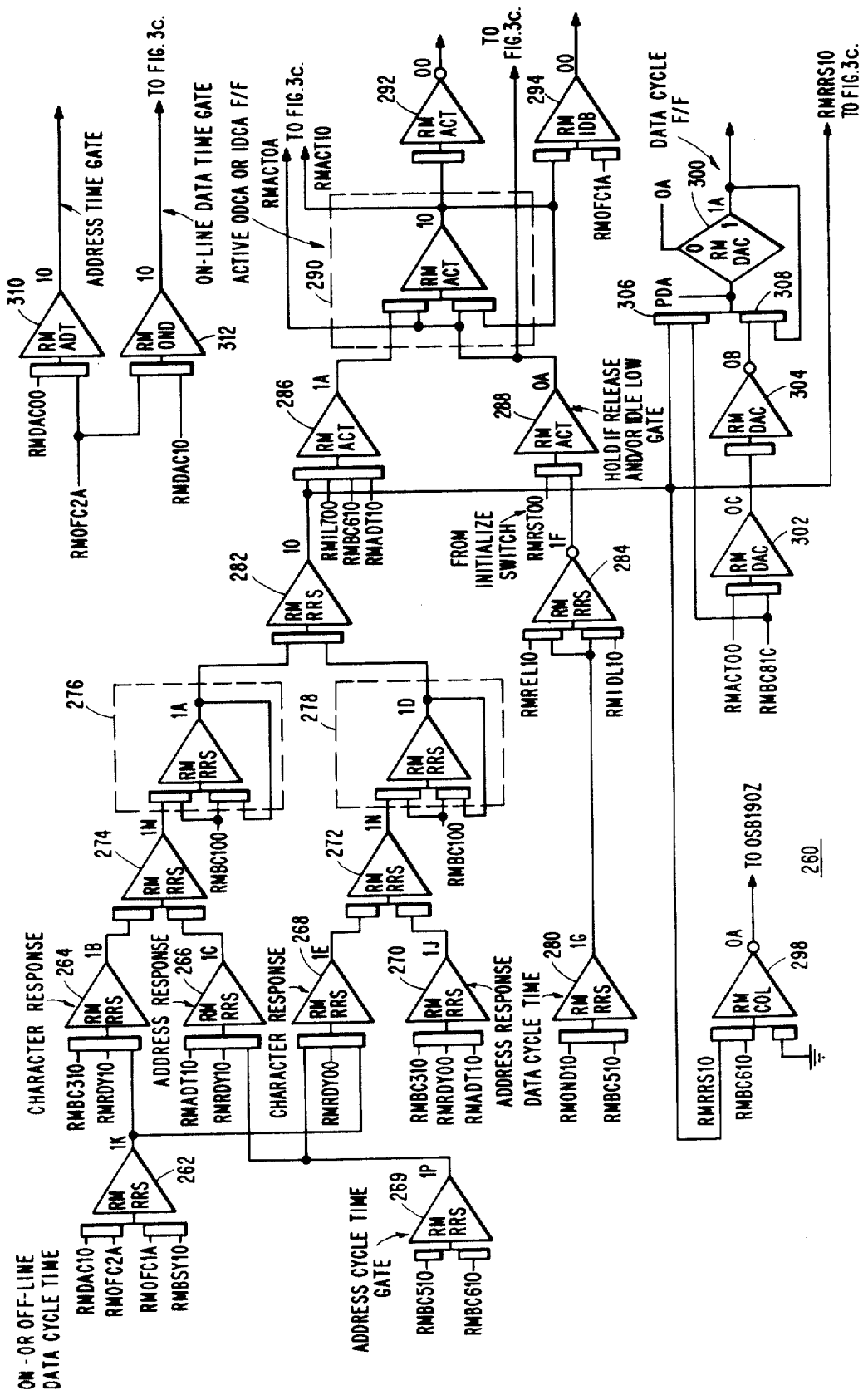
FIG. 3b shows in greater detail the address/data response logic of FIG. 3.

SCANNER SYSTEM ADDRESS LOGIC OF FIGURE 3b

General

When the terminal system operates "on-line," the device scanner 100 generates a 4 bit address code at outputs SC100-SC400 of a four bit counter 214 as shown in FIG. 3. As FIG. 3 discloses, these outputs are applied as inputs to the interface circuits LTR-1 through LTR-4 and then to lines OSB010Z, OSB040Z respectively. The address counter 214 comprises four flip-flop stages designated SC1 through SC4 which are series connected to form a conventional shift register counter 214 which generates up to 16 different address codes within a complete operative cycle. By coding an additional bus line OSB060Z as either a ONE or a ZERO so as to define either input or output device address code, the number of address codes is increased to 32.

The scanner address counter logic is continually advanced or incremented by a counter advance function SCS10 applied via an AND gate 212. In particular, when the Boolean logic statement RMADT10, RMACT00, RMBC81C is satisfied, this activates the AND gate 212 which forces function RMSCS10 high. At this time, the bit counter 214 advances to the next highest address code upon the receipt of a clock pulse PDA during an address time interval of the ON-LINE cycle. The function RMADT10 defines the address time interval of the ON-LINE cycle (when counter incrementing occurs) and is generated by the logic 260 of FIG. 3b as described herein. The scanner counter 214 stores this address contents until a following ON-LINE cycle at which time function RMSCS10 again comes high which increments the counter contents by one.

The generation of the advance function RMSCS10 is also conditioned by the fact that none of devices of the system have responded to the device address code applied to the bus lines during a previous address time interval of an ON-LINE bus cycle. This means that when either an input device or an output device responds to its address code, it forces address function RMADT10 high which in turn forces the output of an AND gate 212 low producing function RMSCS00. This function inhibits the incrementing of the address counter. Accordingly, the current four bit device address contents of the counter remained unchanged.

A portion of this logic generates function RMADT10 which establishes a time interval during which the device scanner 100 sends input devices address codes over the bus 150 during ON-LINE cycles. From FIG. 3b, it is seen that an address cycle occurs when function RMADT10 is forced high in accordance with the Boolean Statement: RMOFCIA .RMDACOO. The function RMOFCIA which defines an ON-LINE cycle is generated by the ON-OFF Line Bus Cycle Logic of FIG. 3a as mentioned above. The function RMDAC00 is generated by a data cycle flip-flop 300 as described herein below.

From FIG. 3b, it is seen that the binary ONE output, RMACTIO, of the flip-flop 290 is applied to an AND gate 294 which generates an allow scanner to send data to bus function RMIDB00. The state of this function determines when the address information is applied to the bus lines and whether the address information is to be received by an input device or by an output device. In particular, when flip-flop 290 is in its reset state, it forces function RMIDB00 low which permits the address bit contents of the address counter 214 to be applied via their respective line driver circuits LTR1-LTR4 to the bus lines during "ON-LINE" cycles (i.e.when function RMOFCIA is also low). When Active flip-flop 290 switches to its set or binary ONE state (i.e. indicating that there is an active input device IDCA or output device ODCA), it forces function RMIDB00 high which conditions logic to remove the address code from the bus lines.

It will be also noted from FIG. 3 that the aforementioned logic 260 by establishing a predetermined level to the line OSB060Z conditions only input devices to decode the address code applied to the bus. That is, only when line OSBO60Z is in a predetermined state will input devices be conditioned to respond to their address codes. This arrangement allows the device scanner 100 to time share the bus between on-line and off-line system data transfer operations which involve input devices.

Also during each address time interval defined by function RMADTIO, the AND gate 270 is operative to force an address response function RMRRS1J to a ONE when a ready line function RMRDY00 is at a high level during a time defined by timer function RMBC310 (i.e. before the system devices sample the address code applied to the bus). This function activates an AND gate 272 which forces function RMRRS1N high which causes flip-flop 278 to be set to its binary ONE state.

It will be noted that a further address response AND gate 266 receives function RMRRS1P from an AND gate 272 which is enabled during time intervals BC510 BC610. Additionally, the AND gate 266 also receives function RMADTIO together with a ready function RMRDY10. Normally the addressed device responds to its address code by switching ready function RMRDY10 from a low to high state during time RMBC510. Accordingly, AND gate 266 forces function RMRRS1C high which sets a flip-flop 276 to its ONE state via a gate 274 forcing function RMRRS1A to a ONE. The Scanner 100 generates an address or character response pulse to a change of state in the ready line when functions RMRRS1A and RMRSS1D are both ONES by activating an address or character response AND gate 282. This gate forces function RMRRS10 to a ONE which in turn permits function RMCOLOA to force the bus control line OSB190Z low during time BC610. The control Pulse produced serves to acknowledge the device's response to the address code placed upon the bus during that ON-LINE cycle. Both flip-flops 276 and 278 are reset at the beginning of the next bus cycle by timing function RMBC100.

Another portion of the logic of FIG. 3b establishes a period of time during which only data characters will be transferred over the bus 150 during "ON-LINE" and "OFF-LINE" bus cycles. This logic includes the data flip-flop 300 which is set to its ONE state in accordance with Boolean statement: RMDAC1A=RMRRS10·RMBC81C.

The flip-flop 300 is held in its ONE state by function RMDACOB which activates a hold AND gate 308. As shown, function RMDACOB is generated by amplifier gates 302 and 304 in accordance with the Boolean equation RMDACOB=RMACT00·RMBC81C. Since this logic function is generated by the "NANDing" of functions RMACT00 and RMBC81C, the data cycle flip-flop 300 will remain in its binary ZERO state even in the presence of a set function RMRSS10 until the scanner 100 generates Device Active function RMACT10 when it detects a change in the ready function RDY00 produced by a system device in response to an address code.

Specifically, when a device responds to its address code function RMRRS10 comes high. This causes active ODCA/IDCA flip-flop 290 to switch to its binary ONE state which in turn forces function RMACT00 low. When the function RMACT00 goes low, it forces the hold function RMDACOB high. Accordingly, at the next PDA pulse, the data cycle flip-flop 300 is switched from its binary ZERO state to its binary ONE state thereby producing function RMDAC10 which defines subsequent ON-LINE cycles as data cycles.

The DCA flip-flop 300 which will be held in its binary ONE state (i.e. a data cycle) until the scanner 100 receives a release (i.e. function RMREL10=1) during data cycle time (i.e. function RMOND10=1) and/or the terminal system is initialized (i.e. function RMRST00=0 by a switch on a control panel. At that time, flip-flop 290 resets to a ZERO forcing function RMACT00 high. At time RMBC81C, data cycle flip-flop 300 will be reset to its binary ZERO state by its hold function RMDACOB being forced low which deactivates gate 308.

It will be noted that the ONE output of flip-flop 300 is applied to the driver interface circuit of bus line OSB120Z. This function is monitored by the various devices of the system and its state defines whether the information is an address code or a data character. When function RMDAC00 is high the information on the bus is to be interpreted as address code and when function RMDAC10 is high the information on the bus is to be interpreted a data character.

In FIG. 3b, during data cycle time (i.e. when function RMDAC10=1 an AND gate 262 again is activated and forces function RMRR1K high in accordance with the Boolean equation: RMRRS1K=RMDAC10·R-MOFC00+RMOFC10·RMBSY10. Accordingly, function RMRRS1K in turn activates character response AND gate 264 when the ready function RMRDY10 is high during a time defined by timer generated function RMBC310. The AND gate 264 forces function RMRRS1B high which in turn sets the flip-flop 276 to its ONE state.

When all of the devices have accepted the data character applied to the bus information lines, ready function RMRDY00 switches from a low to a high state. This in turn forces function RMRRS1E high which forces function RMRRS1N high, and switches flip-flop 278 to its ONE state. As described above the functions RMRRS1A and RMRRS10 together activate the AND gate 282 which in turn forces function RMRRS10 high. This activates gate 298 during time defined by timing function RMBC610 and produces a control pulse which is thereafter applied to bus line OSB190Z as shown in FIG. 3. The control pulse produced acknowledges the device's responses to their acceptance of the data character placed on the bus to the input device.

In summary, the scanner 100 generates address and character responses via the data cycle time and address cycle time AND gates 262 and 272 as results of changes in state of the function RMRDY00 which causes the appropriate conditioning levels to be applied to the character response gates 264 and 268, and address response gates 266 and 270 respectively.

SCANNER NORMAL RELEASE LOGIC-FIGURE 3c

When the system operates in the transaction (block) mode, the device scanner 100 is operative to detect the presence of a specially coded data character, an End of Text (ETX) character, which normally defines the end of a data block or segment. When all of the various devices of the system acknowledge receipt of the ETX character from the bus by causing a change in state in ready function RDY00 the scanner 100 generates a logic level on line OSB140Z which releases the input devices which had been transferring data characters from the bus 150. The scanner 100 then increments its address counter 214 by one to the address code of the next input device to be addressed.

Referring to FIG. 3c, it will be noted that when the above mentioned transaction code is selected by placing the BLOCK/BATCH switch on the control panel to the BLOCK position it forces function RMBAC10 high. The AND gates 353 and 255 which comprise a decoder 352 will be enabled to decode the bits of an ETX character when received via bus lines 1L1 through 1L8. The function RMALT10 is a ONE when a flip-flop 372 switches to a ONE as follows. An Allow ETX Response AND gate 370 is forced to a ONE in accordance with the Boolean equation: RMALT1A=R-MACT0A·RMACT10·RMINR00·RMBC710. The function RMINR00 is a binary ONE when the scanner 100 is operating in other than a device polling mode/selection mode as described herein below. Accordingly, the function RMALT1A in turn sets an allow ETX response flip-flop 372 to its ONE state thereby forcing function RMALT10 to a ONE.

As shown in FIG. 3c, the function RMALT10 is applied as an input to a pair of AND gates 356 and 374 which generate the functions RMCOL1B and RMETX1B respectively. The function RM1L810 is a ONE when the parity bit of the ETX character is a ONE indicating correct parity. The function RMETX1B together with RMETX1A sets a Normal Release Enable flip-flop 380, to its binary ONE state.

The AND gate 366 which produces RMETX1A, as shown, receives the two input functions RMCOL1D and RMOND10. An On Line Data Time function, RMOND10, comes high when an AND gate 312 of FIG. 3b is activated during data cycle (i.e. function RMDAC10 = 1) and during an ON-LINE bus cycle (i.e. function RMOFC2A = 1). The AND gate 364 forces function RMCOL1D to a ONE when an ETX character taken Response function RMCOL1B comes high at a time defined by function RMCOL1C which comes high at the end of PDA pulse when flip-flop 362 switches to its ZERO state. Accordingly, functions RMCOL1B and RMCOLOC condition AND gate 364 to generate function RMCOL1D which is a clock pulse in width. This function when ANDed with function RMOND10 enables AND gate 366 to force the function RMETX1A to a ONE.

As mentioned above, the function RMINR00 is a ONE when the terminal operates in other than a device polling or selection mode. However, when the terminal operates in these modes, the logic block 397 will be operative to force function RMINR00 to a binary ZERO thereby inhibiting the scanner 100 from responding in the manner described above when it detects a ETX character applied to the bus. In particular, the function RMINR00 is forced to a ONE when a flip-flop 398 is in its ZERO state. From FIG. 3c it will be noted that the flip-flop 398 is forced to a ONE when the address code placed on the bus is all ZEROS and a device responds to this code by forcing function RMRRS10 to a ONE. This will in turn cause flip-flop 398 to be set to its ONE state then hold function RMINR1A is in its ONE state. As shown, function RMINR1A is forced to a ONE in accordance with the following Boolean equation:

RMINR1A = RMACTOA · RMDAC10 + RMACTONA · RMIL700

The function RMACTOA, generated by the logic circuits of FIG. 3c, is normally a ONE subsequent to the system being initialized until either the system is cleared, the device is released, or an IDLE condition is generated. Accordingly, during an address cycle, the function RMINR1A will be a ONE when bit 7 of the address code placed on the bus is a ZERO indicative of a request for data in contrast to status request. And, during the data cycle, function RMDAC10 is a ONE, function RMINR1A will remain in its ONE state until function RMACTOA is forced to a ZERO.

As explained herein, the function RMINR10 will not be switched to a ONE in the absence of the device responding to the ZERO address code applied to the bus 150. Accordingly, the function RMINR00 is forced to a ONE which in turn forces flip-flop 372 to its ONE state when the address input device responds to its address code by forcing function RMACT10 to ONE.

As mentioned previously, functions RMETX1A and RMETX1B enable AND gate 376 which switches the Normal Release Enable flip-flop 380 to its ONE state. This flip-flop remains in this state until its hold gate 378 is deactivated by function RMREL00 being forced low. The function RMREL00 goes low when either the release flip-flop 392 is switched to its binary ONE state or an input device generates a release response by forcing line OSB140Z to a ONE. The flip-flop 392 switches to a ONE when the RMETX1F of the Normal Release flip-flop 380 comes high which activates an AND gate 382. This gate forces the output function RMRLL1B high via AND gate 388 switching the release RMRLL flip-flop 392 to its binary ONE state. This in turn forces the output function RMRLL10 of AND gate 394 high which is inverted by a gate buffer inverter 396 and applied to line OSB140Z as function RMREL00. The input device which was transmitting data characters to the bus 150 will release itself in response to the change in state in this function as described herein. The next major areas of the system include the Device Control Area (DCA), which will now be described.

IN GENERAL

As illustrated by the system block diagram of FIG. 1, each device has a peripheral control unit termed a DCA which has a GDCA which includes logic for a standard interface between the DCA and bus 150 and a buffer memory. As shown by FIG. 1, the system includes several different types of device control areas and these are labeled IDCA, ODCA, and I/ODCA.

An IDCA provides logic, buffer storage timing and interface circuits for communicating with the terminal bus 150 and controlling the operation of its associated input device. In particular, an IDCA includes logic operative to transfer information character via its general device control area (GDCA) to the terminal bus for receipt by an output device or through the COMM DCA to either another remote transmission terminal or to a data processing system. Accordingly, an IDCA performs the following functions:

decodes and recognizes an address wired therein when applied to the bus 150 by the terminal scanner 100; acknowledges the receipt of an address code via a switching of ready function RMRDY00;

loads a first data character from its associated buffer register on to the bus 150 and thereafter generates a data line signaling same;

places a next character into its buffer register upon detecting a predetermined control pulse (RMCON00);

reads, transfers and ignores predetermined characters and;

switches to an inactive state in response to a level placed on the release line by the device scanner 100 when it detects an ETX character on the bus.

Output Device Control Area (ODCA)

The ODCA similarly provides timing, storage, logic and interface circuits for transfers between the standard bus and its associated peripheral device. It performs logic functions comparable to the IDCA with the exception that it performs them for an output device. Therefore, the ODCA accepts a data character when the device scanner places a bus strobe on the appropriate line and it signals via ready line function RMRDY00 when it is conditioned to receive the next character and thereafter stores the received data character in its memory.

Input/Output Control Area (I/ODCA)

The above unit can be considered as a combination of an IDCA and ODCA. It is used as both an input device control area and an output device control area. Whether it operates as either an input or output device is established by the state of bit 6 of the device address code placed on the bus together with the setting of an associated function switch. In particular, when bit 6 is a binary ONE, the I/ODCA will function as an IDCA. And, when bit 6 is a binary ZERO, it operates as an ODCA.

General Device Control Area (GDCA) Logic

Figure 7:
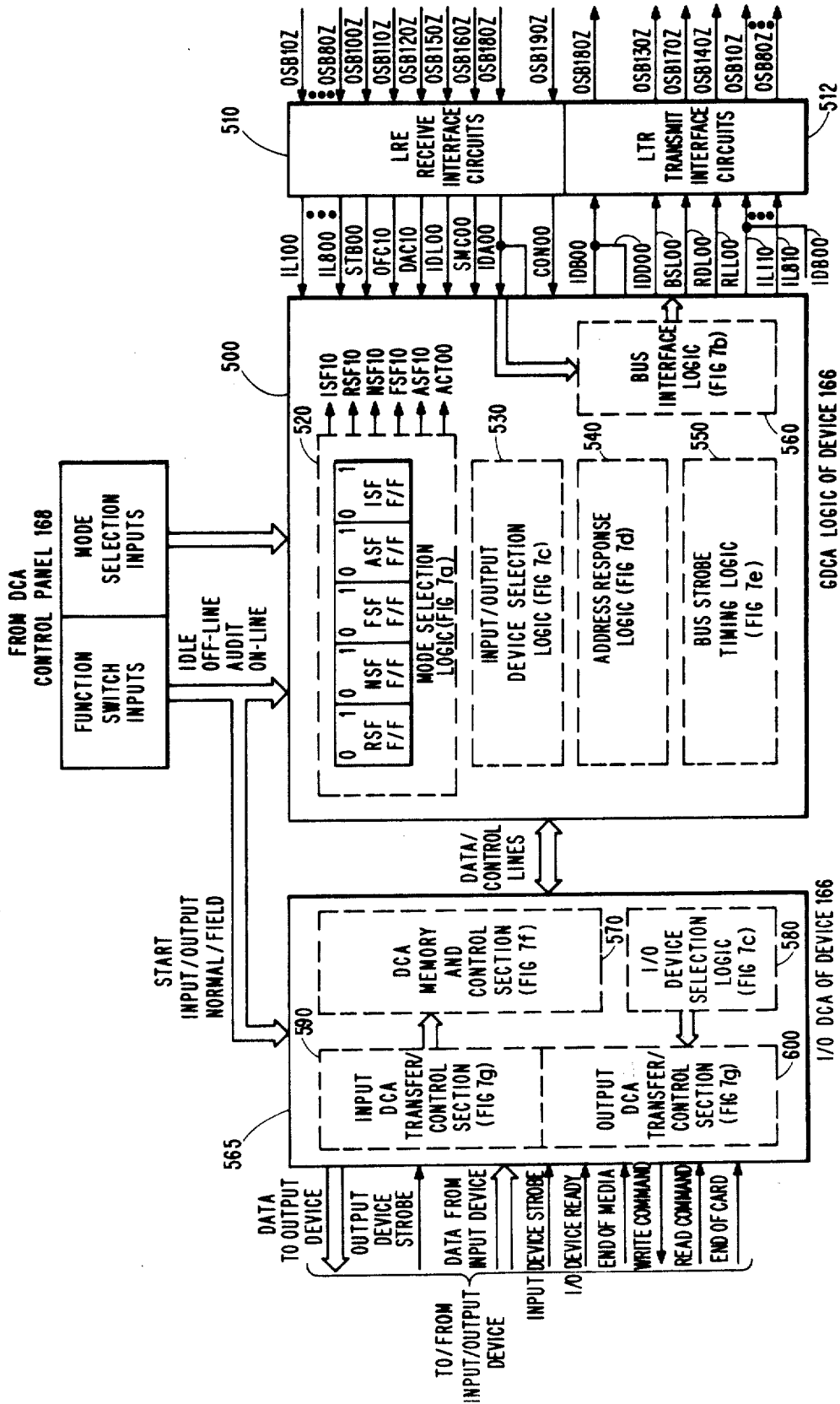
FIG. 7 is a blocked diagram of one of the device control areas of FIG. 1.

Each DCA, as mentioned, has a GDCA section which provides a uniform logic interface to the terminal bus 150. FIG. 7 illustrates in block form the pertinent sections of the GDCA logic. As shown, the GDCA includes a MODE Selection State Logic Section detailed in FIG. 7a, an Address Response Logic Section detailed in FIG. 7a, Input/Output Device Section Logic detailed in FIG. 7c, Bus Strobe Timing Logic detailed in FIG. 7e, and a Bus Interface Logic detailed in FIG. 7b.

In some instances, the logic of the various portions of a DCA has not been separated as this would require additional references to other Figures. Therefore, the following mnemonic prefixes have been used for logic functions generated by the various portions of the system for denoting that portion which generated same. The prefixes used are:
  OS=Standard Bus Signal Lines;
  IF=GDCA Internal Logic Functions;
  IG=GDCA to Bus or to Control Panel Interface Logic Functions;
  IH=Bus to GDCA Interface Logic Functions;
  RX=DCA Logic Functions; and,
  RP=Peripheral Device Logic Functions.

MODE SELECTION LOGIC OF FIG. 7a

General Description of Device Operational Mode

It will be noted that FIG. 7a discloses the storage and the logic which establishes the various operating modes, as well as states, for a GDCA.

The GDCA can operate in one of several modes depending upon the position of a control panel mode selection switch and bus conditions. A mode switch is associated with each peripheral device. With the mode switch in conjunction with a START button, an operator can select among the operating modes available to a particular device. These modes are defined by the states of clocked synchronous flip-flops of FIG. 7a. These flip-flops may be arranged to drive indicator lights which display the status of each of the devices operating. The operating modes and states and their respective functions are:

|  | Modes | Functions |
|---|---|---|
| (1) | Idle | =IGISF10; |
| (2) | Ready | =IGRSF10; |
| (3) | On-Line | =IGNSF10; |
| (4) | Off-Line | =IGFSF10; and |
| (5) | Audit Trail | =IGASF10. |

Figure 4:
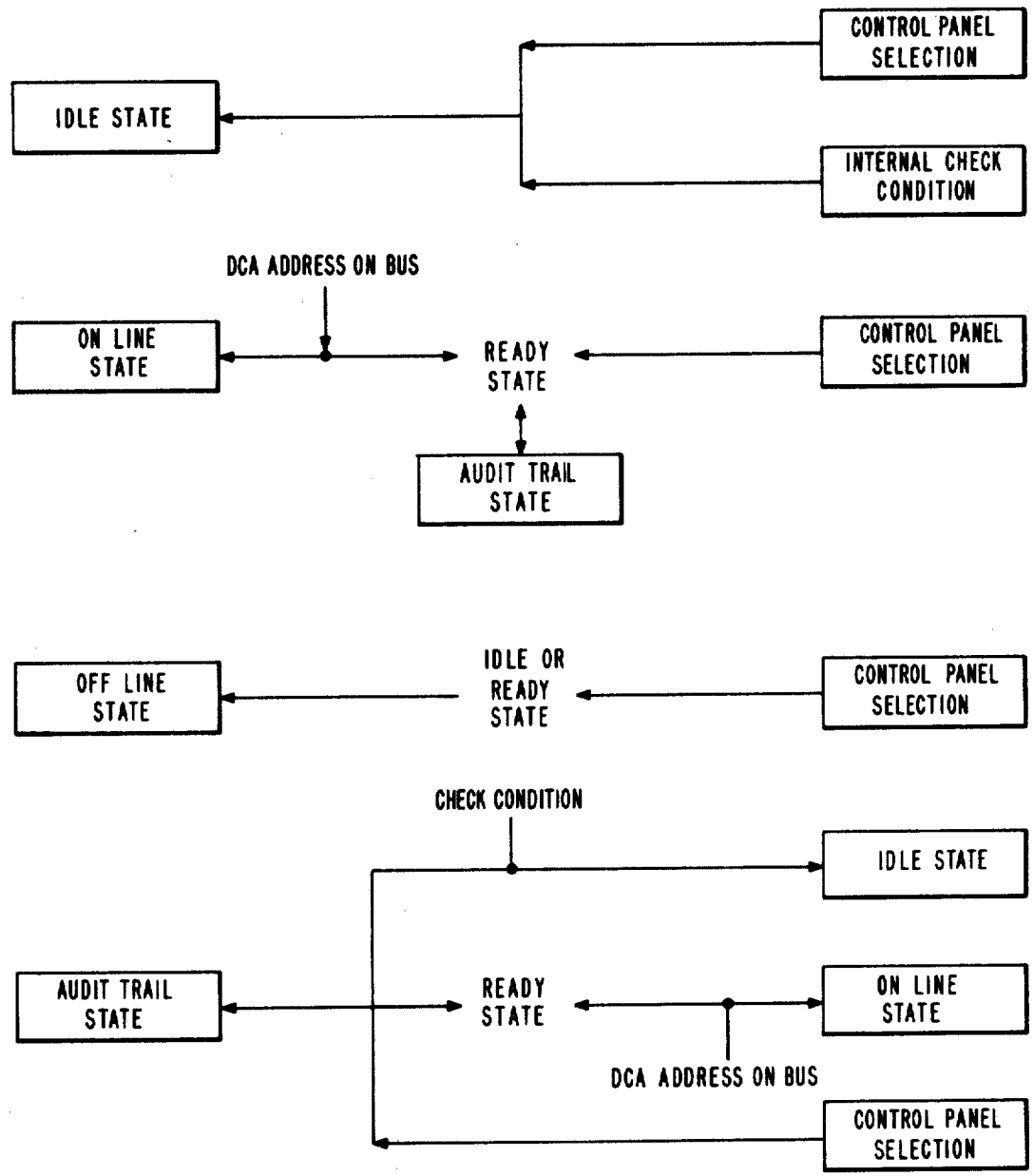
FIG. 4 is a flow diagram illustrating the operating state selection of a typical device controller of FIG. 1.

The sequence of states for establishing the operating modes for the various DCA's are illustrated in the flow diagram of FIG. 4. With reference to this Figure, the operational states will now be described briefly. The GDCA switches to the idle state when an operator manually selects the idle position on the control panel mode switch or the GDCA detects an internal check condition. When a device is in the idle mode, AC power is removed from the device and the device is unavailable for either on-line or off-line processing. Hence, while in the idle mode, the device can be considered as being in an inactive state. Accordingly, when addressed, the device will signal busy via bus line OSB13OZ.

By contrast, when in the on-line, off-line or audit trail, the device can be considered in an active state.

Prior to entering the on-line mode, the device first switches to the ready state. This state is an intermediate state which is entered when the operator sets the mode switch to the On-line position and depresses a START button. Also, as FIG. 4 illustrates, the GDCA switches to this state when it completes a data transfer when it receives a normal release from the scanner 100. When in this state, AC power is applied to motors associated with the device. This state permits the device to be polled or selected via its GDCA prior to entering the on-line mode. That is, with a function switch set to the on-line position the GDCA upon detecting its address code will switch to the on-line mode.

As mentioned, the GDCA switches to the on-line operation state when it detects its address code on the bus. Additionally, the device may enter the on-line state from the audit trail state when the mode selection switch is in the audit position and the device's address code appears on the standard bus as indicated by FIG. 4.

In the on-line mode, the IDCA/ODCA transfers and accepts respectively data and control characters only during ON-LINE bus cycles.

As FIG. 6 illustrates, the GDCA may terminate on-line mode operation under the following conditions:

1. When the device scanner 100 generates a level on the release line and the DCA generates a ready signal, the DCA switches from the on-line to the ready state;

2. In response to internal check conditions or upon the receipt of a release from an input device, the DCA switches from an on-line to the ready state; and, 3. When the DCA receives a release signal and generates a ready response, it switches from the on-line state to the audit trail state.

Similarly in the off-line mode, the IDCA/ODCA transfers and accepts respectively data and control characters only during the OFF-LINE bus cycles.

Ad indicated by FIG. 4, the DCA enters the off-line state when the mode switch manually selects the off-line position while it is in either the idle state or ready state. Also, upon receipt of a ready signal followed by a bus release signal, the DCA when in audit trail state switches to the off-line state. The GDCA terminates the off-line state when another state is selected by the mode switch and when the DCA generates a ready response. While, in this mode, an IDCA can transfer data to one or more ODCA's and their associated devices when each ODCA is set to the off-line mode.

Additionally, when in the audit trail mode, output devices through their respective ODCA's can monitor and accept all data characters which are applied to the bus. This state is manually selected and is only utilized by output device control the areas (ODCA's) and their associated devices. And, when its address code appears on the bus, the ODCA responds with a ready signal and then enters the on-line state. The mode switch may be used to switch ODCA from the audit trail mode to any other operational mode. Switching occurs when the ODCA receives a ready signal from its device.

The ODCA will switch from the on-line state to the audit trail mode following its receipt of a release response and a ready response from the bus. Also, the ODCA will terminate operating in the audit trail mode upon sensing a check or error condition at which time it will switch to the idle mode.

FIG. 5 shows in greater detail, the pertinent control functions, their states and changes therein for the above-mentioned change in modes. These functions provide inputs to the logic and state storage of FIG. 7a. They will be discussed in greater detail with respect to this Figure.

Bus Interface Logic Section-FIG. 7b

This section includes the Bus Input Data Line transmit logic block 751 for input and output devices respectively. The transmit logic shown in block 751 includes a pair of gates inverter amplifier gates 752 and 756 operative to generate functions IFIDB00 and IFIDD00 for an input device as defined by function IGINPIO as described herein. When an input device places a character on the bus 150, it forces functions IFIDB00 and IFIDD00 low. This forces line OSB180Z to a ZERO which enables the IDCA to apply a data character from its memory to the bus lines OSBO10 through OSBO90.

The logic of block 761 generates a transfer function IHSTL10 for an output device in response to function IFIDA10 being switched to a predetermined state. In particular, when an active IDCA transfers a data character to the bus lines, it forces the Input Data Line function IFIDA10 high by forcing line OSB180Z to a ZERO. The function IFWBT10 comes high in accordance with the Boolean equation: IFWBT10=IFDRF1CE.IFOFC00+IGFSF10·IFOFC10. This function defines the "working bus time" for each ON-LINE and OFF-LINE bus cycle during which the actual data character transfer occurs within each DCA.

The bus data line receive logic 761 for an output device in response to the presence of function IDA00, forces function IGST10 high by activating an AND gate 762 which in turn generates transfer function IHSTLIO when output device functions RXPOSIO, RXCLDOO and RXPDYIO are all ONES. The Boolean equations for each of these functions are given in the FIG. 7b.

Further, this section includes logic of blocks 770 and 780 for generating a bus busy response and ready response on bus lines OSB130Z and OSB170Z respectively. A state of the function applied to line OSB170Z indicated whether the addressed DCA has been activated. The DCA devices when addressed in a ready or audit trail state respond by changing the state of ready function IFRDYLOO. In particular, amplifier gates 778 and 786 together with flip-flop 784 condition bus lines OSB170Z via inverter amplifier gate 782 to signal a ready upon decoding its device's address code applied lines IFIL100 through IFIL600. The function IFBSR1A generated by an AND gate 788 comes high when there are no check or error conditions (IFCHH00=1), during an address cycle time (IFDAC00=1) portion of an ON-LINE CYCLE (IFOFC00=1) and when its address response (ARF) flip-flop 982 of FIG. 7d is set to its one state (IFARF10=1). If the device is in either its ready state (i.e. IGRSF10=1) or audit trail state (i.e. IGASF10=1, function IFARL10 comes high in turn switching flip-flop 784 to a binary ONE. This in turn forces function IFRDL00 from a high to a low state and this function is applied to line OSB180Z. The ARL flip-flop 784 switches to a ZERO during the following OFF-LINE cycle (i.e. function IFOFC00=0).

The GDCA logic 780 also generates a ready response for an output device via OSB170L via gates 792 and 790. That is, the response is generated for each data character accepted by a selected output device (IFDRL1A=IGOUT10), during the working bus time (IFWBT10=1 of a data cycle (IFDAC10=1) when the ODCA previously in a condition of ready to receive a data character (IFDRF10=1) completes writing the data character from the bus 150 into its memory (IFDRF10=0. This causes function IFRDL to be switched from a high to low state switching the ready line from a high to low state. Also the logic 780 includes a transfer gate 794 which enables the IDCA of a selected input device to apply a data character read from its memory to the bus. That is, when the DCA is selected to operate as an input device (ISINP10=1) and has read a data character from its memory (IFDRF10=1, it will activate an AND gate 794 to force output to transfer frunction IFOTB1A high. This enables the IDCA to apply a data character to the bus 150.

When the DCA is in either an off-line or idle state as defined by functions IGSF10 and IGISF10 respectively, it will generate function IFBSR10 via an AND gate 778 which in turn forces bus line OSB130Z low. This allows the device to respond busy when the scanner 100 places its device address code on the bus. Additionally, the GDCA also generates a busy response via gates to the address code of an input device (IGINP10=1) when the input device is in the off-line state (IGFSF10=1).

Another group of logic FIG. 7b includes a Normal Release Memory flip-flop 806 with associated logic gates. The one output of this flip-flop is fed to the mode state logic of FIG. 7a and will cause the state of the active DCA to be changed when the functions IFREL00 and IFIDL00 are forced to predetermined states by either the device scanner 100 or the active DCA itself.

In greater detail, when the release function IFREL00 is forced low it activates an AND gate 810 which produces function IFNRM10. And, during an ON-LINE bus cycle (IFOFC00=1) upon the receipt of a strobe pulse (IGSTB3C=1), IFNRM flip-flop 806 switches to its binary ONE state. This forces function INFRMIO high which in turn forces function IFNCRIO high by activating a pair of gates 804 and 802.

An AND gate 828 is activated during on OFF-LINE cycle to switch flip-flop 806 to its ZERO state when its associated DCA has been switched to the idle state (IGISF10=1, or the audit trail state (IGASF10=1) or to the ready state (IGRSF10=1). Switching is accomplished when the above functions force function IFNRMOC to a ZERO which inactivates the hold gate of flip-flop 806.

Last group of logic in this section includes the group of gates and a flip-flop 846 of block 840 which feed bus line OSB140Z. The device DCA uses this line to indicate a termination of input data transfer when it is out of media (e.g. out of forms/cards or reached an inter-record gap). When this occurs, function IHOOF10 comes high when the device DCA is operating in the On-Line state (IFNSF10=1). This causes RLF flip-flop 846 to switch to a binary ONE. During an on-line cycle (IFOFCOO=1), the selected input device (IGINP10=1 forces function IFRLL1O high by activating an AND gate 844 in turn forcing the bus line OSB140Z low via an inverter gate 842. This signals that the DCA is releasing its input device from the bus 150.

The logic circuits which process signals from its associated input device as for example a card reader, indicating when it is out of media (e.g. cards) are also shown in block 870 of FIG. 7b. Here, the card, reader device generates a function RPOFFOO when it senses a hopper empty condition establishing the above mentioned out of media indication. Referring to this Figure, it will be noted that an out of form (IHOOF) flip-flop 890 is initially switched to its ZERO state by an initialize function RXSTA30 when the device DCA is in its idle state (IGISF10=1). Accordingly, upon receipt of the out of media function RPOFFOO from the card reader device, IHOOF flip-flop 890 switches to its binary ONE state when the last character stored in its memory (RXFOD10=1) applied to the bus 150 has been accepted (IGNEC10=1) by all of the output devices. In greater detail, a function RXOFB10 when ANDED with RXOFF10 by gate 886 forces the gate 886 output high switching flip-flop 890 to its ONE state.

When IHOOF flip-flop 890 switches to a binary ONE, function IHOOF10 comes high and activates an AND gate 848 producing function-IFRLF1A which sets RLF flip-flop 846 to its ONE state. Thereafter, in the manner described above, the bus logic 840 is conditioned to generate the release function via bus line OSB140Z.

Input/Output Device Selection Logic of FIG. 7c

This logic is shown as block 960 in FIG. 7c and determines whether its associated I/O device is to operate as an input device or as an output device during ON-LINE and OFF-LINE bus cycles. As shown, this is established by pairs of jumpers 945 and 966 and the position setting of the Input/Output device function switch on the I/O Device's Control Panel.

When the I/O DCA is selected to operate as an IDCA, the Panel Function switch and jumpers function place IFOUT1J at a binary ZERO and function IFINP1J at a binary ONE. The IDCA is activated in either the idle state IGISF10=1 during an OFF-LINE cycle (IFOFC10=1) when a Bus Strobe (IGSTB1C) is present. Specifically the ANDing of functions IFOFC1O, IGSTB1C, and IGISF1O force function IFINP1B to a ONE which sets Allow Active as Input DEvice (IGINP) flip-flop 942 to its binary ONE state. At the same time, an inverter gate 964 inverts the high output of jumper card 966. This inhibits an Allow Active as Output Device (IGOUT) flip-flop 962 from being switched to its one state during the same OFF-LINE cycle. The I/O DCA is selected to operate as an IDCA from a remote source, e.g. the COMM DCA, as follows. [It will be noted that the Function switch position for IDCA and ODCA remote selection causes both functions IFINP1J and IFOUT1J to be binary ZEROS.]

When the IDCA is in its on-line state (IGNSF10=1), an AND gate 946 become s active forcing function IGREM1O to a ONE when neither flip-flop 942 nor 962 are in a ONE state, this causes IGINP flip-flop 942 to be switched to its ONE state when bit 6 of the device address code is a ONE (i.e. IFIL610=1) as mentioned.

When the I/O DCA is to operate as an ODCA, the jumpers are wired in an opposite fashion so that during an OFF-LINE cycle, the IGOUT10 flip-flop 962 is set to a ONE in accordance with the equation: $IGOUT1O = IFOFC1O \cdot IGSTB1C^{IGISF10} \cdot IFINPOA$ in a similar fashion.

As concerns remote selection, when the DCA is in an on-line state, IGOUT flip-flop sets in accordance with the equation:
$IGOUT1O = IFNSF1O \cdot IFIL600 \cdot IGREM1O$. That is, when the DCA is in its ready state IGOUT flip-flop sets to its ONE state when bit 6 of the address code is a binary ZERO.

Some of the logic of Input/Output Selection Logic discussed above feeds the input/output logic of the I/O DCA shown as block 900 in FIG. 7c. This logic includes Data Ready for transfer IHDRY flip-flop 906 and associated logic in addition to a Device Ready (IDFRF) flip-flop 920. The IHDRY flip-flop 908 switches to its ONE state under several conditions. These include when the DCA is selected by an operator to operate as an output device (IGOUT10=1) or the selection is remote wherein both input (IGINP) and output (IGOUT) flip-flop 940 and 962 are reset to ZEROS which forces function IGREM1O to a ONE, one of these function actuates a gate 910 forcing function RXDRA1O to a ONE. And, when either the peripheral device signals that it is ready (RXRDYOO is forced to a ZERO) and that certain control characters ETX, RS, or EM, have not been transferred to the bus or that the eighieth memory location has not been addressed (i.e. RXEOM1O=0function RXPDY10 is forced to a ONE. These functions switch flip-flop 908 to its ONE state.

Additionally, IHDRY flip-flop 906 will also be switched to a ONE by functions RXDOC1O and RXDAR10. The function RXDC10 comes high when an AND gate 916 is active as a result of the DCA being selected by an operator to operate as a card reader input device (IGINP10=1) and that either input device is not transferring data characters to the DCA memory or has completed its transfer (i.e. RXRSOOO=1) wherein data characters are being read out to the bus from memory. The function RXDOC1O together with function RXDAR1O which comes high at bit time 10 when bit 10 is a binary ONE (when the device function switch is in field position) or a bit time 8 (when the function switch is in a normal position) during a normal read data cycle, sets IHDRY flip-flop to its ONE state.

When flip-flop 906 is a ONE, an AND gate 904 forces a Device Ready to Data transfer function (IFDRD1O to a ONE) provided that there are no check or error conditions present (IGCHOO=1). The IHDRY 906 flip-flop is reset by function RXDRY4O which is forced low by a gate inverter 912 when the system is initialized (RXSTA1O (RXSTA1O=by either the start button on the control panel (IGEXC1O=1) or by being released (IGRLF1O·RXROS1O) or when the scanner 100 generates a response via IFCONOO which forces function IGNEC1O high.

For an input device on-line transfer when the DCA is in its on-line state (i.e. function IFDRF1C=1) the flip-flop 920 switches to its ONE state each time its DCA has a character ready to transfer from its memory to the bus. That is, when functions IFDRD1O and IFINP1O are ANDed by an AND gate 918, function DRF1A comes high and sets flip-flop 920 at a time defined by functions STB3C and IFOFC1O (i.e. at strobe time IGSTB3C during an OFF-LINE cycle) when a flip-flop 922 is switched to its ONE state by these functions.

For an output device on-line transfer when the DCA is in either its on-line or audit trail state (i.e. function IFDRF1C=1) the flip-flop 920 switches to its ONE state when the gate 918 ANDing IGACT1O.IGOUT1O IGOUT1O forces function IFDRF1A to a ONE.

For off-line data transfer for both input and output device transfers, the flip-flop 920 switches to its ONE state via gate 918 which is activated under the conditions mentioned above when its DCA is in an off-line state (IGFSF1O=1), when function IFFCD1O is a ONE.

The function IFFCD1O generated by the block 910 of FIG. 7c comes high during an ON-LINE bus cycle in accordance with the equation: IFFCD1O=IGSTB3C ·IFOFCOO.

It will be noted that DRF flip-flop 920 resets to its ZERO state under four conditions. These are (1) when the system is initialized (IFRST1O=1), (2) when its DCA is either in the on-line or audit trail state (DRF1C = IFNSF1O+IFASF1O·IFDAC1O) and the scanner 100 signals that a data character has been accepted by all output devices (i.e. IFDRF1C·IFNEC1OIFNEC1O· IFFCD1O=1), (3) when its ODCA is in the off-line state (IFFSF1O=1) and a character has been accepted (IGNEC1O.IFNCD1O) and (4) by functions DRFOC and DRFOG which come high when there are no checks (IFCHHOO), the DCA is in its on-line state (IGNSF1O), it is selected to operate as an output device (IGOUT1O) and the character on the bus has been written into memory (IHCTN1O=1). As shown, the function DRFOC comes high in accordance with the equation: DRFOC=THCTN20·IFOUT1O·IFF-CO1O. The so called character taken function IHCTN1O=RCXCLD1ORXFSB1O·RXFSB1O. The function IHCTN1O is a ONE when the character has been transferred from the bus (RXCLD1O=1), a memory read/write cycle has been initiated (RXLMR1O=1 and a final bit count has been reached (RXFSB1O=1. And, the function IFDRFOG comes high in accordance with the equation: IFDR-FOG=IFDRDOO+IFCHHOO.

GDCA Address Response Logic of FIG. 7d

The address response logic as shown in block 980 of FIG. 7d includes a jumper card 998 and an Address Response IFARF flip-flop 982 and associated logic gates. The jumpers on the card 998 are wired so as to assign a unique device address code to each DCA. When an address code on the bus corresponds to the GDCA wired-in address code, as decoded by AND gate 997, function IFADD1S comes high.

During the address portion (DACOO=1) of an ON-line cycle (IFOFCOO=1), the function IFADD1O comes high when an AND gate 990 is activated by the I/O Device Selection logic blocks 940 and 962 of FIG. 7c which signals either the remote or operator selection of an input or output device by generating either function IGREM1O of function IFADD1Y. This in turn sets flip-flop 982 to its ONE state during an address cycle (IFDACOO=1) of an ON-LINE cycle (IFOFCOO=1) when the bus strobe function IGSTB3C is a ONE provided the addressed device is not busy (IFBSYOO=1).

However, when the DCA is in either the off-line or idle state, the GDCA will force function IFBSY0O to a ZERO which prevents the address response flip-flop 982 from being switched to its ONE state.

Figure 7E:
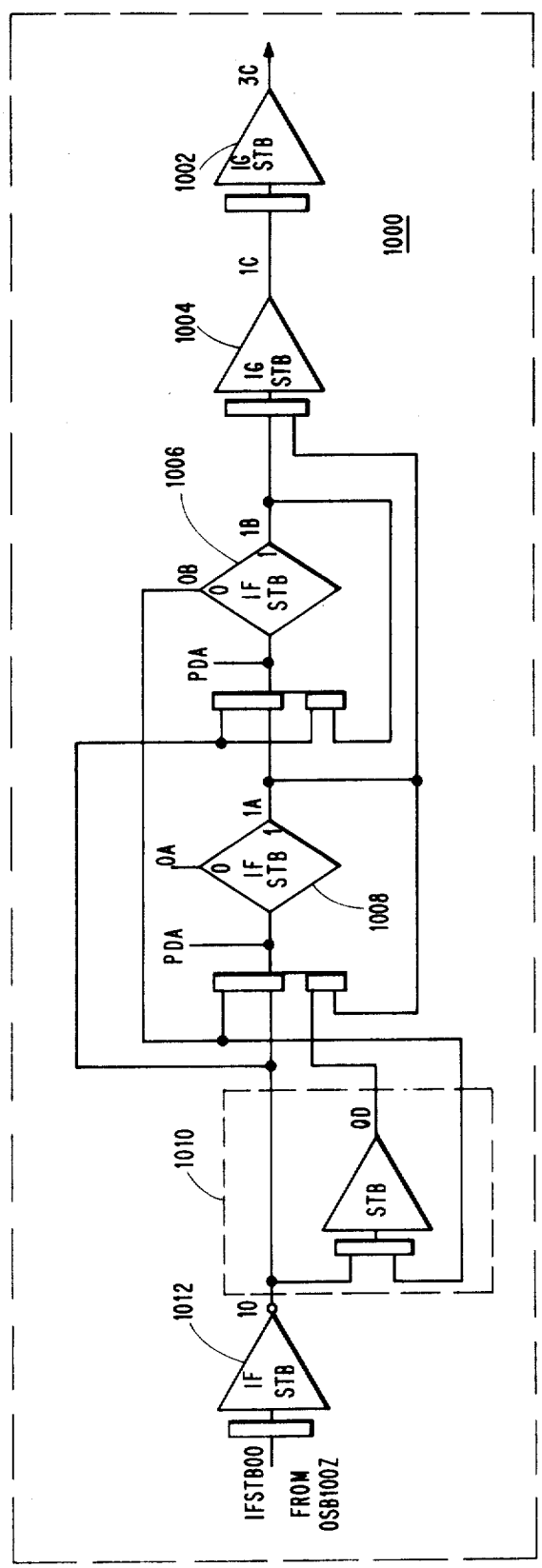
FIG. 7e shows in greater detail the bus strobe timing logic section of FIG. 7.
Figure 7L:
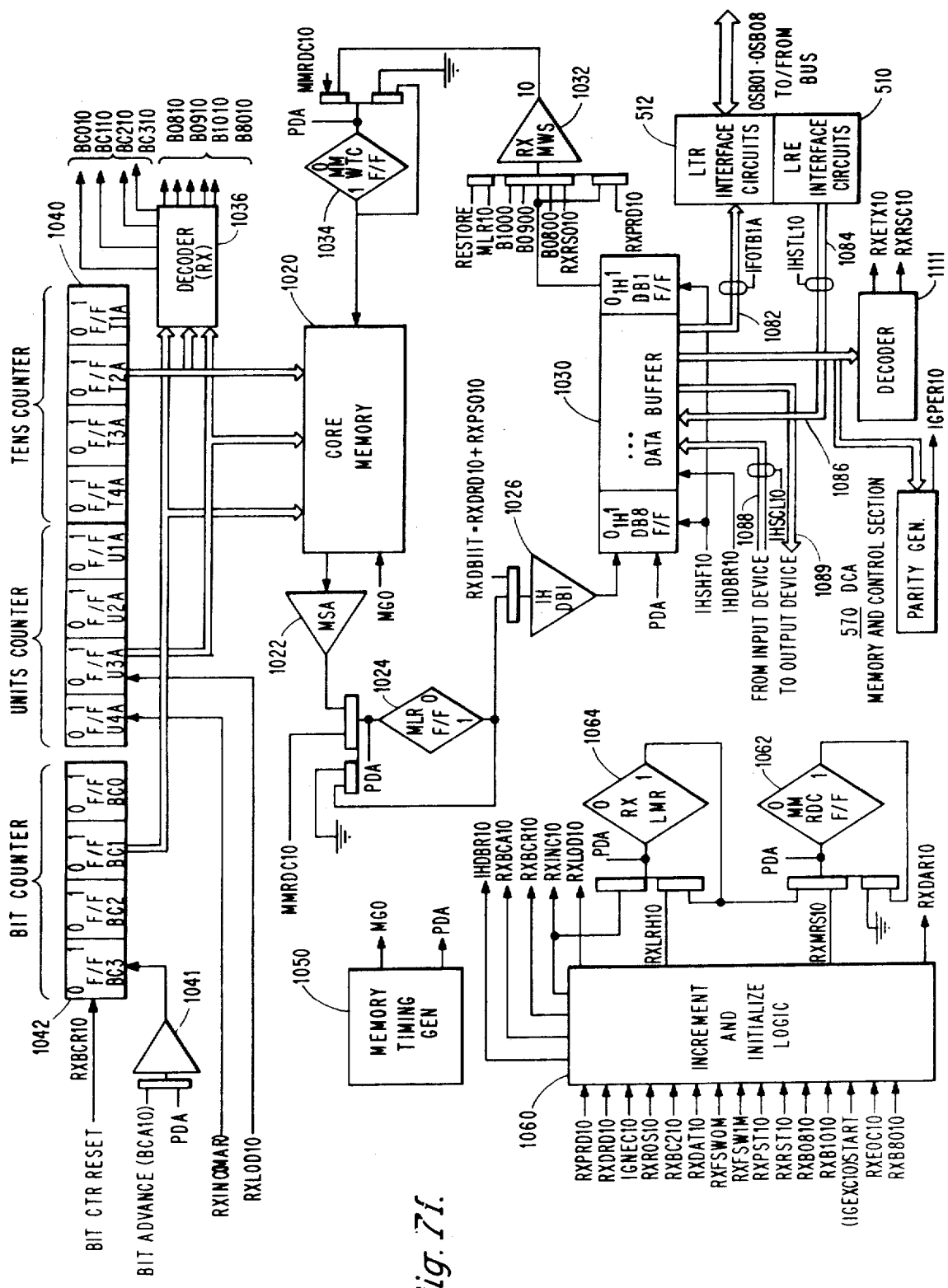
FIG. 7a shows in greater detail the mode selection Logic Section of FIG. 7.
FIG. 7b shows in greater detail the bus interface Logic Section of FIG. 7.
FIG. 7c shows in greater detail the input/output device selection logic section of the general device control area and input/output device control area of FIG. 7.
FIG. 7d shows in greater detail the address response logic section of FIG. 7.
FIG. 7f shows in greater detail the memory and control section of FIG. 7.

Bus Strobe Timing Logic of FIG. 7e

FIG. 7e discloses the logic included within block 1000 for generating strobe pulses for synchronizing the various data transfer operations performed by the GDCA and DCA logic in accordance with the ON-LINE and OFF-LINE cycles generated by the device scanner 100. As shown, this logic includes flip-flops 1010, 1008 and 1006 and associated logic.

The scanner generated strobe pulse STBOO derived from scanner timing function BC510 and applied from bus line OSB11O is inverted by an inverter 1012 and applied as function IFSTB1O to the inputs of flip-flops 1010, 1008 and 1006. The leading edge of pulse IFSTB1O switches, flip-flop 1008 to a binary ONE during a next PDA pulse. When flip-flop 1008 sets, it forces function IFSTB1A to a ONE which switches flip-flop 1006 to a binary ONE upon the occurrence of the next PDA pulse. The trailing edge of same PDA pulse also resets flip-flops 1008 and 1010 to their ZERO states. An AND gate 1004 develops strobe pulses IGSTB1C and IGSTB3C during the time that both flip-flops 1008 and 1006 are set to binary ONES. Accordingly, these pulses are a PDA pulse in width and normally occur at an interval midway through each ON-LINE and OFF-LINE cycle. A cycle of operation is completed when flip-flop 1006 resets to a ZERO at the trailing edge of the bus strobe pulse IFSTBOO.

Device Control Area

For the purpose of the present invention, the pertinent portions of device control area of FIG. 7 for an input/output device are disclosed in greater detail in FIG. 7f and 7g. It will be appreciated that the device control area (DCA) of either input device or output device is essentially equivalent to the logic blocks 570 and 600 respectively of the I/0 DCA of FIG. 7.

The memory system and control logic will only be described herein to the extend necessary for understanding the operation of the present invention. For further details, the co-pending patent application of Robert E. Huettner and Edward R. Tymann titled "A Remote Terminal System" may be consulted.

COMM DCA

General

The COMM DCA of the remote terminal system of FIG. 1 operates utilizing communication control procedures and codes including synchronization characters which conform in both bit configuration and interpretation to USACII control procedures and codes. For further details as to the control procedures and codes reference may be made to a document titled USASCII document X3.3.4/212. Proposed control Procedure, published September, 1968.

The message sequences pertinent to the invention can be classified as performing three types of operations. These include establishing connection between a remotely located data processing system and the terminal, the actual data transfer operation, and supervisory functions relating thereto.

Establishing Connection

Briefly, connection between the COMM DCA and the devices of the terminal system is accomplished either in a polling or selection mode. The polling and selection messages are distinguished by the interpretation of a second address character. For polling messages, the second address character represents the address code of an input device and for selection messages the second address character represents the address of an output device. The coding of a predetermined bit position of this address character designates whether this address is to be interpreted as an input or output device address. Specifically in accordance with the preferred embodiment, a ONE in the sixth bit position of the second address character indicates an input address while a ZERO in this bit position indicates an output address.

The second address character also is coded to distinguish between multiple and single device polling messages. In particular, for multiple device polling, the second address character is ZERO. That is, the second address character is coded in accordance with the USASCII code for ZERO. By contrast, for single device polling, the second address character is assigned any other than the ZERO code. With respect to a request for status of an input or output devices, a predetermined bit position of the system address character is set to a predetermined state and the second character is coded as mentioned previously.

Data Transfer

When a poll message is accepted, the terminal will respond by transmitting either a status reply or by sending a first block of data. The first block will include a heading containing the system address of the terminal, the device address followed by the message text, a terminating character, and a block check character. Where the data block is less than the capacity of the buffer memory, an ETX character is used to terminate message. If the message is to be sent as a series of blocks, an ETB character is used to terminate all blocks except the last.

As described herein, it will be noted that in the instance of a system poll when the system is selected for batch or block mode of operation, the device address information will change with each new heading that is transmitted.

The remaining figures will be described only as they relate to the description of operation herein to follow.

THE COMM DCA

FIG. 8 discloses the various sections of the COMM DCA. The sections include a memory and control section 2000, a command logic section 2400, and a control character sequence generator logic section 2600, and an interface logic section 3000.

The memory and control section 2000, as shown in FIG. 8, includes a pair of buffer memory sections 2020 and 2120 and a memory switching logic section 2200 illustrated in FIG. 8b. Each of the buffer memory sections include a buffer memory referred to herein as memory 1 and memory 2 with associated addressing logic and registers which connect its respective memory to the data transfer buses 3002 and 2061 as shown. Additionally, the Memory Switch Section interconnects through a bus 2059 to the timing generator 2030 and 2130 for transfer of control output lines. Since both memories are controlled by like logic circuits, in some instances only the logic circuits for one memory (1) will be described and shown in detail herein.

The command logic section 2400, as shown, includes a decoder 2402 which is operative in response to character codes applied hereto to generate the output functions shown.

Figure 8A:
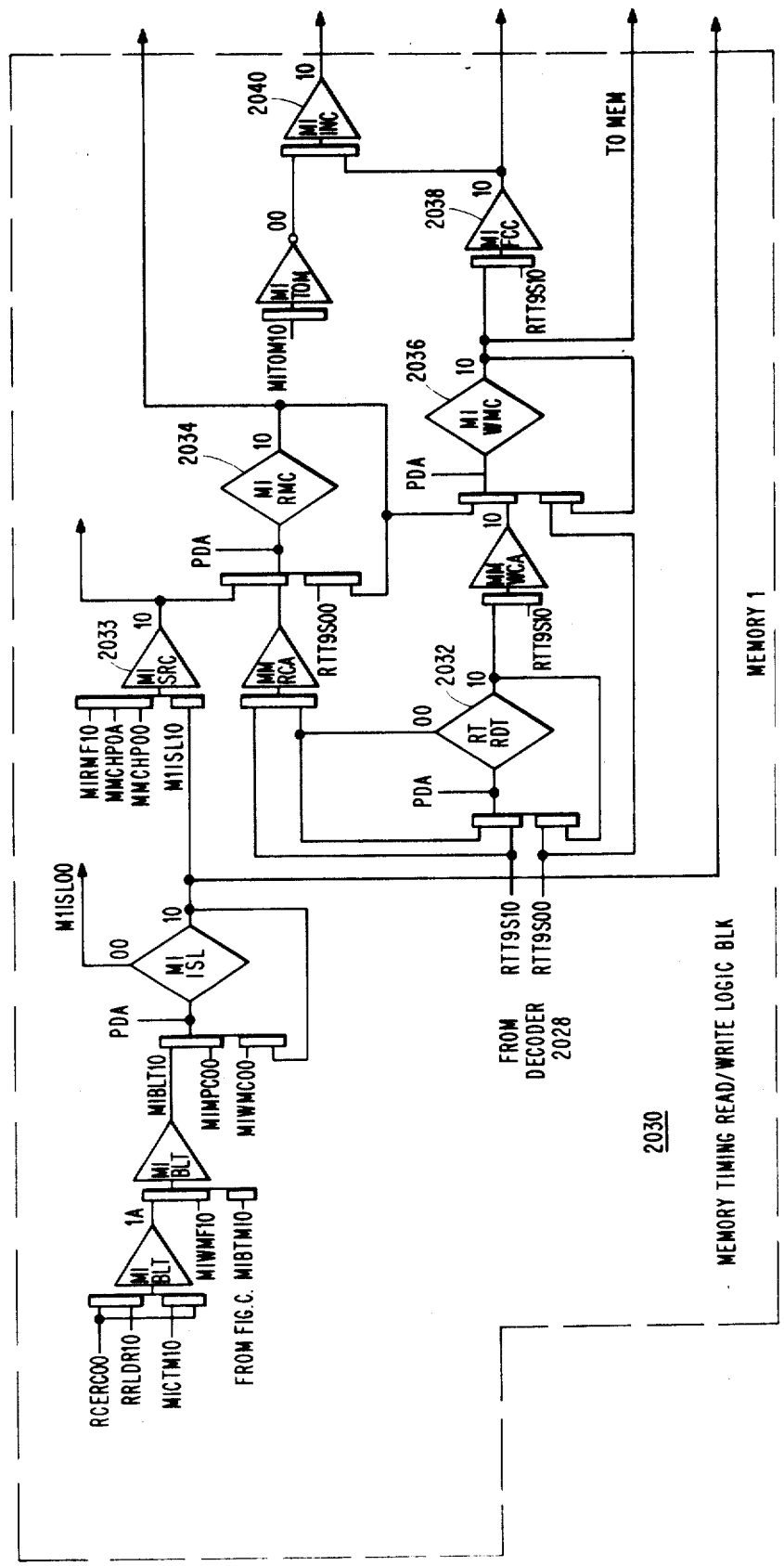
FIG. 8a shows in greater detail the memory read/write timing control for one of the memories of FIG. 8.

The decoder outputs are applied to a Receive Logic Section 2404 which includes a plurality of flip-flops shown in further detail in FIG. 8d. The output terminals of these receive flip-flops are applied to a receive sub-command generator 2500 which includes a plurality of flip-flops, the details of which are shown in FIG. 8e. The generator 2500 produces a number of output functions many of which enable the trnasfers along those buses shown between the various sections of the COMM DCA. Additionally, the receive command generator 2500 interconnects with the interface logic section 2800 through a bus 2060 as shown. The particular functions transferred between these two sections via the bus 2060 are shown in the Figures which disclose the sections in greater detail.

Figure 8C:
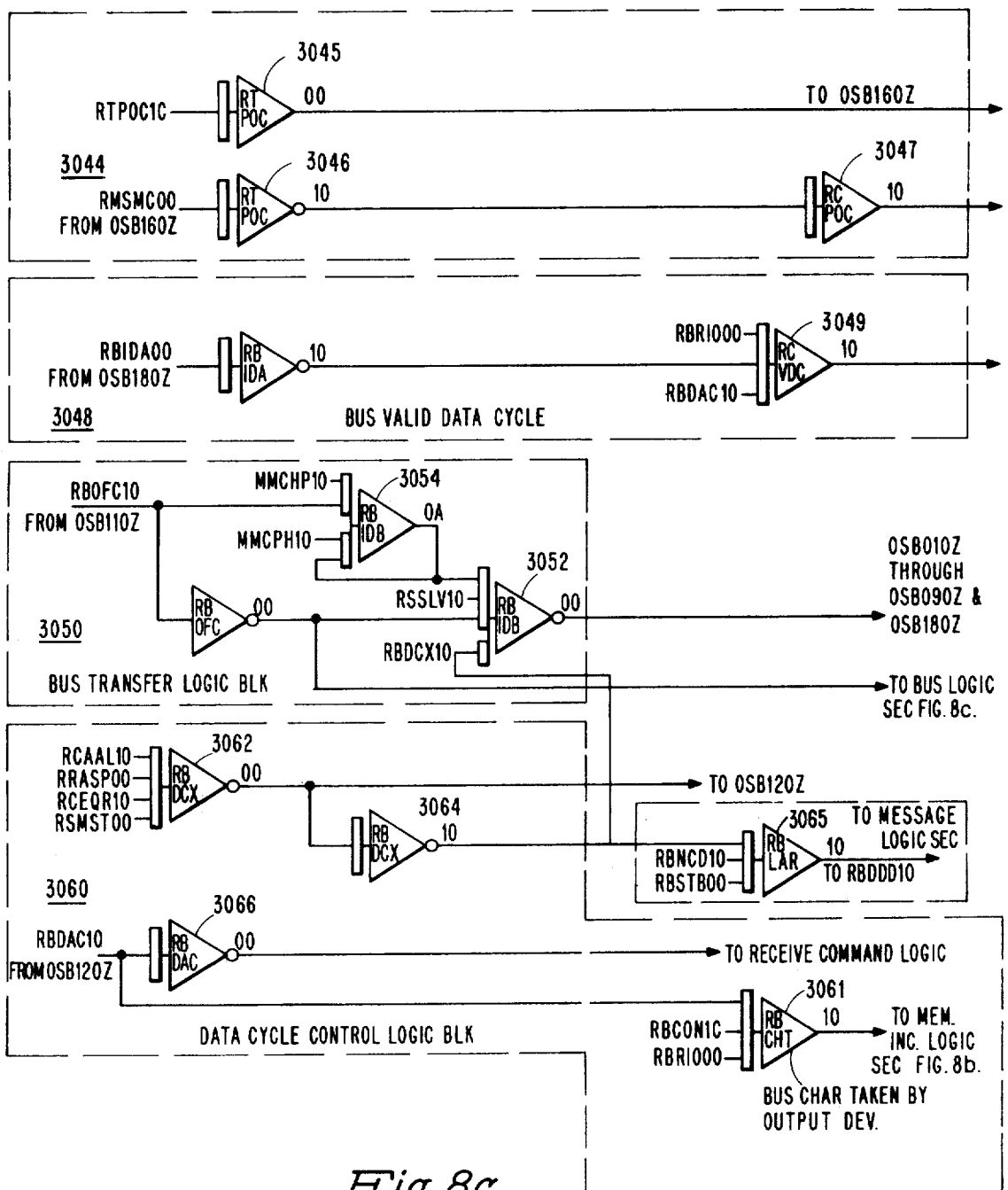
FIG. 8c shows the interface logic of FIG. 8.
Figure 8C:
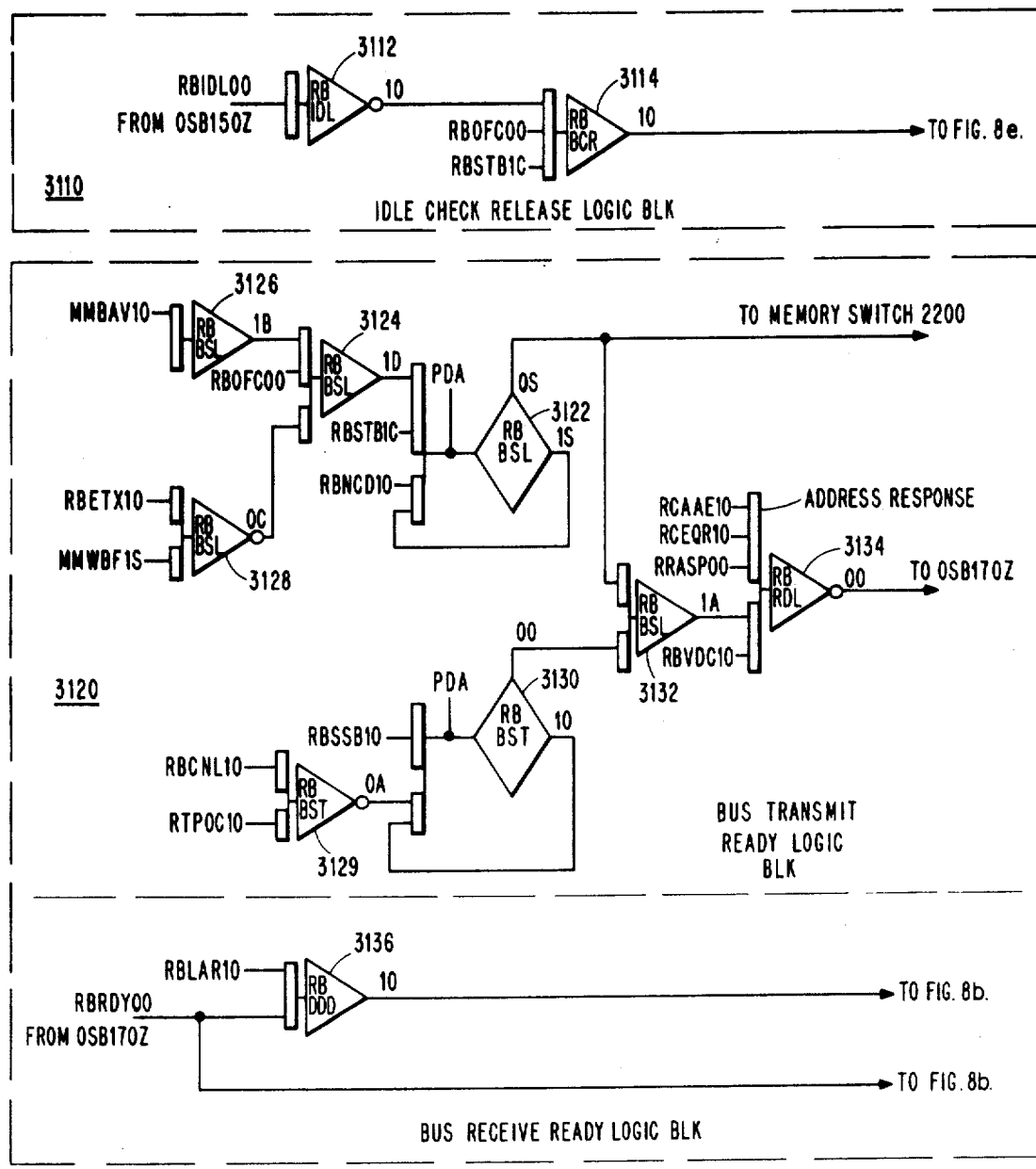
Figure 8E:
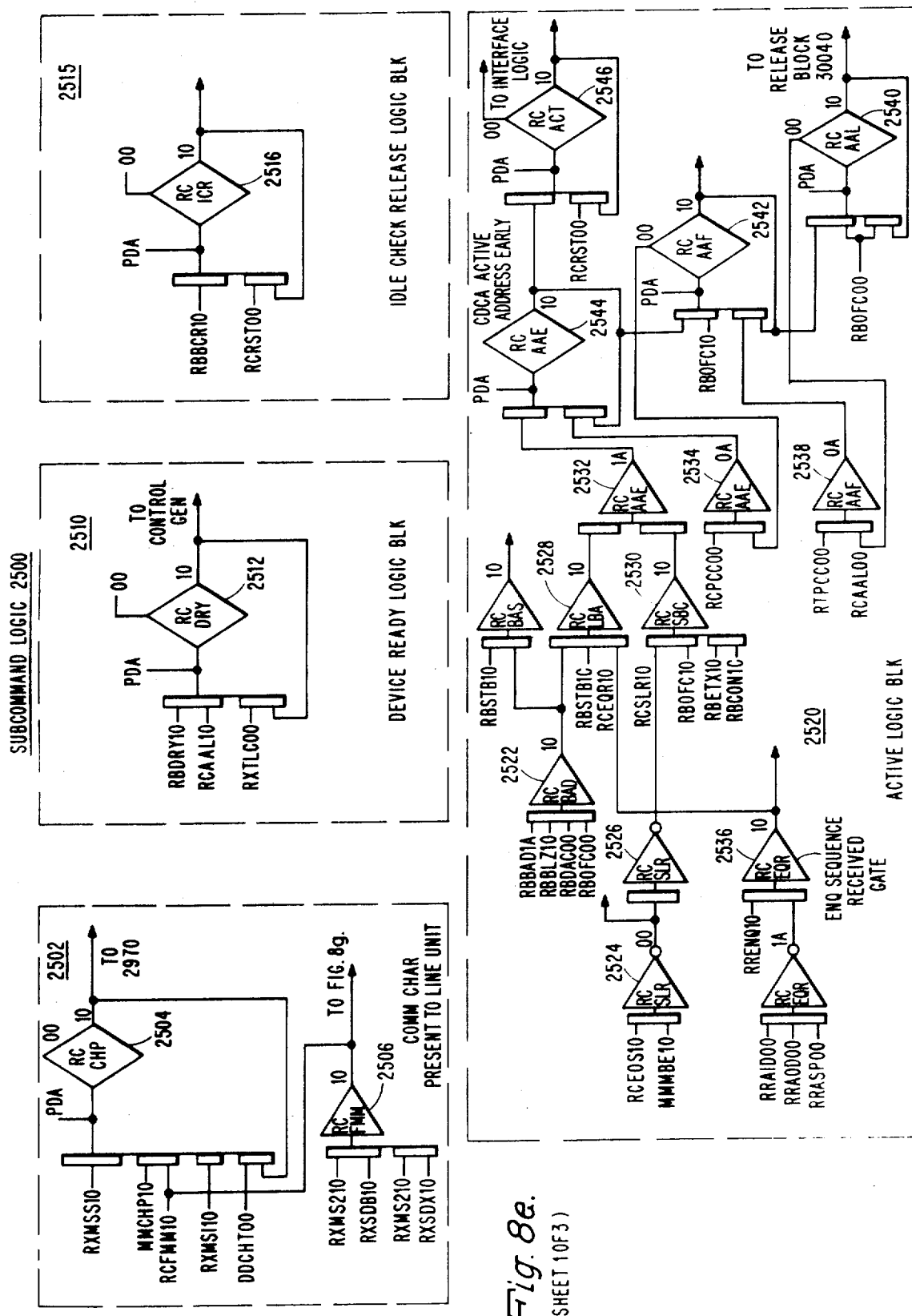
FIG. 8e shows details of the Receive Subcommand Generation Logic circuits which forms a part of the command logic section of FIG. 8.
Figure 8E:
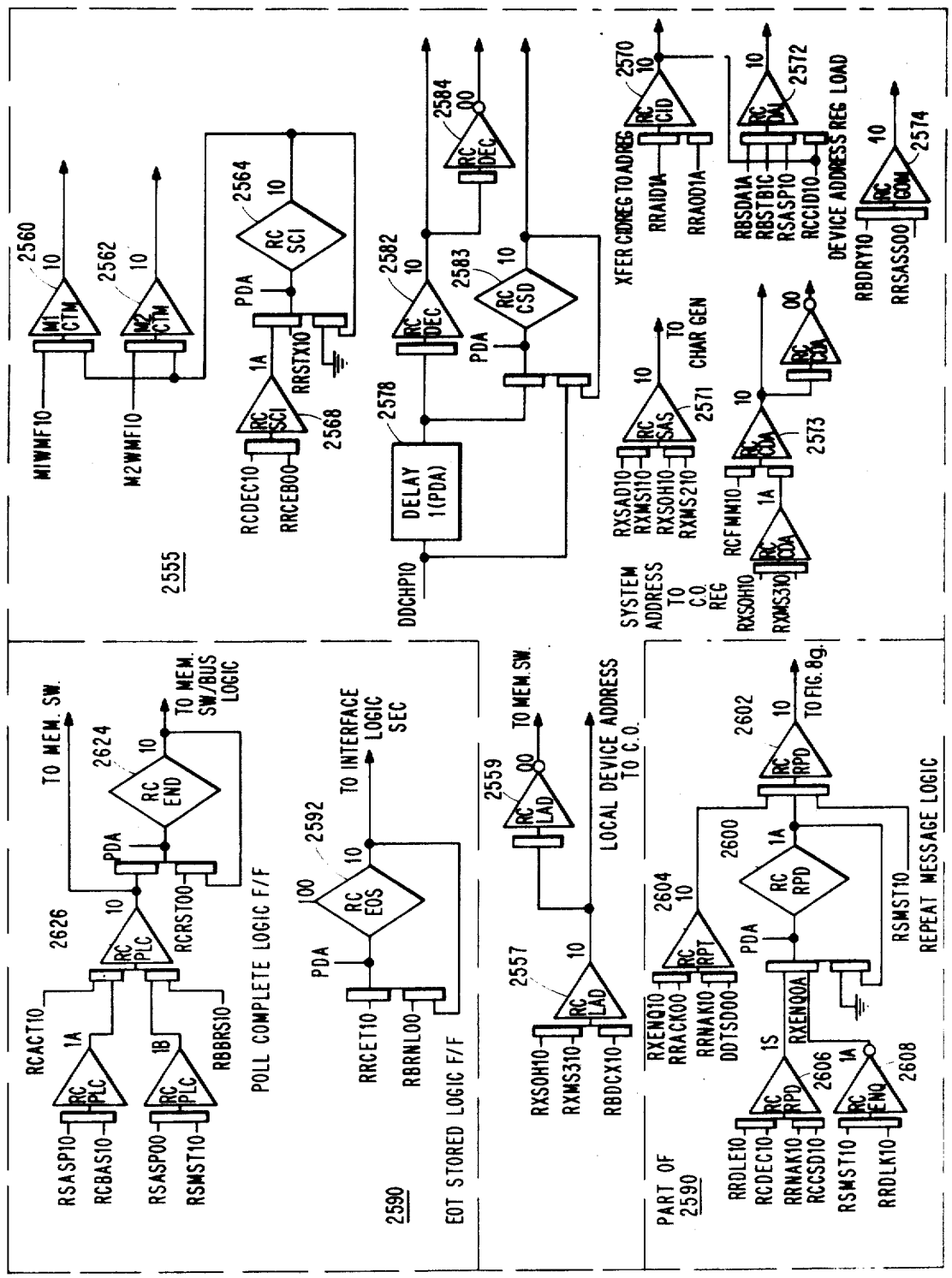
Figure 8F:
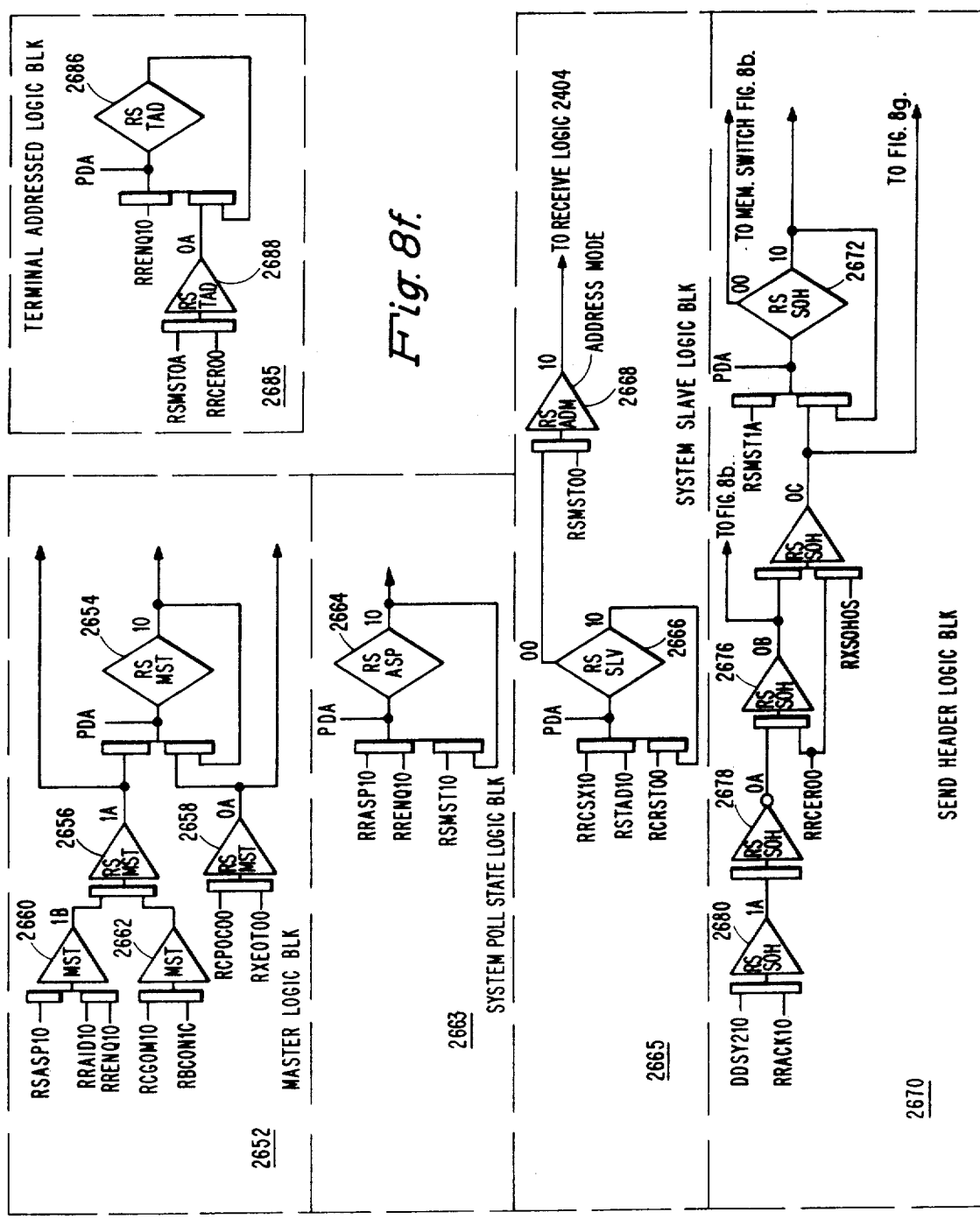
FIG. 8f shows details of the State Logic circuits which form a part of the Command Logic Section of FIG. 8.

A last section of the command logic section 2400 is a state logic section 2600 which is shown in greater detail in FIG. 8f. This logic includes a number of controlled flip-flops which establish the status of the COMM DCA during its operation as explained herein.

Figure 8G:
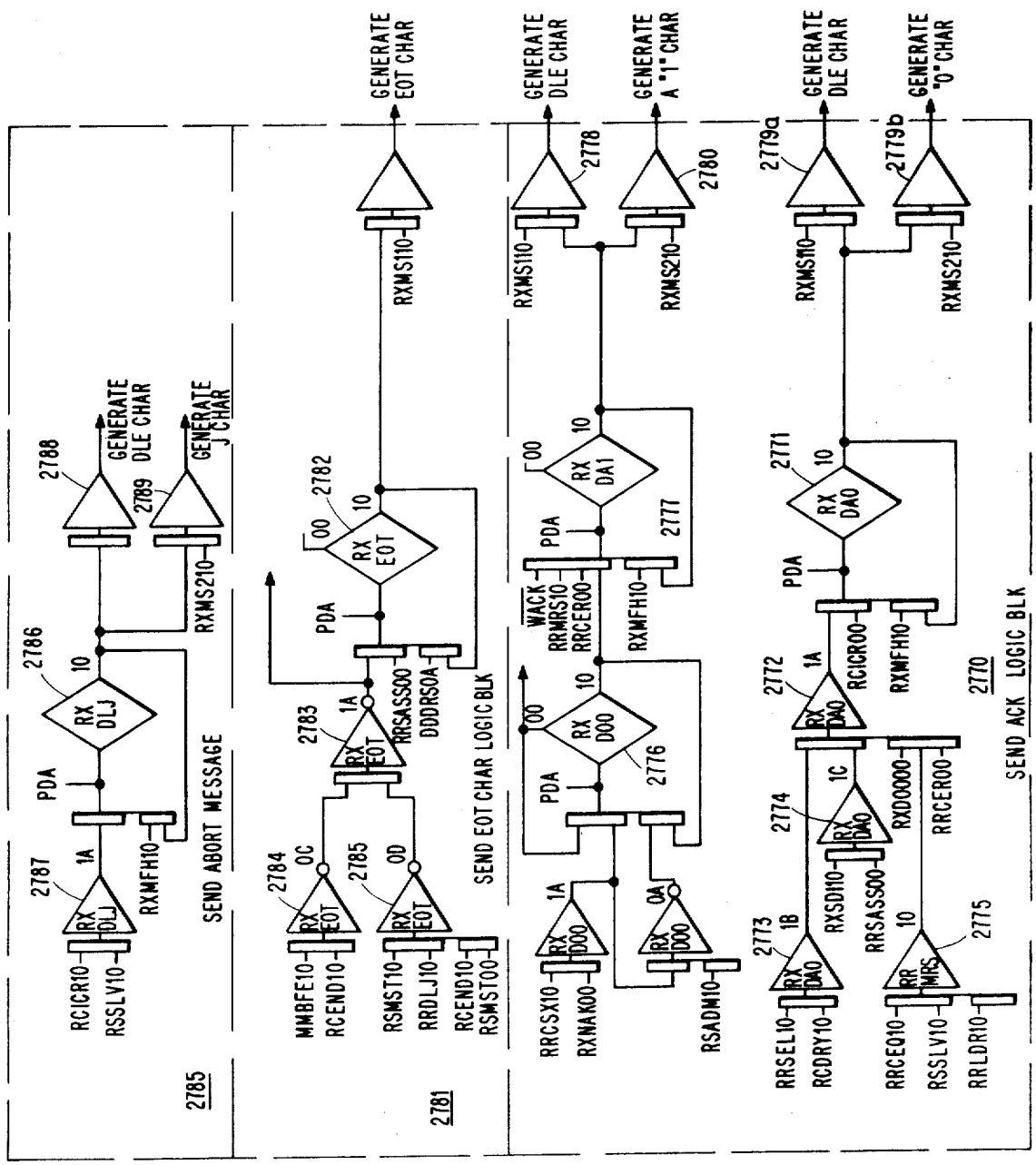
FIG. 8g shows in greater detail the message logic which forms a part of the control logic section of FIG. 8.

The last major section mentioned above is the control character sequence generator section 2700 which includes a message logic section 2702 shown in greater detail in FIG. 8g which receives and transfers functions to a step logic section 2800 which is illustrated as including a plurality of flip-flops MS1 through MS5.

The output functions produced by the step logic 2800 together with the functions produced by the message logic 2702 are applied to a character generator 2900. The character generator 2900 is conditioned by certain combinations of functions to produce sequences of characters which are then transferred via the register 2950 to the input/output shift register 2950 for transmission over a common crrrier communication facility via a data set (modulator-demodulator) of conventional design.

Figure 8H:
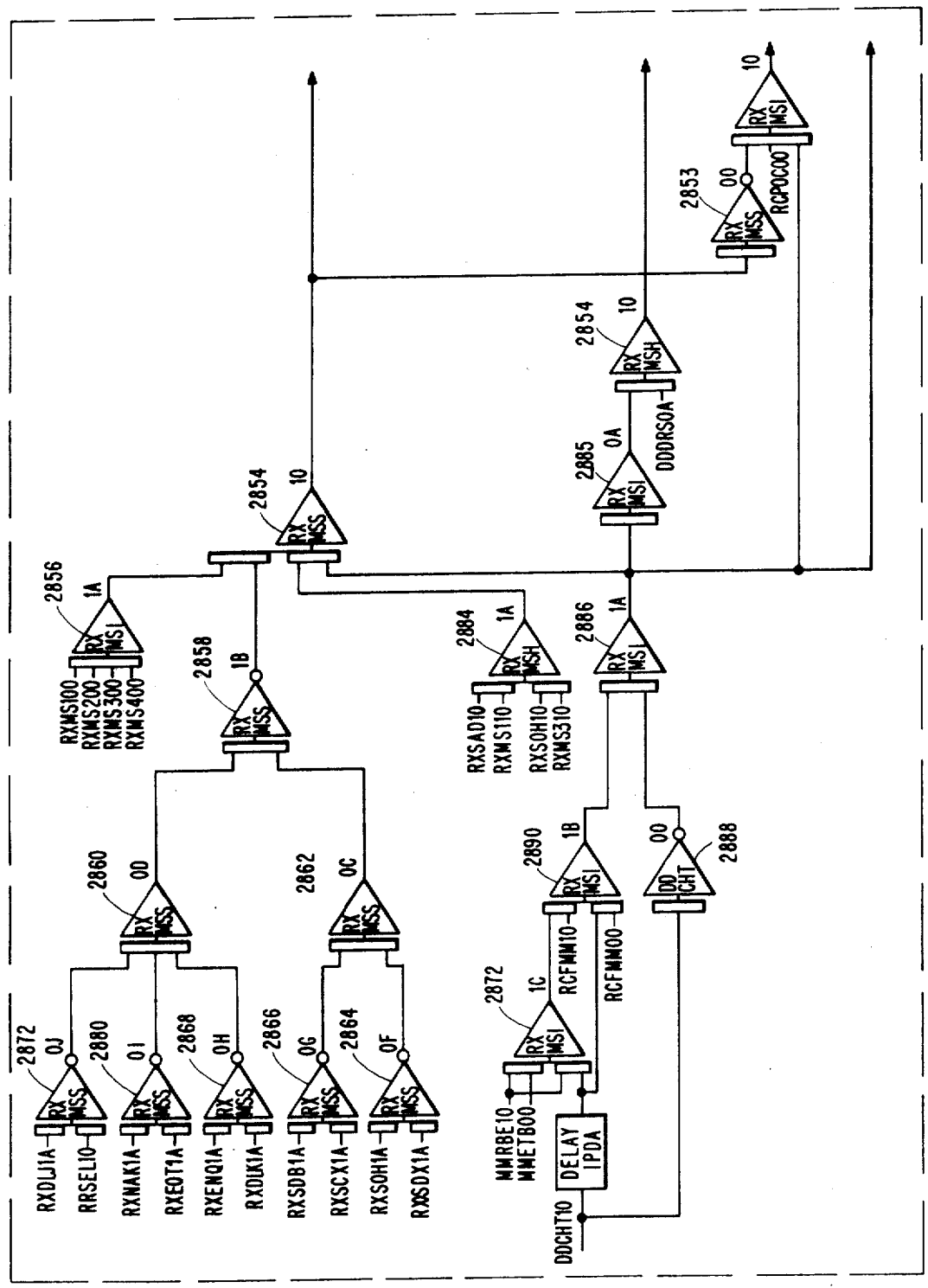
FIG. 8h shows in greater detail the message step logic circuits which form another part of the control character Generation Logic Section of FIG. 8.

In order to facilitate the following explanation, another set of prefixes are used to indicate the origin for the majority of each of the logic control functions generated within the COMM DCA. The prefixes used are:

| M1, M2, MM | = | Memory and Control Section of FIG. 8; |
| --- | --- | --- |
| RB | = | bus interface logic section of FIG.8c; |
| RC | = | Receive Command Generator section of FIG. 8e; |
| RR | = | Receive Control Logic Section of FIG. 8d and Receive Decoder of FIG. 8; |
| RS | = | State Logic Section of FIG.8f; |
| RX | = | Message Logic Section of FIG. 8g; and |
| MS | = | Step Logic Section of FIG. 8h. |

MEMORY AND CONTROL SECTION 2000

Buffer Memory Section

Each of the memories 2022 and 2142 of FIG. 8 herein referred to as memory 1 and memory 2 are continuously being cycled by its associated timing generator 2024 and 2124 respectively. Each generator, equivalent to the generator used in the DCA memory system, is enabled by a free running oscillator to produce a memory function MGO and PDA clock pulses which establishes the timing for its respective memory section.

Since memory section 2020 is identical to section 2120 only memory 1 will be described herein. The timing generator 2024 feeds a five stage bit counter 2026 whose stages are labeled BC1 through BC5, which in turn applies its output terminals to a decoder 2028, conventional in design. The decoder 2028 is conditioned by the counter 2026 to generate an output pulse RTT9S10 each time the bit counter 2026 increments to a count of nine thereby establishing a character interval.

As shown, the decoder 2028 feeds a read/write timing generator 2030 which is shown in detail in FIG. 8a, Referring to that Figure, it will be noted that the read/write cycles are determined by the state of RTRDT10 flip-flop 2032 and a function M1SRC10. This is generated by an AND gate 2032 activated by the functions shown by the most part generated by the memory switch logic section 2200 of FIG. 8b. In greater detail, the memory 2022 reads out the bits of an addressed memory location during a read cycle, defined by the state of the M1RMC flip-flop 2034, and then writes the bits read out back into the same location during a write cycle as defined by the state of M1WMC flip-flop 2036. Accordingly, the state of the RTRDT flip-flop 2032 conditions the read cycle flip-flop 2034 and write cycle flip-flop 2032 alternately so as to establish the aforementioned read and write cycles of each memory cycle.

In accomplishing the above, it will be noted that the RTT9S pulses alternately set and reset the RTRDT flip-flop 2032 to its binary ONE or binary ZERO state respectively. Therefore, the flip-flop 2032 remains in one state for a character interval (bit counts zero through nine). Accordingly, read cycle M1RMC flip-flop 2034 will be set to its binary ONE state upon the receipt of a RTT9S10 pulse when RTRDT flip-flop 2032 is in its reset state and either a data character has been transferred into the buffer register 2042 from either the bus 150 or the I/O register as defined by transfer functions M1BTM10 and M1CTM10 respectively or when there is a data character to be read out from the memories (i.e. memory write operation) generated by ANDing of the memory switch logic functions M1RMF10, MMCHPOA and MMCHPOO by gate 2033 (i.e. memory read operation). The same RTP9S10 pulse which sets flip-flop 2034 to its ONE state also switches flip-flop 2032 to its one state. With the read cycle flip-flop 2032 in its one state, thennext RTT9S10 pulse switches the write cycle M1WMC flip-flop 2026 to its one State. Therefore, the transfer functions M1CTM1O and M1BTM10 initiate memory cycling. And, the switching of M1RMC and M1WMC flip-flops 2032 and 2034 which in accordance with the switching of RTRDT flip-flop 2032 generate the read and write cycles for each memory operation.

Referring to FIG. 8, it will be noted that the read and write functions M1RMC10 and M1WMC10 condition the buffer memory 2032 to receive the bits as they are read out from an addressed memory location of its associated memory as well as conditioning the memory buffer 2032 to write its contents back into the memory address location. As shown, the memory buffer 2022 has a ten bit register memory local register including stages MB1 through MB10, which are connected to form a shift register 2042.

During a memory read cycle (function M1RMC10=1), the ten bits of an address character memory location are read serially out of memory 2022 via a sense amplifier (not shown) and shifted into the last stage (MB10) of the memory buffer register 2042 via an amplifier AND gate 2044. Previously, the ANDing of functions M1RMF10, MMCHPOA and MMCHPOO permits a read memory cycle to be initiated by read allow function M1SRC10 from generator 2030 wherein the bits of a data character are shifted into the buffer memory register 2042 as mentioned. An AND gate 2043 which generates a buffer shift function M1SFT10 is enabled by a memory switch function M1WMC10 during a read/write cycle which conditions the buffer register 2042 to shift the bits applied via gate 2044 through its stages.

When a complete character has been loaded into the buffer register 2042 from memory 2023, read cycle M1RMC flip-flop resets which in turn sets write cycle M1WTC flip-flop to its one state producing function M1WTC10. This begins the write cycle during which time buffer shift function M1SFT10 is still high and the function M1WMC10 enables a write M1WTC amplifier 2046 to be conditioned by the ONE output of the first buffer state MB1 to write either a binary ONE or a binary ZERO into the addressed location. That is, when a binary ONE is to be written into the memory, the first stage MB1 of the memory buffer register 2042 will enable M1WTC10 amplifier 2046 which will cause a binary ONE to be written in the bit location of that memory. Alternatively, when the first stage MB1 of storing a binary ZERO, M1WTC10 amplifier will be inhibited and a binary ZERO will be written into the memory.

As the data bits are shifted through MB1, they are also returned through AND gate M1SBT amplifier 2034 which is enabled by function M1WMC10. Accordingly, at the completion of a write cycle, the memory buffer 2042 as well as the addressed character location is in its original state prior to the memory cycle.

When data characters are transferred from the input/output shift register 2960 or from the bus 150, the buffer memory 2022 is conditioned to perform a clear/write operation. In particular, function M1ISL10 is forced high by the setting of M1ISL flip-flop to its ONE state by transfer functions M1CTM10 and M1BTM10. This causes function M1ISL00 corresponding to the ZERO output of the same flip-flop to be low. The function M1ISL00 inhibits AND gate 2043 which clears the stages of the memory buffer register 2042 during the read cycle by inhibiting shifting of the register contents and hold function M1SHF10 resets the register stages to zeros. Just prior to the write cycle, either the function M1CTM or function M1BTM will condition their associated transfer buses 2962 and 3002 to load the buffer register 2042 from either the register 2960 or the bus 150 respectively. Thereafter, the memory writes the contents of the buffer register 2042 into memory a bit at a time during the write cycle as described above.

Each memory location as mentioned has ten bits in the preferred embodiment coded as follows: eight bits are reserved for coding each character in ASCII code; the ninth bit is not used; and, the tenth bit is coded as a ONE to signal when the last data character of a block of data has been written into the buffer memory 2022. As described herein, AND gate 2044 writes a ONE into stage MB10 when activated by functions PBETX10 and M1BTM10.

The buffer memory 2022 includes 200 or 400 memory character locations and a memory address register (MAR) 2048 which includes a units, a tens, and a hundreds counter. As shown by FIG. 8, the units counter is a four stage counter whose stages are designated as U1A-U4A. And, the tens counter has four stages designated TA1 through TA4. Depending on the size of the memory 2022, the hundreds counter may include two stages designated as H1A and H2A for a memory size of 200 or 400 storage locations. The read/write timing generator 2030 increments the MAR by one when it generates function M1INC10. Specifically, after each time the bit counter 2026 advances to a count of nine, it will condition an AND gate 2040 of FIG. 8a to produce an increment function M1INC10 to increment the MAR 2048 by a count of one provided a Top of Memory function M1TOM10 is a ZERO.

A jumper card 2050 is arranged to enable a decoder 2052 connected thereto to generate the function M1TOM10 when the memory address register 2048 has advanced to a predetermined count. The wiring of the jumper card 2050 establishes the number of data characters (size of a block) which will be written into the buffer memory 2022 before the writing operation is terminated whereafter the stored characters are read out of memory. That is, the jumper card 2050 establishes the block size for automatically blocking data characters written into memory 2022.

The jumper card 2050 may be wired to condition the decoder 2052 to produce the function M1TOM10 when the MAR 2048 has advanced to a count of 200, 400, or any other predetermined count. In particular, when the jumper card 2050 is wired so that the decoder 2052 produces function (M1TOM10) each time the MAR 2048 has advanced to a count of 200. This function conditions the memory switch logic to discontinue the write operation and enable a read operation. That is, when this predetermined count has been reached, function M1TOM10 sets a memory pass complete (M1MPC) flip-flop located within the memory switch logic section 2100 of FIG. 8b. With this flip-flop set to its binary ONE state, function M1MPC10 comes high and in turn generates a Load/Clear Column Count function M1LOD10 which resets all stages of the memory counters to ZEROS.

Memory Switch Logic 2200

In General

The memory switching logic section 2200 of FIG. 8b is operative to control the transfer buses along which each of the buffer memories is to transfer or receive data characters and whether a particular memory is to perform a read operation or write operation. That is, the switch outputs of the section 2100 are applied as inputs to the read/write timing logic 2030 of FIG. 8a and the buffer register gating logic to condition same for either writing or reading. Additionally, the switch logic section 2200 causes the generation of transfer functions which permit the output from either memory to be applied to either the bus 150 or to the communication line input/output register 2960.

As shown in FIG. 8, the output transfer functions MMM1G10 and MMM2G10 enable transfers of data characters from either the buffer register 2042 or 2142 of memory 2022 and 2122 respectively along transfer bus 2160 via a bus gating logic 2980 to either the bus 150 or the input/output communications shift register 2960. It will be appreciated that the transfers to the shift register 2960 via bus 2961, gating logic circuits 2980, bus 2982, register 2950 and 2955 also conditioned on other functions RCCOA10 and DDCOT10 being in a high or ONE state. And, the transfer to the bus 150 via the bus 2961, gating logic circuits 2480 and bus 2984 as shown is conditioned on function RBID-BOO being a ONE.

As mentioned, the memory switch logic 2200 via functions M1WMF10 and M2WF10 also causes transfer functions M1CTM10 and M2CTM10 to condition the transfer of data characters assembled in the input/output shift register 2960 via bus 2962 to buffer memory 2022 and buffer memory 2122 respectively. The specific logic which generates these transfer functions forms a part of the Receive Subcommand Generation Logic section 2500 disclosed in detail in FIG. 8e. Additionally, the same functions M1WMF10 and M2WMF10 conditions the transfer bus 3002 extending from the interface logic 3000 to the buffer registers 2042 and 2142 to enable the transfer of data characters to either register 2042 or 2142 from the bus 150 by generating the bus to memory transfer functions M1BTM10 and M2BTM10. The specific logic for generating these functions id disclosed in detail in FIG. 8c and will be discussed in greater detail with reference to this Figure.

Detailed Description of Memory Switch Logic Section

Referring now to FIG. 8b, it will be noted that the significant control functions are derived by a memory switch MMMSW flip-flop 2202. The binary ONE and binary ZERO output functions MMMSW10 and MMMSW00 respectively of this flip-flop conditions a Memory 1 and Memory 2 Read/Write Logic Sections 2205 and 2215 to condition the memory sections 2020 and 2120, as mentioned above, to thereby define which memory is to read data characters from its memory storage locations and which memory is to write data characters into its storage locations.

It will be noted that one set of input functions to the memory switch flip-flop 2202 define when either memory is full or stated differently, they define the time when either memory is ready to have its data contents read out to receiving unit. And, the other set of input functions define when either memory has had its data character contents read out completely and is now ready to have new data characters written therein. These sets of functions are generated by blocks 2270 and 2225. It will be noted that in those cases where the logic for memory 2 is equivalent to that of memory 2, it is shown only as a block.

Accordingly, the memory switch MMSW flip-flop 2202 will switch only when one memory is empty and the other memory is full. Stated differently, switching occurs when one memory has transferred all of its data characters to an output device and the other memory has loaded completely with data characters from an input device. In particular, a Memory Switch function MMMST10 defines the time at which the memory switch MMMSW flip-flop 2202 will be switched to either its binary ZERO or binary ONE state. This function, as shown, is generated by an AND gate 2250 which is also conditioned to switch in accordance with the status of the COMM DCA. Specifically, switching is controlled by a master (transmit) status function RSMST10 and a slave (receive) status function RSSLV10. Thses two functions are generated by a pair of RSMST and RSSLV flip-flops which formed part of the Message State Logic 2600 of FIG. 8f. Specifically, these functions are derived from a master status MSMST flip-flop and a slave status MSSLV flip-flop when they are switched to their ONE states. This means from the point of view of a data transfer operation that the COMM DCA when in the master status (i.e. MSMST flip-flop is in its ONE state) is going to transmit data characters via the communications facility to the remotely located data processing system. And, the COMM DCA when in the slave status (i.e. MSSLV flip-flop is in its ZERO state) it is going to receive data characters from the data processing system. The manner of establishing these status states will be described herein.

Receive Status

When the power is applied to the system the M1RMF, M1WMF, M2RMF and M2WMF flip-flops are reset to their ZERO states via their respective hold functions M1SBEOA, M2SBEOA, M1MPCOA and M2MPCOA. And, when a reset function RCRSTOO is forced to a ONE, it causes MMMSW flip-flop to be reset to its ZERO state. The MMMSW flip-flop will be switched from its ZERO state to its ONE state via gate 2298 when a first device signals ready forcing function RBDRY10 to a ONE and when a control pulse RBCON1C is applied via MMMST1E AND gate. The control pulse RBCONIC also causes function RBDRY10 to be forced low which in turn causes function RBDRY00 to become a ONE. It is assumed that the system is in the receive status wherein the slave flip-flop is in its ONE state and the memory switch MMMSW flip-flop 2202 is in its set or ONE state. Accordingly, the Memory 2 Write Memory M2WMF flip-flop 2217 will be set at this time which conditions Memory 2 for writing data characters into the memory from the communications line. However, since memory 1 will be initially empty when power is initially applied to the COMM DCA, the Memory 1 Read M1RMF flip-flop 2205 will reset to its SERO state because a function RCPOC10 is forced to a ONE which cuases set Memory 1 Empty M1BE gate 2232 to force function M1SBEOA to a ZERO. This in turn forces hold function gate low of the flip-flop 2206 causing it to reset upon the next PDA pulse, Also, function M1SBEOA sets Memory 1 Empty M1BFE flip-flop 2234 to its ONE state which together with function MMMSW10 activates MMRBE AND gate 2240 forcing function MMRBE1o to a ONE. Now, memory switch MMMSW flip-flop 2202 remains in its ONE state until a Memory Pass Complete M2MPC flip-flop switches to its ONE state. This signals that the memory 2 writing operation is complete. It will be noted from the equivalent M1 flip-flop that M2MPC flip-flop switches to its ONE state under the following conditions when an M2SPC AND/OR gate equivalent to gate 2282 is activated. The gate 2282 will activate when an end of message conditions is detected by the Receive Command logic 2500 which forces function RCEDM10 to a ONE (see FIG. 8e ). And, the gate 2282 activates when the "top of memory" is addressed wherein decoder 2152 forces function M2TOM10 to a ONE. With M2MPC flip-flop set to a ONE, function M2MPC10 together with function M2WMF10 from block 2292 activates Memory Write Buffer Full MMWBF gate 2294 which forces function MMWBF10 to a ONE. The functions MMCHP00, MMRBE10 and MMWBF10 activate AND gate 2242 which forces function MMMST1A to a ONE in turn forcing memory switch time MMMST10 function to a ONE when an ETX or an ETB character has been detected by the Receive logic 2404 of FIG. 8d which forces function RRLDR1S to a ONE.

The function MMMST10 causes memory switch MMMSW FLIP-flop 2202 to its ZERO state along with M2 Write Memory M2WMF flip-flop 2217 by forcing hold function M2SBE0 a low via function M2SRT10 applied to an inventor gate equivalent to gate 2276 of block 2272. And, function MMMST10 causes M1 Write Memory M1WMF flip-flop 2207 to switch to its ONE state via activating M1SWF AND gate 2209.

Additionally, M2 Read Memory M2RMF flip-flop 2216 switches to its ONE state when function MMMST10 forces function MMSRF10 which in turn forces M2SRF10 to a ONE. The M1 Read Memory M1RMF flip-flop 2206 remains in its reset or ZERO state because function MMMSW00 is a ZERO. When M2WMF flip-flop resets to a ZERO, it causes M2MPC flip-flop to also reset to a ZERO by forcing hold function M2MPCOB low. Also, the resetting of MMMSW flip-flop enables MMM2G AND gate 2218 when a further AND gate 2258 becomes active at which time it forces function MMMG10 to a ONE. This gate is activated when the Memory Character Present MMCHP flip-flop 2264 is in its ONE state and a Receive Command transfer function RCLADOO generated by the Receive Subcommand Logic 2500 is a ONE as described herein. As mentioned, function MMM2G10 enables the transfer of data characters from its associated memory 2122 to the bus 150.

Referring to FIG. 8a, it will be noted that function RRLDR10 is applied to M1BLT and equivalent M2BLT AND/OR gates. A function RCERCOO is normally a ONE and is forced low when an error is detected by conventional means, (not shown) as for example, a longitudinal parity check. This causes function M2BLT10 to be low which will inhibit M2ISL flip-flop from being set to its ONE state. This forces function M2ISL10 low which in turn holds function M2SRC10 low thereby preventing Memory 2 Read M2RMC flip-flop from switching to its ONE state and initiating a read memory cycle. While the memories will be switched, the data characters stored in memory 2 representative of a bad message will not be transferred to the standard bus 150 because the cycling of memory 2 is inhibited. Under these circumstances, the COMM DCA will request a retransmission.

Now, the aforementioned memory switch flip-flops 2202, 2206, 2207, 2216 and 2217 remain in their same states until further MMMST10 pulse is developed which will cause memory switch MMMSW flip-flop to switch to its ONE state. As shown by FIG. 8b, this occurs when M1MPC flip-flop 2286 is set to its ONE state by conditions mentioned above which forces function MMWBF10 to a ONE and together with functions MMCHPOO and MMRBE10 as ONES, forces function MMMST1A to a ONE.

Memory Switching-Transmit-Master Status

As mentioned, the COMM DCA is to transmit data characters to the remotely located data processing system, the master status flip-flop will have been set to its ONE state which forces function RSMST10 to a ONE.

Similar to the Receive status, a first pulse applied by Memory Switch time MMMST gate 2250 is generated when MMMST1C gate 2298 becomes active prior to master status RSMST flip-flop of FIG. 8g being set to its ONE state when ready function RBDRY10 is a ONE. Again, this first pulse will switch MMMSW flip-flop to its ONE state whereafter memory 1 is conditioned to read while memory 2 is conditioned to write. That is, the MMMSW flip-flop 2202 when in its ZERO state causes M2SWF gate to become active which sets M2WMP flip-flop to a ONE. However, since function RMRDYOO is a ZERO, the first pulse will not switch M1RMF flip-flop to its ONE state.

Upon the completion of a writing operation, the M2MPC flip-flop will switch to its ONE state when the Bus Logic section of FIG. 8c detects an ETX character in turn forcing function RBETS10 to a ONE or when the Top of Memory function M2TOM10 is generated by either decoder 2052 or 2152. When set to its ONE state, M2MPC flip-flop forces function M2MPC10 to a ONE which together with function W2WMF10 activates Memory Write Full MMMWBF gate 2294 which generates function MMMWBF10. This function together with function MMMST10 activates an AND gate 2296 which in turn activates gate 2298 when Master Status RSMST flip-flop is in its ONE state. The functiom MMMST1D will be a ONE when functions MMSTOD and MMBAVOO are both zeros. This occurs when function RSSOHOO is forced to a ZERO after a Start of Header character is generated by character generator 2900 as described herein and sent to I/O register 2960. The function MMBAVOO goes low when both the MIBAV and M2BAV gates are active together with function MMBAV1A being a ONE. That is, when the data characters transmitted have been acknowledged as good, function RRACK10 is a ONE and when the contents of either memory have been read out a flag will be detected which activates M1SBE and M2SBE gates in turn causing M1RMF flip-flop and M2RMF flip-flop to be reset to their ZERO states. Also, functions M1MPCOA and M2MPCOA reset M1WMF and M2WMF flip-flops to their ZERO states.

Since the associated functions M2WMF00, F1MPC00 and M2WMF00 and M2MPC00 are ZEROS, then either function M1BAV10 or M2BAV10 is forced to a ONE which in turn forces function MMMST10 to a ONE, switching the state of MMMSW flip-flop. Now, this causes gate 2250 to produce a second pulse which resets MMMSW flip-flop to its ZERO state together with M2WMF flip-flop. And, M1WMF flip-flop 2207 and M2RMF flip-flop are switched to their ONE states while M1RMF flip-flop remains in its reset state.

Accordingly, the contents of M2 will be read out to the I/O register 2960 while data characters are being written into memory 1. If a good acknowledgement is not received, function RRACK10 remains a ZERO thereby preventing MMMSW flip-flop from switching state. At the same time, function RBRDY00 is forced to a ONE by the bus interface logic as described herein which prevents data characters from being written into either memory. Accordingly, a Retransmit function RCRPD10 is generated by Receive Command logic which sets the M1RMF and M2RMF flip-flop to their original status in accordance with the state of MMMSW flip-flop as well as resetting either M1MPC flip-flop or M2MPC flip-flop thereby permitting the retransmission operation to take place in the same manner as the original transmission. Thereafter, the state of MMMSW flip-flop will be again switched when functions MMMSTOD and MMBAV00 are both ZEROS. Since function RSSOH00 will always be a ONE after the first block of data characters have been transmitted and acknowledged, thereafter function RBBSLOS will permit memory switching when a ZERO forcing function MMMSTOD to a ZERO.

System Interfaces
Communication I/O Register

The I/O register 2960 as shown in FIG. 8 is an eight stage shift register whose stages are labeled DDCI1 through DDCI8. As indicated, this register transfers information into and out of the COMM DCA from or to the communications facility respectively. Information characters from the communications facility such as a 201A or 201B data set are handled via a data set interface, conventional in design. In particular, when receiving information, a Request to Send data set function is a ZERO. A Data In line DDDRD10 from the data set applies bits of information serially to the last stage of the shift register 2960 and these bits are shifted there through by strobe pulses DDSTR10 developed from the data set receive clock. These pulses are developed in a conventional manner so that each pulse coincides with the center of each bit. Each of the strobe pulses also increment a three stage bit counter included with the Timing and Control 2970. Each time the bit counter counts to eight so as to define a character interval, the communications control 2970 sets function DDCHP10 to a ONE indicating that there is a character present in register 2960. This function is applied to the Receive Command logic 2500 of FIG. 8.

When the COMM DCA is to transmit characters to the data set interface, it forces a Request to Send function DDDRS10 to a ONE by switching a Receive to Transmit Allow RCRTF flip-flop in FIG. 8e to a ONE. When the COMM DCA is not receiving, a function DDDRS1A together with function RCRTF10, switch a Data Set Request to Send flip-flop to a ONE which forces function DDDRS10 to a ONE. This function remains a ONE for the duration of transmission.

When a Date Set Clear to Send signal and a Data Set Set Transmit Clock signal are ONES, the COMM Control 2970 develops strobe pulses in a conventional manner so that the pulses coincide with the leading edge of the clock signal. As described herein, the control 2970 will apply SYNC characters to the SYNC IN input of a gate 2974. When the requisite number of SYNC characters have been transmitted, the control 2970 will force function DDTSDOO to a ZERO inhibiting transfer of further SYNC characters. Simultaneously therewith, the control 2970 will force function DDTSD10 to a ONE and thereafter force function DDCOT10 to a ONE. The function DDCOT10 will cause a character to be transferred to I/O register 2960. And, the strobe pulses will condition the register 2960 to shift the bits serially on to the data out line via gate 2974. At the same time, the strobe pulses increment a three stage counter and when it counts to eight indicating completion of the character transfer it resets to ZERO. At that time, the communication control 2970 forces a function DDCHT10 to a ONE indicating that the character has been taken or transmitted.

When the COMM DCA switches from transmit to receive, the actual switching is delayed for a character interval which insures that the last character will be transmitted. When the COMM DCA generates a function indicating that the last character has been transmitted, (e.g. block check character has been transmitted) a function DDDRSOA is forced to a ZERO a character interval later. This function switches the Data Set Request to Sent flip-flop to a ZERO and at the same time switches the stages of a Message State Counter of FIG. 8 to ZEROS.

Bus Interface Logic — FIG. 8c

The Bus Interface logic of FIG. 8c develops strobe pulses to synchronize the bus ON-LINE cycles with the timing within the COMM DCA. In particular, referring to FIG. 8c, it will be noted that the logic block 3020 generates a bus strobe RSBTB1C from bus strobe RBSTBOO applied by the scanner 100 to line OSB100Z. Since the bus strobe logic 3022 may take the form of the DCA logic shown in FIG. 7e, it is not again disclosed herein. The strobe RBSTB1C which is used to control the character transfers within the COMM DCA is ANDed with functions RBVDC10, RBSSB1A with RBSDSA1B to produce a bus strobe RBSSB10. This function will enable one of a pair of AND gates 3032 and 3034 of block 3030 to transfer characters applied to the bus 150 into memory. That is, the function RBSSB10 is forced to a ONE which forces either function M1BTM10 or M2BTM10 to a ONE when either M2WMF or M1WMF flip-flop is a ONE and its Memory Pass Complete flip-flop has not been reset to ZERO (MMWBFOS = 1) indicating that the data characters are still being transferred into that memory, the COMM DCA is in its master status (RSMST10 = 1) there is a strobe RSDSA1B = 1) and there is a valid character on the bus (RBVDC10 = 1). A flip-flop 3024 switches to a ONE forcing function RBDSA1B to a ONE when function MMMPC1A is a ONE. It also switches when there is a data cycle (RBDAC10 = 1) and the scanner 100 has acknowledged that the previous character has been taken by the output devices by forcing RBCON10 to a ONE. And, the logic circuits of block 3010 in response to pulse RBCON10 generate pulse RBCON1C. When strobe RBSSB10 is generated it is also used to reset RBDSA flip-flop 3023 to its ZERO state via its hold gate.

As indicated above, the logic circuits of block 3010 generate the pertinent control timing functions which synchronize the COMM DCA address codes and data character transfers with the bus 150. Specifically, a control function RBCONOO derived from the scanner 100 enables AND gate 3012 to force function RBCNL10 to a ONE. Also, strobe function RBSTB1C switches an RBNCD flip-flop 3019 to its ONE state forcing function RBNCD10 to a ONE during an ON-LINE cycle (i.e. RBOFCOO = 1) and this flip-flop switches to a ZERO at the end of the cycle. These functions enable a first one of series connected flip-flops 3014 and 3016 to produce the function RBCON1C during the appropriate time interval (i.e. time interval 6) of an ON-LINE bus cycle. In addition to being fed to the block 3020, the function RBCONIC enables a character taken AND gate 3061 whose output feeds the Memory Switch Logic Section of FIG. 8b. And, this conditions a character present MMCHP flip-flop 2264 and a flip-flop 3054 of block 3050 by switching them to their ZERO states on readiness for the read out and transfer of another data character from memory to the bus 150.

Referring to block 3050, it will be noted that the function RBIDBOO is applied to the transmit circuits of bus lines OSBO1OZ through OSBO90Z in addition to bus line OSB180Z to enable the transfer of a character code to the bus lines and to signal when a character code has been applied to the bus respectively. This function is forced to the appropriate state as follows.

First, there must be a character present during the previous OFF-LINE cycle, at which time function MMCHP10 is forced to a ONE which switches the flip-flop 3054 to its ONE state. The data cycle control logic 3060 in FIG. 8c, after completing the requisite address cycles as described herein forces data control function RDBCX10 to a ZERO. Specifically, the function RBDCX10 is a ZERO when an address response flip-flop is switched to a ZERO which forces function RCAAL10 to a ZERO. Accordingly, gate 3052 forces function RBIDBOO to a ZERO when character present function MMCHP10 is a ONE, when the COMM DCA is in its receive state (RSSLV10 = 1) during an ON-LINE cycle (RBOFCOQ = 1) when the function RBDCX10 is a ONE. The flip-flop 3054 resets to its ZERO state when function MMCPH10 is forced to a ZERO upon the receipt of control pulse RBCON1C which forces function RBCHT10 to a ONE. At this time, function RBRIOO is a ONE. When functions RCAAL10, RRASPOO, RCEQR10 and RSMSTOO are all ONES, the inverter gate 3062 forces function RBDCXOO to a ZERO and function RBDCX10 to a ONE which signals an address cycle and enables the transfer of the contents of address register 2966 via buses 2061 and 2984 to bus 150.

The logic block 3040 generates release function RBRLLOO via gate inverter 3042 which is applied to on the bus when the Address Response RCAAL flip-flop of FIG. 8e has been set to a ONE (i.e. RCAAL10 = 1) and when an EOT character has been received by the COMM DCA and the fact of that event stored within the Receive Command block of FIG. 8e (i.e. RCEOS10 = 1). The release function RBRLLOO upon being applied to line OSB14OZ initializes the system placing it in a predetermined state by causing all the devices operating on-line to be switched to their ready state. The other gate inverter 3004 of logic block 3040 forces function RBREL10 to a ONE when a release function RBRELOO applied to line OSB14OZ is forced to a ZERO.

The block 3044 generates the requisite clear functions. Specifically, in response to a clear function RMSMCOO being forced to a ONE by the scanner 100, the block logic generates appropriate reset power clear function RCPOC10 via an inverter gate 3046 and amplifier gate 3047 which is forwarded to the various logic sections of the COMM DCA. Additionally, the COMM DCA applies a power clear function RTPOCOO to line OAB160Z via an inverter gate 3048.

The logic of block 3070 generates a bus busy function RBBSLOO to be applied to line OSB13OZ during an ON-LINE bus cycle (RROFCOO = 1). This function is forced to a ZERO signaling the bus is "busy" when the COMM DCA is either not active (RCACTOO = 1), or the Receive Command logic of FIG. 8e has set END character function RCEND10 to a ONE indicating the completion of a poll operation.

Additionally, block 3070 includes an inverter gate 3079 and an AND gate 3075. The gate 3079 in response to a busy function RBBSYOO being a ZERO forces function RBBSY10 to a ONE. The functions RBBSY10 and RBLAR10 feed AND gate 3075 which when active forces busy response function RBDBY10 to a ONE. Both functions RBBSYOO and RBBSY10 are applied to a Device Ready logic block 3080 which includes gates 3082, 3084, 3086, and 3088. The gates 3084 and 3086 force function RBDRY10 to a ONE and RBDRYOO to a ZERO when the device being addressed signals that it is ready by forcing bus line OSB13OZ to a ONE. And, functions RSASP10, RBRIOOO, RBBSYOO and RBDACOO force AND gate 3088 transfer function RBSDA1A to a ONE.

Also, when the COMM DCA receives a message indicating that the remote system does not want to receive further characters from a device (i.e. a wait condition), the COMM DCA by means not shown forces a function on gate 3072 to a ZERO. And, when there is a device failure, the COMM DCA will force function RC1CROO to a ZERO. Either of these functions will force gate 3072 to a ZERO which again signals the bus is "busy." Accordingly, when the COMM DCA is active (RCACTOO = 0), or an End of Character function has not been set (RCEND10 = 0) and there is no wait condition or no device failure, then function RBBSLOO is forced to a ONE indicating that the bus is "not busy."

Additionally, block 3070 includes an inverter gate 3079 which in response to a busy function RBBSYOO being ZERO forces function RBBSY10 to a ONE. Both functions RBBSYOO and RBBSY10 are applied to a Device Ready logic 3080 which includes gates 3082, 3084 and 3086. These gates force function RBDRY10 to a ONE and RBDRYOO to a ZERO when the device being addressed signals that it is ready by forcing bus line OSB13OZ to a ONE.

The blocks 3090 and 3100 include logic circuits for decoding the address code assigned to the COMM DCA and an ETX character code respectively. As shown, the ETX logic block 3100 feeds a Bus ETX stored (RBETS) flip-flop which switches to its ONE state during the data cycle (RBDAC10 = 1) of an ON-LINE bus cycle (RBOFCOO = 1) upon the receipt of a bus strobe (RBSSB10 = 1) generated by the COMM DCA logic 3020. The ETX decoder 3102, convention in design is equivalent to the scanner ETX decoder of FIG. 3c.

The block 3110 includes logic circuits for generating an idle check release function RBBCR10 via an AND gate 3114 signaling the failure of a device involved in the data transfer. Spedifically, when an idle funcation RBIDLOO applied via line OSB15OZ is forced to ground (to a ONE), this forces function RBIDL10 to a ONE which forces function RBBCR10 to a ONE during an ON-LINE bus cycle (RBOFCOO = 1) upon the generation of a strobe (RBSTBIC = 1). The function RBBCR10 is forwarded to the Idle Check Release block 2515 of FIG. 8e.

A last group of logic in FIG. 8c is the Ready Logic block 3120. As shown, it includes a Bus Ready Transmit RBRSL flip-flop 3122 with associated gates 3124, 3126 and 3128 in addition to a Bus Strobe taken flip-flop 3130 with associated reset gate 3129. The ZERO output of both flip-flops are ORed by gate 3132 and applied to RBRDL gate 3134 whose output is applied to line OSB17OZ.

When either memory is available (i.e. MMBAV10 = 1) then function RBBSL1B is forced to a ONE during a ON-LINE cycle (RBOFCOO = 1) which causes RBBSL flip-flop 3122 to be switched ot its ONE state upon the occurrence of a strobe pulse (RBSTB1C = 1). Also, when neither an ETX character has been received (RBETX10 = 0) nor a memory writing operation has been completed (i.e. memory is not full wherein MMWBF1S = 0) then function RBBSLOC is forced to a ONE which switches RBBSL flip-flop 3122 to a ONE. The flip-flop 3130 switches to a ONE upon receipt of strobe RBSSB10 and switches to a ZERO when function RBCNL10 is forced to a ONE.

Initially, when the functions applied to gate 3134 are ZEROS, function RBRDLOO is a ONE. When the COMM DCA is to generate an address response, the functions RCAAE10, RCEQR10, and RRASPOO will be all ONES. This conditions gate 3134 to force function RBRDLOO from a ONE to a ZERO. Thereafter, each time flip-flop 3122 switches to a ONE, it forces function RBBSLOS to a ZERO. However, in the absence of a strobe RBSSB10 being a ONE, the flip-flop 3130 remains in its ZERO state, and functions RBBSTOO and RBVDC10 force function RBRDLOO to a ZERO.

The logic block 3048 forces furnction RBVDC10 to a ONE when an input device forces bus line OSB18OZ to a ZERO which forces function RBIDA10 to a ONE signaling that is has applied a character on the bus 150. This causes functions RBRIOO, RBIDA10 and RBDAC10 to activate AND gate 3049 to force function RBVDC10 to a ONE. It will be noted that when flip-flop 3130 switches to a ONE, functions RBRSLOS and RBBSTOO when both ZEROS, causes function RBRDLOO to be forced from a ZERO to a ONE. This change of state in function RBRDLOO signals that the COMM DCA has accepted the data character applied to the bus 150.

The logic 3120 also includes an AND gate 3136 which forces function RBDDD10 to a ONE when both functions RBRDYOO and RBLAR10 are ONES. As shown, the function RBRDYOO is received from bus line OSB170Z and is forwarded to FIG. 8b.

The Bus interface logic of FIG. 8c applies its outputs to the Command Logic section 2400 as well as to the Memory and Control Section 2000. The Command Logic Section of FIG. 8 will now be considered in greater detail.

Decoder 2402

Referring to FIG. 8, it will be noted that the decoder 2402 decodes each of the characters loaded into the I/O register 2960 upon completing the assembling thereof when function RCDEC10 is forced to a ONE. The decoding is accomplished in a well known manner by combining the assertion and negation sides of the stages which comprise the I/O register 2960. Also, in some instances the decoder includes flip-flops (not shown) arranged to store indications of having decoded predetermined characters so as to be able to combine these results in order to decode predetermined character sequences. In effect, the Receive Section 2404, described herein, employs a similar technique for decoding the pertinent characters of certain character sequences described herein.

Receive Logic Section 2404 of FIG. 8d

Referring to FIG. 8d, it is seen that this logic section includes a plurality of flip-flops 2406, 2409, 2413, 2414, 2416, 2431, 2431 and 2441 with associated logic which comprise blocks 2405, 2407, 2415, 2420, 2430 and 2440 respectively. And, flip-flops 2456, 2460 and 2464 comprise block 2450.

In greater detail, a system address RRADS flip-flop 2406 of block 2405 switches to its ONE state via an AND gate 2408 which forces function RRADSIA to a ONE when the COMM DCA is in an address mode (RSADM10 - 1), the system address code assigned to the system applied to the I/O register is decoded by a jumper card 2412 and by an AND gate 2410 forcing function RRADSIB to a ONE and when bits 5 and 6 of the same code are ONES. A hold function RRASH10 when forced to a ZERO, resets RRADS flip-flop 2406 to its ZERO state.

The RRSASS flip-flop 2409 of block 2407 switches to a ONE when the block 2405 forces system address function RRADS1A to a ONE and bit 7 of the system address character is a ONE. And, the flip-flop 2409 is reset to a ZERO by hold function RRADH10.

The flip-flops 2413 and 2414 of block 2411 are switched to their ONE states respectively when the decoder 2404 decodes a "NAK" character (i.e. forces RRCNK10 to a ONE when RRSTXOO is a ZERO) and "DLE" character (i.e. forces RRCDE10 to a ONE). The remote data processing systems transmits a "-NAK" character to acknowledge the fact that the message transmitted by the COMM DCA was in error. When the data processing system acknowledges the message transmitted by the COMM DCA as good, it transmits the "DLE" character followed by either a "0" character or a "1" character. The "0" character and "1" character will cause the decoder 2404 to force functions RRCOO10 and RRCO110 to ONES respectively. And, by ANDing these two functions individually with the function RRDLE10 from flip-flop 2414, the COMM DCA decodes two types of acknowledgement sequences referred to herein as ACKO and ACK1. These sequences indicate the receipt of an even numbered block and an odd numbered block of data without errors. The numbering of acknowledgements prevents the loss or duplication of transmitted messages.

Both flip-flops 2413 and 2414 are reset to their ZERO states via their hold gates when an EOT character is decoded by decoder 2404 which forces function RRCEROO to a ZERO. Additionally, when the last character of a message is transmitted, the COMM DCA forces function RXTLCOO to a ZERO which also resets flip-flop 2413 to a ZERO. And, each time a character is applied to decoder 2404 by forcing function RCDECOO to a ZERO, flip-flop 2414 is switched to its ZERO state.

The RRENQ flip-flop 2416 of block 2415 switches to a ONE when the decoder 2402 decodes an ENQ character forcing function RRCEQ10 to a ONE and either function RRAID10 or RRAIOD10 is forced to a ONE which forces function RRENQ1B to a ONE by activating an inverter AND gate 2418. In a similar manner, when function RRADH10 is forced to a ZERO, flip-flop 2416 resets to a ZERO.

In response to a device address code, the functions RRAID10 and RRAOD10 are generated by flip-flops 2421 and 2431 respectively of blocks 2420 and 2430 The flip-flop 2421 switches to a ONE when the system is in an address mode (RSADM10 = 1), bit 7 is a ZERO, bits 5 and 6 are ONES and system address function RRADS10 is a ONE. By contrast, flip-flop 2430 sets to a ONE under similar conditions indicated above except that address code bits 6 and 7 are ZEROS. Both flip-flops are reset to ZEROS via hold function RRADH10. This function sets to a ONE in accordance with the following equation: RRADH10 = RCEDCOO + RRENQ10 + RRASP1A + RRAID1A + RRAOD1A + RRENQ1A. This means when any of the above flip-flops are switches to a ONE or function RCDECOO is a ONE, function RRADH10 also is a ONE which maintains each of the flip-flops 2406, 2416, 2421 and 2431 in their respective states. These functions are ANDed with functions RRCEROO and RXMSIOA which are ONES in the absence of having received an EOT character and the Message State counter not being incremented.

The RRASP flip-flop 2441 of block 2440 is switched to its ONE state when the decoder 2404 decodes a "0" character forcing function RRCOO10 to a ONE, the COMM DCA is in its initial or address mode wherein function RSADM10 is a ONE, and the same character has bits 6 and 7 coded to specify an input device transfer wherein function RRAiD1A is a ONE. The function RRADH10 also is used to reset flip-flop 2441 to its ZERO state.

It will be noted that gates 2441 and 2445 force a data poll received function RRDPROO to a ZERO when functions RCEQR1A, RRSASSOO and RRAODOO are ONES. This function when forced low signals the Communication Timing Control 2970 that the data set is clear to send.

A last group of logic circuits in block 2450 include an STX Stored Data flip-flop 2456, an ETB Stored Data (RREDB) flip-flop 2460 and Last Data Received (RRLDR) flip-flop 2464. The flip-flop 2456 switches to a ONE when the COMM DCA decoder 2404 decodes an STX character which forces receive function RRSCX10 to a ONE. The flip-flop 2356 remains in this state until the decoder 2404 decodes an ETX character or ETB character or an EOT character which forces functions RRCEX10, RRCEB10 or RRCER10 to ONES, respectively. Accordingly, gates 2454 and 2458 force hold function RRSTXOA to a ZERO resetting the flip-flop 2456 to its ZERO state. Also, either function RRCEB10 or RRCEX10 will switch End of Block (RREBD) flip-flop 2460 to its ONE state forcing function RREDB10 to a ONE. This function together with functions RSSLV10 and RCDEC10 activates RRLDR AND gate 2452 to switch flip-flop 2464 to its ONE state. The RREDB flip-flop 2460 is reset to a ZERO when an EOT character is received which forces function RRCEROO to a ZERO and causes hold function RRCCH10 to be forced to a ZERO. The RRLDR flip-flop 2464 resets to a ZERO when memory switch function MMMSH10 generated by the logic of FIG. 8b is forced to a ZERO.

Receive Subcommand Generator 2500 of FIG. 8e

This section, as mentioned, includes the control logic for generating the pertinent control signals for handling the transfers within the COMM DCA. Referring to FIG. 8e, it will be noted that the Section includes COMM Character Present to Line Unit logic block 2502, a Device Ready logic block 2510, an Idle logic block 2515, an Active logic block 2520, a Transfer logic block 2555 and a Character Store and Reset logic block 2590.

As shown, the block 2502 includes a Character Present RCCHP flip-flop 2504 which sets to a ONE when a Message Transmit function RXMSS10 is a ONE, or the COMM DCA is ready to transfer data characters to the I/O register 2960 (functions MMCHP10 and RCFMM10 are ONES) or a character is ready for transfer (Increment function RXMSIIO = 1 or RXMSS10 = 1). The function RCRMM10 is forced to a ONE by the Message logic of FIG. 8g which is operative to force functions either RXMS210 and RXSDB10 or RXMS210 and RXSDX10 to ONES as described herein.

The flip-flop 2504 resets to its ZERO state each time the character transferred to the I/O register 2960 has been transmitted, at which time character taken function DDCHT10 is a ONE which forces function DDCHTOO to a ZERO.

The next block 2510 includes Ready RCDRY flip-flop 2512 which switches to a ONE when the COMM DCA is active (RCAAL10 = 1) and when a ready response is received from the Bus Interface Logic which forces function RBDRY10 to a ONE. The flip-flop 2512 resets to a ZERO when the Message logic has transmitted a last character (RXTLCOO = 0). For example, the function RXTLCOO is forced to a ZERO in accordance with the equation: RXTLCOO = RXMS410 (RXSDX10 + RXSCX10 + RXSDB10).

The block 2515 includes an Idle check RCINC flip-flop 2516 which sets to a ONE when the Bus Interface logic 3110 forces function RBBCR10 to a ONE. The flip-flop 2516 resets to a ZERO when the reset function RCRSTOO is forced to a ZERO.

The block 2520 includes the logic circuits which places the COMM DCA in an active status. As shown, this logic includes series connected flip-flops 2544, 2542 and 2540 whose outputs are used to derive the appropriate control functions for enabling the COMM DCA to perform device addressing as explained herein. The RCAAE flip-flop 2544 switches to a ONE by AND gate 2528 when both gates 2522 and 2536 force functions RCBAD10 and RCEQR10 to ONES when a strobe pulse is applied thereto (RBSTB1C = 1). The AND gate 2522 activates when the COMM DCA address code has been decoded by the logic 2090 of FIG. 8c forcing functions RBBAD1A and RBBLZ10 to ONES, during the address interval (RBDACOO = 1) of an ON-LINE cycle (RBOFCOO = 1). The AND gate 2536 activates when functions RCEQR10 and RCEQR1A are both ONES. Also, when the COMM DCA has received an EOT character (RCEOS10 = 1) and the Memory Switch logic section indicates that Memory is empty (MMMBE10 − 1), then RCAAE flip-flop 2544 switches to a ONE, during an OFF-LINE bus cycle (RBOF10 = 1). When switched to a ONE, flip-flop 2544 in turn causes flip-flops 2542 and 2540 to be switched to ONES sequentially. In particular, the ONE output of flip-flop 2544 resets to a ZERO when RCAAF flip-flop 2542 switches to a ONE. Similarily, RCAAF flip-flop 2542 resets to a ZERO which RCAAL flip-flop switches to a ONE. And, during an OFF-LINE bus cycle (RBOFCOO = 0), RCAAL flip-flop resets to a ZERO. The active RCAAT flip-flop 2546 resets to a ZERO when reset function RCRSTOO is forced to a ZERO by the logic of block 2590.

The block 2555 includes the logic for generating several of the register transfer and control functions mentioned above. As shown, these include device address register to line function RCLAD10 which is generated when the Message logic of FIG. 8g forces function RXSOH10 to a ONE when message step logic function RXMS310 to a ONE when message step logic function RXMS310 is a ONE. Also, Bus Interface function RBDCX10 when forced to a ONE by block 3060 of FIG. 8c forces function RCLAD10 to a ONE which transfers the address code contents of the register 2966 to the bus 150.

The transfer functions M1CTM10 and M2CTM10 are generated by AND gates 2560 and 2562 respectively. In particular, when transfer function RCDEC10 is a ONE, an ETB character has not been received (RRCEBOO = 0), and an STX character has been received (RRSTX10 = 1), flip-flop 2564 switches to its ONE state and remains in that state for one PDA pulse applying function RCSC110 to gates 2560 and 2562. Conversely, when an ETB character is received (RRCEBOO = 0), the flip-flop 2564 remains in its ZERO state. Accordingly, either of gates 2560 or 2562 are enabled when function RCSCl10 is forced to a ONE when its associated memory is ready to have data characters written therein (i.e. M1WMF10 = 1 or M2WMF10 = 1).

The function RCDEC10 AND gate 2582 when activated by function DDCHP10 from Timing and Control 2970 indicating that there is a character present forces function RCDEC10 to a ONE which enables the contents of the I/O register 2960 to be applied to the decoder 2402 transfer bus 2960 or to either Memory 1 input register 2042 or Memory input register 2142. Additionally, function RCDEC10 is inverted by inverter gate 2584 and applied to Timing and Control 2970 which in turn forces function DDCHP10 to a ZERO which resets flip-flop 2583 to a ZERO and forces function RCDEC10 to a ZERO. When a next character has been assembled, the control 2970 again forces function DDCHP10 to a ONE.

A transfer I/O register function RCCID10 is generated when the Receive logic forces either function RRAID1A or RRAOD1A to a ONE. The function RRCID10 also activates a gate 2572 forcing transfer function RCDAL10 to a ONE. These functions transfer the address code in the I/O register into the device address register 2966 of FIG. 8.

The block 2555 further includes an AND gate 2574 which is activated when the bus ready response function RBDRY10 is forced to a ONE by the Device Ready logic block 3080 of FIG. 8c. The function RRSASSOO is normally a ONE unless the terminal is handling a status request as described herein.

A gate 2571 when activated in response to either functions RXSAD10 and RXMS110 or RSXOH10 and RXMS210 being ONES, forces system address to I/O register function RCSAS10 to a ONE. This transfers the system address code to the character generator 2900 of FIG. 8. Additionally, gate 2573 in response to either function RCFMM10 for functions RXSOH10 and RXMS310 being ONES, forces function RCCOA10 to a ONE and RCCOAOO to a ZERO. These functions in turn transfer the output of either the character generator 2900 or the bus logic gates 2980 via transfer buses 2981 and 2982 respectively into the output register 2950 of FIG. 8.

A last block 2590 of FIG. 8e includes an EOT stored RCEOS flip-flop 2592 which switches to a ONE state when the decoder 2402 decodes an EOT character forcing function RREOT10 to a ONE. And, when the Bus logic block 3040 forces a release function RBREL10 to a ONE indicating the completion of the data transfer operation, this function together with bus timing function RBNCD10 from block 3010 switches flip-flop 2592 to its ZERO state by forcing hold function RBRNLOO to a ZERO.

The block 2500 further includes a Repeat Message logic flip-flop 2600 which switches to its ONE state when the decoder 2404 decodes character sequences defining either a bad message (RRNAK10 = 1) or receipt of a DLE character (i.e. RRDLE10 = 1) when either the COMM DCA is in other than in the master status (i.e. RSMST10 = 0) or has not received a message to wait from the data processing system (RRDLK10 = 0). The flip-flop 2600 resets one PDA pulse later to its ZERO state. The ONE side of flip-flop 2600 will activate an AND gate 2602 to force function RCRPD10 to a ONE when either the COMM DCA transmitted has an ENQ character (RXENQ10 = 1) inquiring when the system is able to receive data and a good acknowledgement has not been received (RRACKOO = 1) or the decoder 2402 has decoded a character or a predetermined sequence of characters indicating the last message is erroneous or bad (i.e. function RRNAK10 = 1) when the COMM DCA is in the Master status (RSMST10 = 1). The output of AND gate 2602 is applied to the Memory Switch logic of FIG. 8b.

A further flip-flop 2610 referred to above as the Receive to Transmit Allow-flip-flop is also included in block 2590 and when switched to its ONE state it conditions the communications facility to transmit characters a bit at a time via Data Out line of FIG. 8. In particular, this flip-flop switches to a ONE when one of the functions within the sets of functions applied to gate 2612 is a ZERO. That is, when an EOT character is to be transmitted then function RXEOTOO is a ZERO, or when an ENQ character has been decoded (RRENQOO = 0), or when the system address character has been received (RSTADOO = 0), function RCRTA10 is forced to a ONE which switches RCRTF flip-flop 2610 to its ONE state. The ONE output of flip-flop 2610 is forwarded to the data set and is used to generate the REQUEST to SEND DATA function as described above. Also, the same output is ANDed with timing function RTT9S10 and RSSLV10 by gate 2614 to force function RCEDM10 to a ONE. This function is applied to the Memory Switch 2200 and in particular as an input to the M1MPC and M2MPC flip-flop so as to define the precise time at which memory is to switch.

The block 2590 also includes gates 2618, 2620, and 2622 which are arranged to force reset function RCRST10 to a ONE which in turn is used to switch certain of the flip-flops within FIGS. 8c and 8b to their ZERO states. When an EOT character has been received (RCEOS10 = 1) and a memory has had all of its contents read out to a receiving device at which time function MMMBE10 is a ONE, these functions force an inverter gate 2608 functio RCRSTOO and RCRST10 to a ZERO and a ONE respectively. It will also be noted that when any other of the functions RXEOTOO and RTPCCOO are ZEROS, AND gate 2620 will force function RCRSTOO to a ZERO and reset function RCRST10 to a ONE.

State Logic Section 2650 of FIG. 8f

The decoder 2402, in addition to having some of its output lines applied to the Receive logic 2404, also applies certain of its output lines to the Message State Logic Section of FIG. 8f. Referring to this section, it will be noted that this section includes a plurality of flip-flops 2654, 2664, 2666, 2672 and 2686 and associated gating logic within their respective blocks 2652, 2663, 2665, 2670, and 2685.

The logic block 2652 includes the master status flip-flop 2654 which when in its ONE state places the COMM DCA in a transmit status. As shown, RSMST flip-flop 2654 switches to its ZERO state either when the Power Clear function RCPOCOO is forced to a ZERO (i.e. when the system is initialized) or then the Message Logic Section of FIG. 8g generates an EOT character which causes function RXEOTOO to be forced to a ZERO. The flip-flop 2654 is switched to a ONE when Receive RRENQ and RRAID flip-flops 2416 and 2421 of FIG. 8d both are ONES, a device ready signal has been received by the Receive Command logic (RCGOM10 = 1), and the device scanner 100 has generated a control pulse (RBCONIC = 1).

The block 2663 includes a single flip-flop 2664 which is switched to its ONE state when decoder 2402 decoded a character sequence specifying a system poll request which forced function RRASP10 to a ONE after the decoder 2402 decodes an ENQ character which forced function RRENQ10 to a ONE. The flip-flop 2664 is reset to its ZERO state when master state flip-flop 2654 is in its ZERO state.

The block 2665 includes a slave state flip-flop 2666 which when in its ONE places the COMM DCA in a Receive or slave status. The flip-flop 2666 switches to a ONE when the decoder 2402 has decoded an STX character forcing function RRCXSX10 to a ONE and when the terminal system has been addressed (RSTAD10 = 1). And, when the Receive Command logic of FIG. 8e forces reset function RCRST10 high, it causes the RSSLV flip-flop 2666 to switch to its ZERO state. The ZERO output side of this flip-flop is ANDed with Master Status function RSMTOO so that when both flip-flops are in their ZERO states, Address Mode AND gate 2618 is activated and forces function RSADM10 to a ONE.

The block 2670 includes a Send Header RSSOH flip-flop 2672 which sets to its ONE state via function RSMR1A when master status flip-flop 2654 is to be switched to its ONE state. As shown, the flip-flop 2672 is reset to a ZERO via forcing its hold function RSSOHOC to a ZERO which occurs when either a message has been acknowledged as good (RRACK10 = 1) and the COMM DCA is in synchronization with the communications facility (DDSY210 = 1) or an EOT character has been received (RRCEROO = 0).

The last block 2685 included in this section has a Terminal Address flip-flop 2686 which sets to a ONE when RRENQ flip-flop 2416 has been switched to a ONE (RRENQ10 = 1). The flip-flop 2686 is set to its ZERO state along with RSMST flip-flop 2604 when hold function RSMSTOA is forced to a ZERO which inactivates its hold AND gate 2688.

Control Character Logic Section

The control character generator logic section 2900 of FIG. 8 will now be described in greater detail. This logic section causes the appropriate character sequences to be generated in response to certain message requests from the remote data processing system and the initiation of the various states of control during such message transfers. The character generator comprises eight AND/OR gate sections labeled RCCG1 through RCCG8 in FIG. 8. The control generator sections combine the states of pertinent control functions generated by the Message Logic of FIG. 8g and those state functions generated by the Message State Counter Stages MS1 through MS5 to generate the desired bit codes for each of the control characters in the sequence desired.

Only those sequences involved during data transfer and the functions involved in generating these sequences will be described in detail herein. These character sequences are generated in accordance with USASCII control procedures for data communications for point-point-and multipoint communication systems including Data Link Escape (DLE) extensions which are employed for supervisory sequences. Also, each of the characters in each message preferably comprise the American Standard Code for Information Interchange (ASCII) synchronous communications code wherein each data code character comprises 7 bits and a parity bit. For further details of the above, reference may be made to a document titled the "Proposed USA Standard for Communication Control Procedures for the USASCII," April, 1968 published by the U.S.A.

In general, the COMM DCA begins a data transfer with a start of Header (SOH) character, followed by a system address (SAS) character, an input device (ID-CA) address character, the data characters from the first of the memories followed by an End of Block (ETB) character or an End of Text (ETX) character and a block check character. After the COMM DCA transmits the first block and receives an acknowledgement from the remote data processing system, it transmits a next block of data characters and begins this message with an STX character if the preceding block ended in (ETB). It then follows this with data characters from the other of the memories then an ETB character of an ETX character and a block check character.

The logic circuits which condition the generator are shown in greater detail in FIGS. 8g and 8h. And, the various functions and the state of the Message Step Logic of FIG. 8 for generating the various Message character sequences are summarized in the table herein.

TABLE-TRANSMIT MESSAGE SEQUENCE

| FUNCTIONS | MS1 | MS2 | MS3 | MS4 | MS5 |
|---|---|---|---|---|---|
| RXSOH10 | SOH | SYS ADD CHAR | IDCA ADD CHAR | | |
| RXSDX10 | STX CHAR | DATA CHAR | ETX CHAR | | |
| RXSDB10 | STX CHAR | DATA CHAR | ETB CHAR | | |
| RSSCS10 | STX CHAR | CAN CHAR | ETX CHAR | | |

| | | |
|---|---|---|
| RXEOT10 | EOT CHAR | |
| RXSAD10 | SYSTEM ADDRESS | |
| RXDA110 | DLE CHAR | 1 CHAR |
| RXDAO10 | DLE CHAR | 0 CHAR |
| RXDLJ10 | DLE CHAR | J CHAR |
| RXDLT10 | DLE CHAR | CHAR |
| RXDLA10 | DLE CHAR | A CHAR |
| RXDLB10 | DLE CHAR | B CHAR |

Message Logic Section 2702 of FIG. 8g

Referring to FIG. 8g, it will be noted that the major portions of the Message logic section include blocks 2704, 2740, 2764, 2770 which generate the requisite control functions for the above mentioned message sequences. In particular, block 2704 includes flip-flops 2706, 2708 and 2710 whose outputs are combined with predetermined outputs of the Message State Counter stages MS1 through MS5 to condition the character generator to generate the character sequences STX, CAN, ETX, or STX and ETX, or STX and ETB respectively. The block 2750 includes the flip-flops 2752 and 2754 with associated logic gates which together condition the character generator 2900 to transmit an SOH character. The system address character is transmitted by the character generator 2900 when conditioned by flip-flop 2765 of block 2764 and the message state counter outputs.

The flip-flops 2771, 2776 and 2777 and associated gates comprise block 2770. The logic block 2770 conditions the character generator 2900 together with the message state counter of FIG. 8 to transmit either the character DLE and "0" or the characters DLE and "1" to acknowledge messages from the remote data processing system. And, the blocks 2780 and 2785 include a send EOT character flip-flop 2782 and an abort message flip-flop 2786 whose outputs together with the Message State Counter conditions the character generator 2900 to transmit an EOT character and a message consisting of characters DLE and J respectively. The operation of the above flip-flops will be described in connection with the type of message sequence that are used in transmitting.

Messages Indicating Input Device Failure/Output Device Failure

Considering the RXSCX flip-flop 2706, it will be noted that this flip-flop switches to a ONE when the Bus interface logic of COMM DCA senses a device failure which forces function RBBCR10 to a ONE which sets RCICR flip-flop 2516 of FIG. 8e to a ONE. This in turn forces function RXSCX1A to a ONE when function RXSDX1B is a ONE. The function RXSDX1B is a ONE when an SOH character has been transmitted (RXSOH10 = 1), during Message State three (RXMS310 = 1) and during the presence of an Increment signal (RXMSI1A = 1). Also, function RXSCX1B is a ONE when a first data block has been transmitted and acknowledged (RSSOHOO = 1) and an acknowledgement has been received to a subsequent block of dtaa (RRACK1D = 1). Thereafter, the ONE output of RXSCX flip-flop conditions an AND gate 2707 along with a function RXMS110 to become active in turn causing the character generator to transmit a STX character. And, after that character is transmitted via the data set, the function RXSCX10 together with functions RXMS210 and RXMS210 activate further AND gates 2709 and 2711 to cause the character generator 2900 to generate CAN and ETX characters respectively.

It will be noted that in case of a first data block prior to RXSCX flip-flop 2706 being switched to a ONE, that function RCICR10 together with function RSSOH10 activates RSXOH gate 2760 which forces function RXSOH1C to a ONE. The function RXSOHIC and function RXSCXIC activate gate 2756 and switches RXSOH flip-flop 2752 and flip-flop 2754 to ONES. The function RXSCX1X is a ONE at this time because RXSCX flip-flop is in its ZERO state (RXSCX10 = 0) and gate 2736 is inactive (RXSCX1A = 0).

Now with flip-flop 2754 in a ONE state, function RXSOH10 together with function RXMS110 causes an AND gate 2753 to become active and condition the character generator to transmit an SOH character whereafter the Message counter is incremented to Message state 2. The ONE output of RXSOH flip-flop 2754 also is applied to the transfer RCSAS gate 2571 of FIG. 8e. The function RXSOH10 together with function RXMS210 activate AND gate 2571 and cause the system address code to be transmitted by applying same to the first four gates (RCCG1 through RCCG4) of the character generator 2900. Thereafter, functions RXSOH10 and RXMS310 activate the gates 2557 and 2573 of FIG. 8e which causes the input device address code to be transferred from the register 2966 to the I/O register 2964. The function RXMFH10 is forced to a ZERO by the Logic Section of FIG. 8h which resets flip-flops 2754 and 2706 to their ZERO states.

Also, the flip-flop 2706 will be switched to a ONE by function RXSDX1B when the Repeat Message RCRPD flip-flop is a ONE causing function RCRPD10 to be a ONE. That is, if the COMM DCA does not receive a proper acknowledgement to the above message by data processing system, the repeat function RCRPD10 will be a ONE and together with function RXSDX1B will activate gate 2738 which in turn will again switch flip-flop 2706 to a ONE. Accordingly, the previous message characters STX, CAN and ETX, are repeated.

When a proper acknowledgement is received, function RRACK10 is forced to a ONE which causes the RSSOH flip-flop 2672 of FIG. 8f to be switched to its ZERO state by forcing hold function RSSOHC to a ZERO which forces function RSSOHOO to a ONE. At the same time, RXSOH flip-flop 2752 is switched to its ZERO state by hold function RSSOHOC.

In summary, when the COMM DCA senses an input device failure, during the processing of a first block it sends the message: SOH character, AS character, AID character, STX character, CAN character and ETX character. The CAN character informs the remote data processing system of the device failure and that the block of data characters being assembled in memory is effectively lost.

And, when the COMM DCA senses an output device failure, it sends the message: "DLE" character and "J" character. The message informs the data processing system that the terminal device is unable to complete the data transfer.

The technique used in determining a failed device is described in detail in the copending application titled "An Automatic Terminal Deactivation Device" of Robert E. Huettner and Edward B. Tymann. However, for the purposes of this application it is sufficient to stage that when a device fails, the COMM DCA by monitoring a pair of lines switches its idle check release (RCICR) flip-flop in FIG. 8e to its ONE state indicating the failure.

Similar to the above, when the Idle Check control flip-flop 2516 of FIG. 8e switches to a ONE during a data transfer involving an output device (i.e. function RSSLV10 = 1), it switches RXDLJ flip-flop 2786 of block 2785 to a ONE. Accordingly, this forces function RXDLJ10 to a ONE which together with function RXMS110 activate an AND gate 2788. The gate 2788 conditions the character generator 2900 to transmit a DLE character. After, this character has been transmitted by the data set, functions RXDLJ10 and RXMS210 activate an AND gate 2789 to condition the character generator 2900 to transmit a J character. When the Message state counter is again switched to its first state, as explained herein, it forces function RXMFH10 to a ZERO which switches flip-flop 2786 to its ZERO state.

Message-Including Transfers of Memory Contents

Also, the flip-flop 2754 is used to condition the character generator 2900 to generate the message consisting of characters SOH, AS, IDCA address, STX, DATA and ETB. In particular, the flip-flop 2754 is switched to its ONE state via gates 2758, 2762, 2760 and 2756 by functions RSSOH10, RSMST10, MMSRF10 and RXSDXOO being ONES. The functions RXSOH10 and RXMS110 condition the character generator to generate an SOH character. Thereafter the functions RXSOH10 and RXMS210 cause the Receive Command logic of FIG. 8e to force transfer function RCSAS10 to a ONE causing the character generator to apply system address AS character to the I/O register. And, after the AS character is transmitted, functions RXSOH10 and RXMS310 cause the command logic of FIG. 8e to force transfer functions RCLADIO and RCCOA10 to ONE so as to transfer the Input device address character to the I/O register 2960.

Next, the functions RXSOHIO, RXMS310 and increment function RXMSI1A activate AND gate 2724 which in turn causes RXSDB flip-flop 2710 to be set to its ONE state via gate 2718 when the Memory logic of FIG. 8b forces memory function MMETB10 to a ONE. The function MMETB10 is forced to a ONE when the MMETB flip-flop 2310 of FIG. 8b switches to its ONE state when one of the memries has been completely loaded with data characters (i.e. either function MIETBIO or function M2ETB10 is a ONE) and when the contents of the filled memory are to be read out to the I/O register (i.e. MISRF10 or M2SRF10 are ONES).

The flip-flop 2710 in turn forces function RXSDB10 to a ONE and together with function RXMS110 activates AND gate 2716 causing the character generator to apply an STX character to the I/O register 2960. When the STX character has been transmitted, function RXMS210 together with function RXSDB10 activates gate 2506 of FIG. 8e which in turn forces transfer function RCCOA10 to a ONE thereby permitting data characters to be transferred from memory into the I/O register 2960 as long as RXSDB flip-flop remains in its ONE state. When all of the data characters have been transferred, the Memory Switch 2200 forces function MMSBE10 to a ONE which together with functions RXSDB10 and RXMS210 force function RXMS310 to a ONE as described herein. The functions RXSDB10 and RXMS310 activate AND gate 2714 which causes the character generator to apply an ETB character to the I/O register. If the same data is to be re-transmitted, retransmit function RCRPD10 is forced to a ONE which will activate gates 2758 and 2756 to switch RXSOH flip-flop 2754 to a ONE. Accordingly, the same message is retransmitted. However, upon receipt of a proper acknowledgement, the memories switch and an STX character is generated as the first character of the second block of data characters because RXSDB flip-flop 2710 is still a ONE which in turn inhibits AND gate 2762 preventing flip-flop 2752 from being switched to its ONE state.

It will be noted that when function MMETB10 is a ZERO then RXSDX flip-flop 2708 switches to a ONE. This forces function RXSDX10 to a ONE which together with RXMA110 activates gate 2716 causing the character generator to generate an STX character. In a similar fashion, functions RXSDX10 and RXMS210 force function RCCOA10 to a ONE and enable data characters to be transferred to the I/O register 2960. And, when the transfer is complete, the functions RXSDX10 and RXMS310 activate AND gate 2711 causing the character generator to apply an ETX character to the I/O register. The flip-flop 2708 when set to its ONE state also causes an STX character to be generated as the first character of the second block of data characters.

Transmit Acknowledge Message

The flip-flop 2765 together with flip-flops 2771 and 2776 are operative to generate a message consisting of the characters AS, DLE and "0." The RXSAD flip-flop 2765 switches to its ONE state when the COMM DCA becomes active at which time the Bus Interface Logic of FIG. 8c forces function RBLAR10 to a ONE which activates an AND gate 2767 causing the aforementioned switching.

Initially, the function RXMFH10 will be a ZERO which will reset both flip-flops 2771 and 2777 to their ZERO states. The function RRSEL10 is a ONE indicating that a device has been selected by the remote data processing system, as explained herein, which causes the Message State Counter to be set to its first state (i.e. RXMS110 = 1) as described herein. Accordingly, functions RXSAD10 and RXMS110 cause the Receive Command logic to force function RCSAS10 to a ONE which conditions the character generator to transfer the system Address AS character to the I/O register 2960.

When the AS character has been transmitted, the Message State counter is switched again to state 1 (i.e. RXMS210 = 1). When the device signals that it is ready, function RCDRY10 is forced to a ONE and this function together with function RRSEL10 activates an AND gate 2773. Also after the AS character is sent, an AND gate 2774 is activated when function RXSDI10 is forced to a ONE by functions RXMSI1A and RXSAD10 which activate an AND gate 2766 of block 2764. Both gates 2773 and 2774 cause flip-flop 2771 to be switched to its ONE state. This forces function RXDA010 to a ONE which together with function RXMS110 activates an AND gate 2779a. The gate 2779a conditions the character generator 2900 to apply a DLE character to the I/O register 2960. After the DLE character is transmitted by the data set, the Message state counter is incremented to state 2 (i.e. RMXS210 = 1). The functions RXMS210 and RXDA010 activate an AND gate 2779b to condition the character generator 2900 to apply a "0" character code to the I/O register via the transfer bus.

Upon receipt of the message, the data processing system will initiate a data transfer. When the COMM DCA receives an STX character, it forces function RRCSX10 to a ONE which switches RXDOO flip-flop 2776 to its ONE state. And, when the COMM DCA receives the last character, it forces function RRLDR10 to a ONE which via RRMRS10 in turn causes flip-flop 2777 to be switched to its ONE state. The functions RXDA110 and RXMS110 condition the character generator 2900 via an AND gate 2778 to transfer a DLE character to the I/O register. When the DLE character has been transmitted, the Message State counter is incremented by one to its second state (i.e. RXMS210 = 1). The functions RXMS210 and RXDA110 activate an AND gate 2780 which conditions the character generator 2900 to transfer a "1" character to the transfer bus.

When the STX character of a next message is received, the COMM DCA resets RXDOO flip-flop 2776 to its ZERO state which in turn enables the RXDAO flip-flop 2771 to be switched to its ONE state when the COMM DCA receives the last character of the message at which time it will again force function RRLDR10 to a ONE. Accordingly, functions RXDA010 and RXMS110 will activate an AND gate 2779a which again cause the character generator to transfer the characters DLE and "0" to the I/O register. Accordingly, the COMM DCA generates the DLE, O and DLE, 1 character pairs alternately for each message. When the COMM DCA detects a parity error or block check error, it forces a function RXMAKOO to a ZERO which inhibits the generation of either of the above acknowledgement responses and sets another flip-flop not shown which conditions the character generator to apply a "NAK" character code to the output of transfer bus to the I/O register.

Messages Indicating Device Status

Each of the flip-flops 2791, 2796 and 2801 of FIG. 8g are operative to generate one of a plurality of messages indicating the status of the device being interrogated. Specifically, the flip-flop 2791 is switched to a ONE when the Bus Interface Logic section senses that the device interrogated has signaled ready. The flip-flop 2791 conditions the character generator to generate a message including the characters DLE, 0.

If however, the Bus Interface Logic section senses that the device queried has signaled "busy," the flip-flop 2796 will be switched to its ONE state. The flip-flop 2796 will thereafter condition the character generator to generate a message including the characters DLE, A.

Lastly, if the Bus Interface Logic section senses no response from the device queried, then it will cause flip-flop 2801 to be switched to its ONE state. And, the flip-flop 2801 will condition the character generator to generate a message including the characters DLE, B.

Message Step Increment Logic

Referring to FIG. 8b, it will be noted that the block 2850 includes a Message Step Logic Section 2852 and Message Step Increment Logic Section 2880. The Section 2802 generates the Message Step Set Function RXMSS10 which sets the Message State Counter of FIG. 8b to a count of ONE.

At the same time, function RXMSS10 forces function RXMFH10 to a ZERO which switches a number of the control flip-flops of FIG. 8g to their ZERO or reset states. The five stages of the Message State Counter of FIG. 8 are arranged to function as a ring counter wherein only one of its stages is a ONE at any given time. The counter stages are reset to ZEROS when a hold function RXMSH10 is forced to a ZERO when either function RXMSIOA or DATA SET REQUEST TO SEND function DDDRSOA is a ZERO. The function RXMSS10 is forced to a ONE by AND gate 2856 activated when the counter stages are all ZEROS together with function RXMSS1B being a ONE. The function RXMSSB is a ONE when message state counter stage MS5 is a ZERO (i.e. RXMS510 = 0), and when the output of either AND gate 2860 or AND 2862 is a ZERO. The output of AND gate 2862 is a ZERO when either functions RXSOHIA and RXSDX-1A are ONES or functions RXSDB1A and RXSCX1A are ONES. The output of AND gate 2860 id a ZERO when functions RXENQ1A and RXDLK1A are both ONES of functions RXEOT1A and RXNAK1A are both ONES or when functions RRSEL10 and RXDLJ1A are ONES. Additionally, function RXMSS10 is forced to a ONE when increment function RXMSI1A is a ONE and a gate 2884 is activated by either functions RXSAD10 and RXMS110 or functions RXSOH10 and RXMS310.

The function RXMSI1A is forced to a ONE when an AND gate 2886 is activated by functions DDCHTOO and RXMSIB being forced to ONES. When the character is transferred to the I/O register 2960, the control 2970 forces function DDCHT10 to a ZERO which causes inverter gate 2838 to force function DDCHTOO to a ONE. This causes the Message State Counter to be incremented by one to its next highest state via gates 2836 and 2832 when function RXMSI1B is a ONE. When a block of characters have been transmitted, the function Set Read Memory Empty (MMRBE10) is forced to a ONE. The function MMETBOO is a ONE when an ETX character has been decoded. These functions together with function RCFMM10 activate gate 2840 causing the aforementioned incrementing of the Message State counter. As previously mentioned, the function RCFMM10 is a ONE when the Message Counter in message state 2 (i.e. RXMS210 = 1) and either function RXSDB10 or RXSDX10 is a ONE. Accordingly, after incrementing, the Message State Counter will be in Message State 3 (i.e. RXMS310 = 1).

When the Message State Counter is in other than Message State 2, the function RCFMM00 is a ONE. Accordingly, after a character is transmitted, function DDCHT10 goes to a ZERO, and the AND gate 2886 is activated to increment the Message State Counter to its next state. The function DDCHT10 is delayed by one PDA pulse so as to have the increment function RXMSI1A at a ONE for one PDA pulse. When the COMM DCA switches from transmit to receive, function DDRSOA is forced to a ZERO which forces hold function RXMSH10 to a ZERO which resets all of the Message Counter States to ZEROS.

Description of Operation

The operation of the system of FIG. 1 will now be described with particular reference to the flow charts of FIGS. 9a through 9e.

Figure 9A:
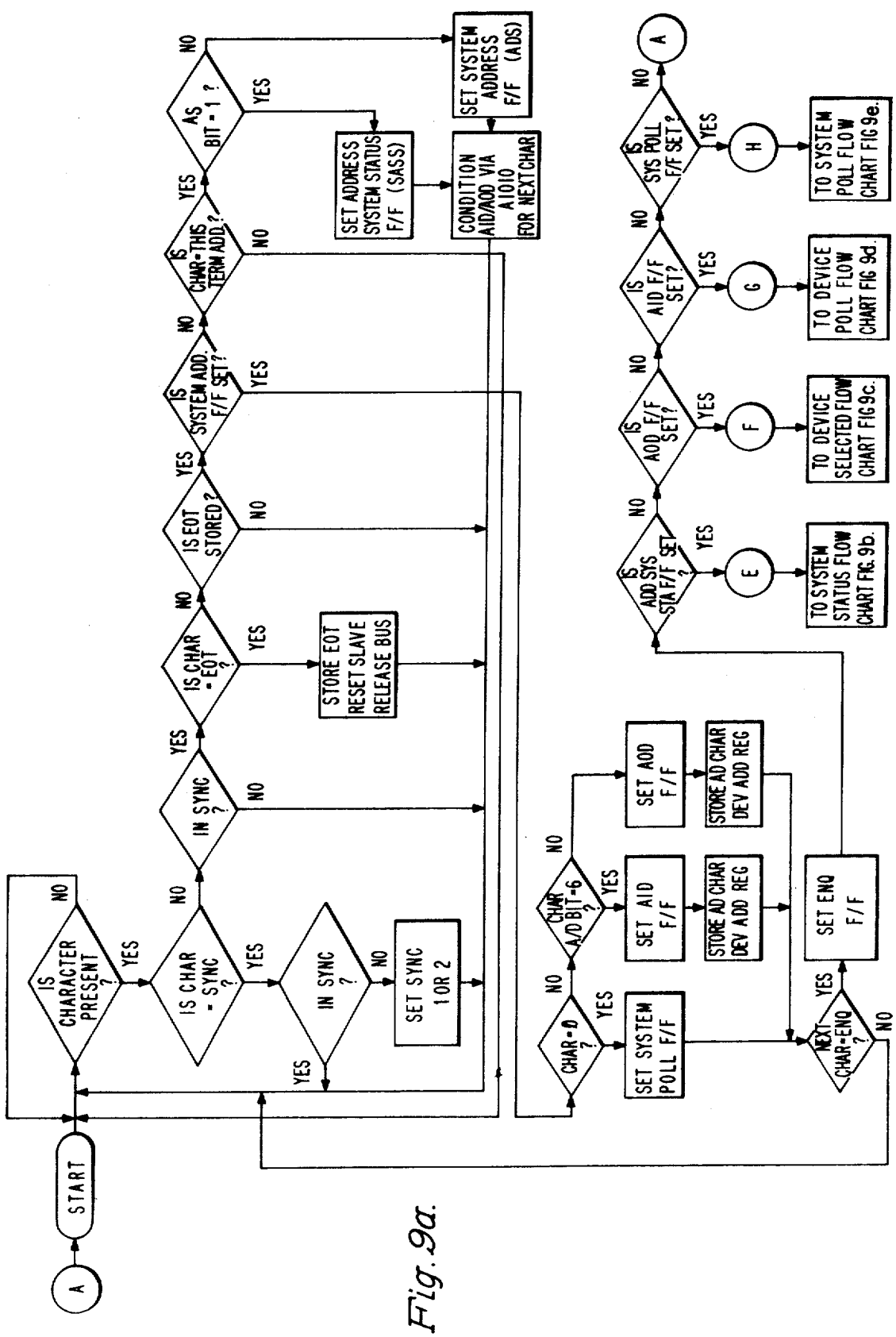
FIG. 9a is a flow chart of a polling sequence.

Initially, the COMM DCA will be in a quiescent state. The data processing system begins its transmission by generating for sync. characters. As illustrated by FIG. 9a, the COMM DCA will be required to attain an "in sync." condition. Specifically, the timing and control 2970 will develop strobe pulses referenced as function DDSTR10 in FIG. 8 from the data set receive clock, not shown. These pulses are used to strobe or shift in the data bits applied to the DATA IN line into the I/O register 2960. It will be appreciated that the COMM DCA logic will not apply data characters to the decoder 2402 until it has achieved synchronization. At that time, the receive command logic of FIG. 8e will be operative to generate transfer function RCDEC10.

As shown by the flow chart of FIG. 9a, the synchronization is achieved when the logic detects the presence of two successive sync. characters at which time a pair of flip-flops included within the control 2970 switch a SYNC 2 function to its ONE state. As mentioned, each character assembled in the input/output register 2960 will be applied via function RCDEC10 to the decoder 2402 for examination. The examination of the character sequence will then determine the procedure to be followed in processing the data processing systems request. As shown in FIG. 9a, there are several possible sequences which will be executed and these include: a polling operation for status, a selection operation, a single device poll for data, and a multiple device poll for data. These operations are illustrated in detail in the flow charts indicated.

The first character of the supervisory sequence which will be applied to the decoder 2402 is an EOT character. The decoder 2402 in response to the EOT character will force function RRCET10 to a ONE which will set RCEOS flip-flop 2592 of FIG. 8e to its ONE state. Additionally, function RREOT10 will cause the RSSLV flip-flop 2666 of the message state logic 2650 to be set to its ZERO state. This places the COMM DCA in an address mode.

Additionally, the function RCEOS10 generated by the EOT stored logic of FIG. 8e will subsequently condition the Bus Interface Logic of FIG. 8c to generate a release function which logically disconnects the devices from the bus 150. The aforementioned operation is carried out when the RCAAL flip-flop 2540 of the active logic section of the receive sub-command logic of FIG. 8e switches to its ONE state.

Referring again to FIG. 9a, it will be noted that when an EOT character has been stored (i.e. RCEOS10 = 1), the next character is examined and at the same time the state of the system address flip-flop 2406 of the receive control logic 2404 is examined. Initially, this flip-flop will be in its reset state having been switched to this state when the decoder 2402 detected an EOT character.

Referring to FIG. 8d, it will be noted that AND gate 2410 of the system address detector logic 2405 will be operative to decode character and force function RRADS1B to its ONE state when the character corresponds to the system terminal address as established by jumpers contained within the card 2412. The functions RRADS1B and RRCM310 activate AND gate 2408 forcing function RRADS1A to a ONE. The function RRADS1A switches RRADS flip-flop 2406 to its ONE state only when bit 7 of the character is a binary ZERO. Alternatively, when bit 7 is a ONE, ADS flip-flop 2406 will remain in its reset binary ZERO state.

Poll for Status

Assuming that the remote data processing system has transmitted a poll message for status, bit position 7 of the system address character will be set to a binary ONE. The second address information character received will have bit 7 set to a binary ONE and bit 6 set to designate either an input device or an output device whose address code is designated by bits 1–4. The aforementioned coding of the two address characters is illustrated in FIG. 9. As shown by FIG. 9a, a ONE in bit position 7 in the system address code will cause status poll logic section 2407 to switch its system address status flip-flop 2409 to its ONE state. That is, function RRSASS10 is forced to a ONE when system address is detected and bit 7 is a ONE.

The system address status for the flip-flop 2409 forces function RRSASS10 to a ONE which is operative to condition logic within the message state logic of FIG. 8g and set device address bits 7 and 8 via logic included within the receive subcommand generator logic of FIG. 8e. As explained herein below, the state of bit 7 differentiates a data request from a status request for the device. This arrangement permits maximum sharing of the control logic circuits within the COMM DCA as described herein.

Referring again to FIG. 9a, it will be noted that upon receipt of the second address character, the same sequence of operations are performed except that when the system address flip-flop state is tested, and the character is examined and determined not to be either a terminal address character or a "ZERO" character, either AID flip-flop 2421 or AOD flip-flop 2430 will be switched to a ONE in accordance with the state of bit 6 as well as bit 7.

It will be noted that bit 6 designates the device address code as either that of an input device or an output device. And, bit 7 will always be a ONE in the case of an output device since in the preferred embodiment an output device address code is selected from ASCII code configurations designating letters making bit 6 a ZERO. By contrast, bit 7 is always a ZERO in the case of an input device since all input device address codes are designated by ASCII codes corresponding to numbers which make bit 6 a ONE. Accordingly, bits 6 and 7 of a device address code will always be complementary with respect to one another.

It will be appreciated that the aforementioned two bit difference provides for additional reliability and protection from errors. That is, while a two bit change in a character will go undetected with a parity check, such a change if occurring in these important bit positions will be detected by the complementary bit arrangement of the preferred embodiment. It will be appreciated that the utilization of complementary bits where compatible with the code requirements of the system can provide the same degree of protection for other characters of the various supervisory message sequences.

The decoding of the second address character will force either function RRAID1A or RRAOD1A to a ONE which activates a transfer gate 2570 of FIG. 8e forcing transfer function RCCID10 to a ONE. The transfer function RCCID10 conditions the address register 2966 of FIG. 8a to store the address code applied to bus 2962. As indicated, this code will designate either an input device or an output device whose status is to be determined.

Referring to FIG. 9a, it will be noted that the ENQ character is the last character in the message and when this character is decoded by the decoder 2402, it forces function RRCEQ10 to a ONE. As shown by FIG. 8d, this function with one of the functions RRAID10 or RRADO10 will switch the ENQ address flip-flop 2416 of FIG. 8e to its binary ONE state. This forces function RRENQ10 to a ONE. This function together with the functions produced by the various control flip-flops mentioned above will determine which one of the paths or procedures will be followed to process the data processing system request. In the example being considered, the request for status will be processed in accordance with the flow chart of FIG. 9b.

Figure 9B:
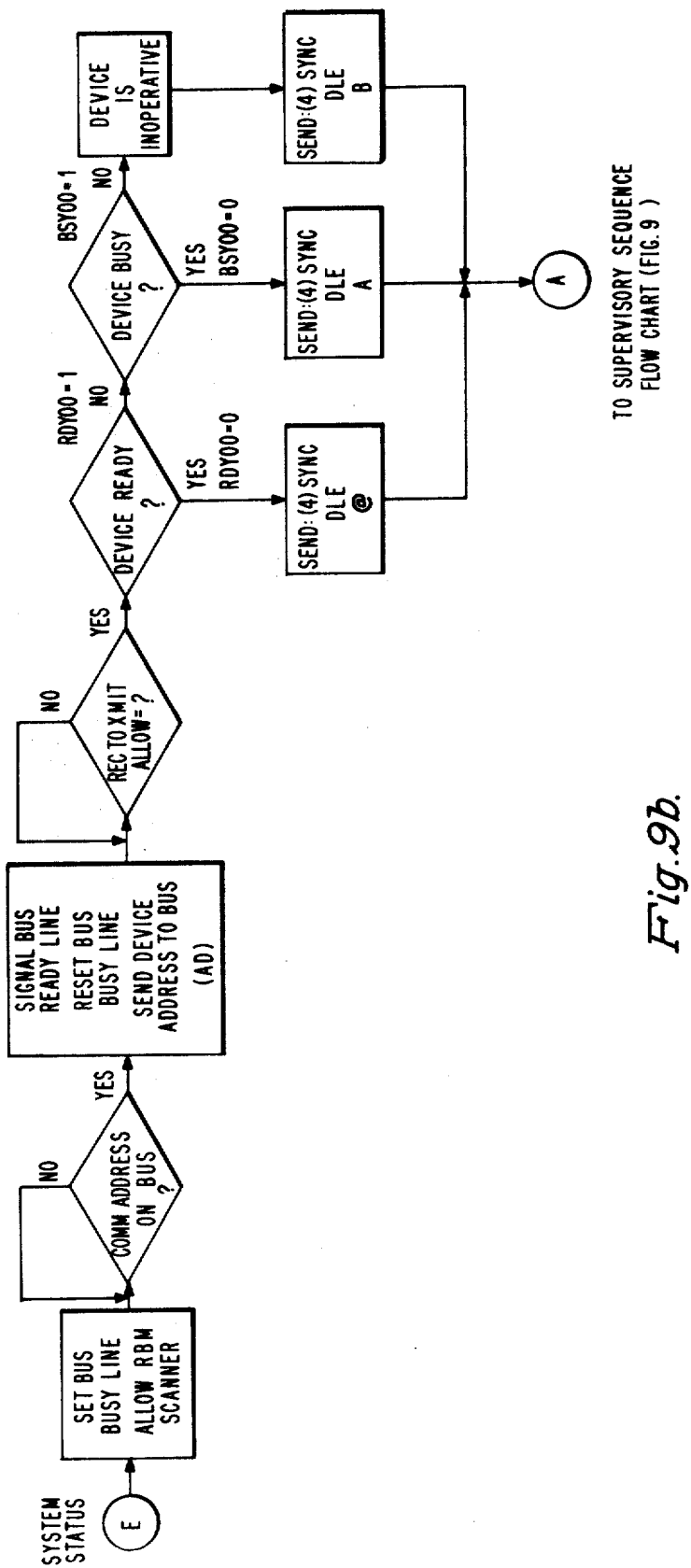
FIG. 9b is a flow chart illustrating the operations involved in processing the status request.

Referring now to FIG. 9b, it will be noted that the COMM DCA logic is operative to set the bus busy line OSB130Z to a predetermined state (i.e. to a binary ZERO) which enables the bus busy transmit logic block 3070 of FIG. 8c to respond to its address code. In particular, the aforementioned happens when function RCACTOO and RCEND10 are both binary ZEROS. The function RCEND10 will be initially a ZERO. The function RCACTOO is forced low when the COMM DCA switches to its active state. Referring to FIG. 8e, it will be noted that when the scanner 100 places an ALL-ZERO address code on the bus, the bus interface logic of FIG. 8c forces functions RBBAD1A and RBBLZ10 to binary ONES. Accordingly, during an address cycle wherein function RBDACOO is a ONE of an on-line bus cycle at which time function RBOFCOO is a ONE, AND gate 2522 is forced active which in turn forces function RCBAD10 to a binary ONE. As a result of having received the ENQ character, function RRENQ10 is a ONE and this causes function RCEQR10 to a ONE, switching Active Address Early flip-flop 2544 to its ONE state upon the occurrence of a strobe pulse referenced as function RBSTB1C. When this flip-flop switches to its ONE state, it is operative to switch Active flip-flop 2546 to its ONE state. Simultaneously, therewith, flip-flop 2544 conditions flip-flop 2542 to be set to its ONE state during a subsequent OFF-LINE cycle defined by function RBOFC10. When the flip-flop 2542 switches to its ONE state it causes active address early flip-flop 2544 to be switched to its ZERO state by forcing hold function RCAAEOA to a binary ZERO. Similarly, flip-flop 2542 conditions flip-flop 2540 to be switched to its ONE state during a subsequent ON-LINE cycle defined by function RBOFC00. When flip-flop 2540 switches to its ONE state it in turn causes flip-flop 2542 to be reset to its ZERO state by forcing hold function RCAAFOA to its ZERO state.

When ACtive flip-flop 2546 is switched to its ONE state, it forces function RCAT10 to ONE which then forces function RCACTOO to a ZERO. This conditions the BUS Busy Transfer logic 3070 to force bus line OSB130Z to a binary ZERO signaling a not busy condition. The scanner 100 is now enabled to respond to a change in state in the ready line OSB170Z. Specifically, the COMM DCA is operative to force the ready line from a binary ONE to a binary ZERO state when it detects its address code applied to the bus by conditioning the Bus Receive Ready Logic 3120 of FIG. 8c. The scanner 100 responds to this change of state in ready line OSB170Z by switching ACT flip-flop and DAC flip-flop 300 to their ONE states. Additionally, the scanner 100 will generate a pulse referenced as function RBCONOO. The scanner 100 applies this pulse to bus line OSB190Z whereupon the bus control timing logic 3010 is operative to generate a pulse designated as RBCON1C. This resets COMM DCA Ready Logic flip-flop 3130 of FIG. 8c to its ZERO state.

Additionally, function RCAAL10 conditions the data cycle control logic 3060 of FIG. 8c to force function RBDCX00 to a binary ZERO. This function when applied to bus line OSB120Z signals that this ON-LINE cycle is an address cycle notwithstanding the fact that the scanner 100 has switched data cycle flip-flop 300 to its binary ONE state. This arrangement permits the COMM DCA to place on the bus 150 the address code of the device whose status is to be examined. In particular, the function RBDCXOO forces function RBDCX10 to a ONE and this conditions the transfer logic 2555 of FIG. 8e to force function RCLAD10 to a ONE. This causes the address code stored in the address register 2966 to be applied via the Bus gating logic 2980 of FIG. 8 to transfer bus 2984. And, this address code is in turn applied to the bus 150 as a result of function RBIDB00 being forced to a ZERO by function RBDCX10 via the logic 3050 of FIG. 8c.

The address code when placed or applied to the bus 150 by the COMM DCA causes the device identified thereby to detect the code via its logic 980 of FIG. 7d and force function ADD10 to a binary ONE which will in turn switch the address response flip-flop 982 to its ONE state.

As shown by FIG. 9b, there are essentially three types of responses which can be made by a device. These are a ready response, busy response or no response. The first will be considered in greater detail. If the device is operative and is in its ready state (function IFRSF1A is a binary ONE), the device is operative to initiate a change in state in the ready line OSB170Z. As mentioned, the device DCA generates the response via the logic block 780 of FIG. 7b.

It is important to note that bit 7 of the address code is a binary ONE and this bit inhibits the AND gate 988 of FIG. 7d from forcing function IFADR10 to a ONE. Accordingly, the ON-LINE flip-flop of FIG. 7a will not be switched to its binary ONE state as a result of the device being addressed. That is, the device DCA if operative will respond to its address code however it will not activate its device by switching to an ON-LINE state. The reason is that since the request is only for status information, there is no need to switch the device from its Ready state to an ON-LINE state. And, the device will not initiate a data transfer and hence an input device will be assured of not losing media while responding to the status request.

Additionally, since the difference between the poll for data and a poll for status information resides in the difference in the coding of bit 7 of the device address, the DCA uses the same control logic for handling both requests. When the addressed device signals that it is ready, the scanner 100 is operative to generate a response pulse RBCONOO which conditions the Bus control Timing Logic 3010 of FIG. 8c to force function RBCNL10 to a ONE and then generate pulse RBCON1C.

Referring to the Bus Busy Logic 3070 of FIG. 8c, it will be noted that when the device is not busy (RBBSY00 is a ONE) but operative, this Logic conditions the Device Ready Logic 3080 to activate AND gate 3084 which will force function RBDRY10 to a ONE. This signals that the device is Ready since it caused function RBCNL10 to be a ONE as a result of signaling ready to the scanner 100. It will be noted from FIG. 9b, that the COMM DCA will be ready to transmit before the device was addressed. This occurs when the flip-flop 2686 of the Terminal addressed Logic 2685 of FIG. 8f was switched to its ONE state forcing function RSTAD10 to a ONE and RSTAD00 to a ZERO. This caused the Receive to Transmit flip-flop 2610 of FIG. 8e to be switched to its ONE state in turn generating a Request to Send to the data set. Thereafter, as described above, when the COMM DCA receives a Clear to Send indication from the data set, function data set clear to send (DDDCS10) is forced to a ONE by the Control 2970. This in turn switches RCRTF flip-flop 2610 to its ZERO state via forcing hold function DDRSOC to a ZERO. And, the message state counter is switched to a first count by gates 2856 and 2858 of FIG. 8h. The function DDRS10 remains a ONE for the entire transmission.

The RXDLT flip-flop 2791 of the Message Logic of FIG. 8g will be switched to its ONE state via AND gate 2792. Accordingly, when the Control 2970 completes transmitting the 4 sync. characters, the function RXDLT10 activates AND gates 2793 and 2794 respectively during message states ONE and TWO (i.e. functions RXMS110 and RXMS210 are ONES). And, this conditions the character generator 2900 to transmit the sequence SYNC, SYNC, SYNC, SYNC, AS, "DLE" and "@". The data processing system in response thereto will generate the sequence SYNC, SYNC, SYNC, SYNC, EOT which will reset the COMM DCA to its quiescent state.

As also shown by FIG. 9b, if the device is operative but busy, it will respond by forcing the busy line OSB130Z to a ZERO. Therefore, when function RBLAR10 is forced to a ONE during the middle of the ON-LINE bus cycle, it causes the Bus Busy Logic 3070 of FIG. 8c to activate AND gate 3075 forcing function RBDBY10 to a ONE.

The function RBDBY10 causes RXDLA flip-flop 2796 of FIG. 8g to be switched to its ONE state. And, in a manner similar to that described above, the flip-flop 2796 by forcing function RXDLA10 to a ONE conditions the character generator 2900 via AND gates 2797 and 2798 to transmit a "DLE" character and a "A" character respectively during message steps ONE and TWO to the bus 2955 and then to the I/O register 2960. The data processing system upon receiving this sequence generates the same sequence mentioned above which will place the COMM DCA in its address mode or quiescent state.

The last type of status response the COMM DCA can transmit is one informing the data processing system that the device whose status is requested is inoperative. That is if the device is inoperative, it will not force the ready line OSB170Z from a ONE to a ZERO. Accordingly, when function RBLAR10 is forced to a ONE, it together with function RBRDY00 activates AND gate 3136 of the Bus Receive Logic 3120 of FIG. 8c forcing function RBDDD10 to a ONE.

Since an inoperative device will not force the busy line OSB130Z from a ONE to a ZERO, the function RBBSY00 and RBDDD10 both ONES cause RXDLB flip-flop 2800 of the Message Logic of FIG. 8g to be switched to a ONE. This forces function RXDLB10 to a ONE which activates AND gates 2802 and 2803. These gates condition the character generator 2900 to transmit a DLE character and B character during message states ONE and TWO along the bus 2955 to the I/O register 2960. Again upon receiving the characters SYNC, SYNC, SYNC, SYNC, DLE and B, the data processing system will generate an EOT character returning the COMM DCA to its initial state.

Device Select

Figure 9C:
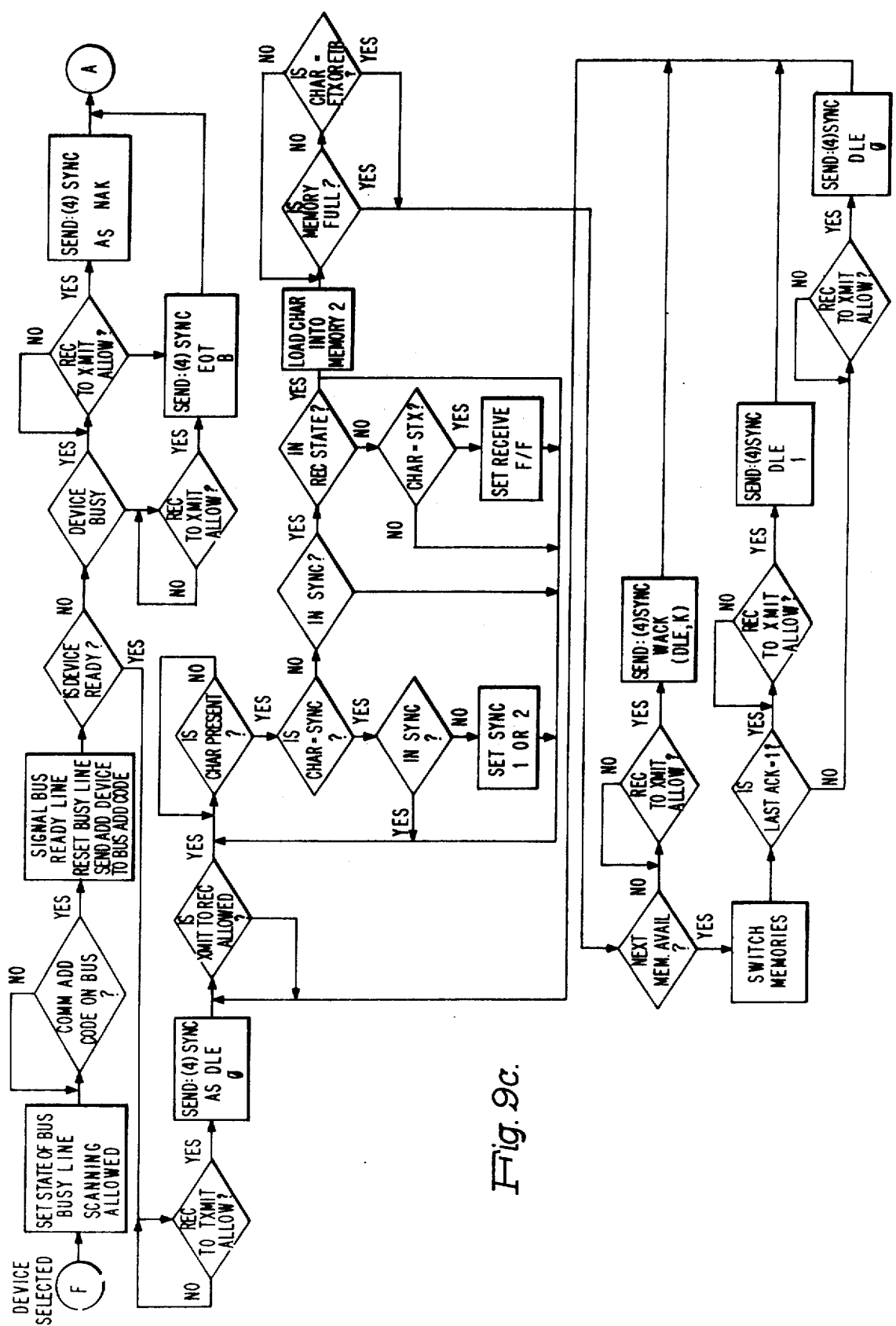
FIG. 9c is a flow chart illustrating the operation of the system in processing a selection request.

Referring to FIGS. 9a and 9c, it will be noted that coding of bit 7 of the terminal address character of the supervisory sequence distinguishes a select request from a status request. Accordingly, the system address flip-flop 2406 of the Receive Control Logic 2404 of FIG. 8d will be switched to its ONE state. And, the Status flip-flop 2409 will remain in its ZERO state.

As shown in FIG. 9a, when the COMM DCA receives and applies the device address character to the decoder 2402, it will switch the output Device Address Logic flip-flop 2431 to be switched to a ONE thereby terminating the processing of the message sequence.

With the System Status flip-flop in its reset or ZERO state and the RRAOD flip-flop set to a ONE, the COMM DCA processes the request in accordance with the procedure of the flow chart of FIG. 9c.

Referring to FIG. 9c, it will be noted that the initial steps of the sequence are equivalent to those of FIG. 9b. Briefly, the COMM DCA forces the busy line OSB130Z to a ZERO upon receiving an ENQ character. This enables the COMM DCA to respond to its ALL ZERO address code when the scanner 100 applies same to the bus 150. The scanner 100 responds to COMM DCA's change of state in the state of the ready line OSB170Z. And, during the following ON-LINE bus cycle, the COMM DCA applies the output device address on the bus 150. At the same time, the COMM DCA activates its Data Cycle Control Logic 3060 of FIG. 8c, which forces line OSB120Z to a ZERO defining another address cycle permitting the device to respond to its address code. Also, bit 7 of the devices address code will be a ONE and therefore, the device DCA if in the ready state will switch to an on-line state upon detecting its address code on the bus.

When the device DCA signals that it is ready, the COMM DCA will activate the Device Ready Logic 3080 of FIG. 8c to force function RBDRY10 to a ONE. As shown by FIG. 9c, when the COMM DCA is permitted to transmit (i.e. RCRTF flip-flop forced function RCRTF10 to a ONE which generated a Request to Send and the data set in turn generated a Clear to Send) the sequence SYNC, SYNC, SYNC, AS, DLE and "0." In particular, the function RBDRY10 together with function RCAAL10 causes flip-flop 2512 of FIG. 8e to switch to a ONE forcing function RCDRY10 to a ONE. Also, the RXSAD flip-flop 2765 of FIG. 8g is switched to its ONE state via gates 2769, 2768 and 2767.

The functions RXSAD10 and RXMST10 cause the Receive Command Logic of FIG. 8e to force function RCSAS10 to a ONE which conditions the character generator 2900 to transfer the AS character to the I/O register 2960 during message state 1. Thereafter, functions RXSD110, RCDRY10 and RRSEL10 all ONES cause RXDAD flip-flop to switch to a ONE forcing function RXDAO10 to a ONE. This function conditions the character generator 2900 to apply a DLE character to the I/O register 2960 via the transfer Bus, during message state 1 (i.e. RXMS110 = 1). And, after the character has been transmitted the same function RXDAO10 causes the character generator 2900 to apply a "0" character to the I/O register 2960. This completes the acknowledgement message sequence.

As illustrated by FIG. 9c, after the last character has been transmitted, the COMM DCA again starts receiving characters and will establish an "in sync" condition as described above. Thereafter, the characters other than "SYNC" characters are applied to the decoder 2402. As shown, the first character the decoder 2402 decodes is a STX character. The decoder 2402 forces function RRCSX10 to a ONE which together with function RSTAD10 switches the Receive RSSLV flip-flop 2666 to a ONE. Thereafter, the characters are written into memory 2 until the decoder 2402 detects either an ETX or ETB character upon which the Memories are switched.

The transfer continues until the data processing system terminates the data transfer by sending the sequence SYNC, SYNC, SYNC, SYNC and EOT. For further details regarding the foregoing operation reference may also be made to the copending application titled A Communication Control Device Utilized as an Input/Output Module for a Terminal System.

Device Poll

Referring again to FIGS. 9 and 9a, it will be noted that the coding of bit 6 of the device address character differentiates a device select request from a device poll request. That is, when bit 6 is a ONE instead of a ZERO, the RRAID flip-flop 2421 of FIG. 8d will be switched to a ONE. Accordingly, after the ENQ character has been processed, the COMM DCA will follow the procedure given in the flow chart of FIG. 9d to process the request.

Figure 9D:
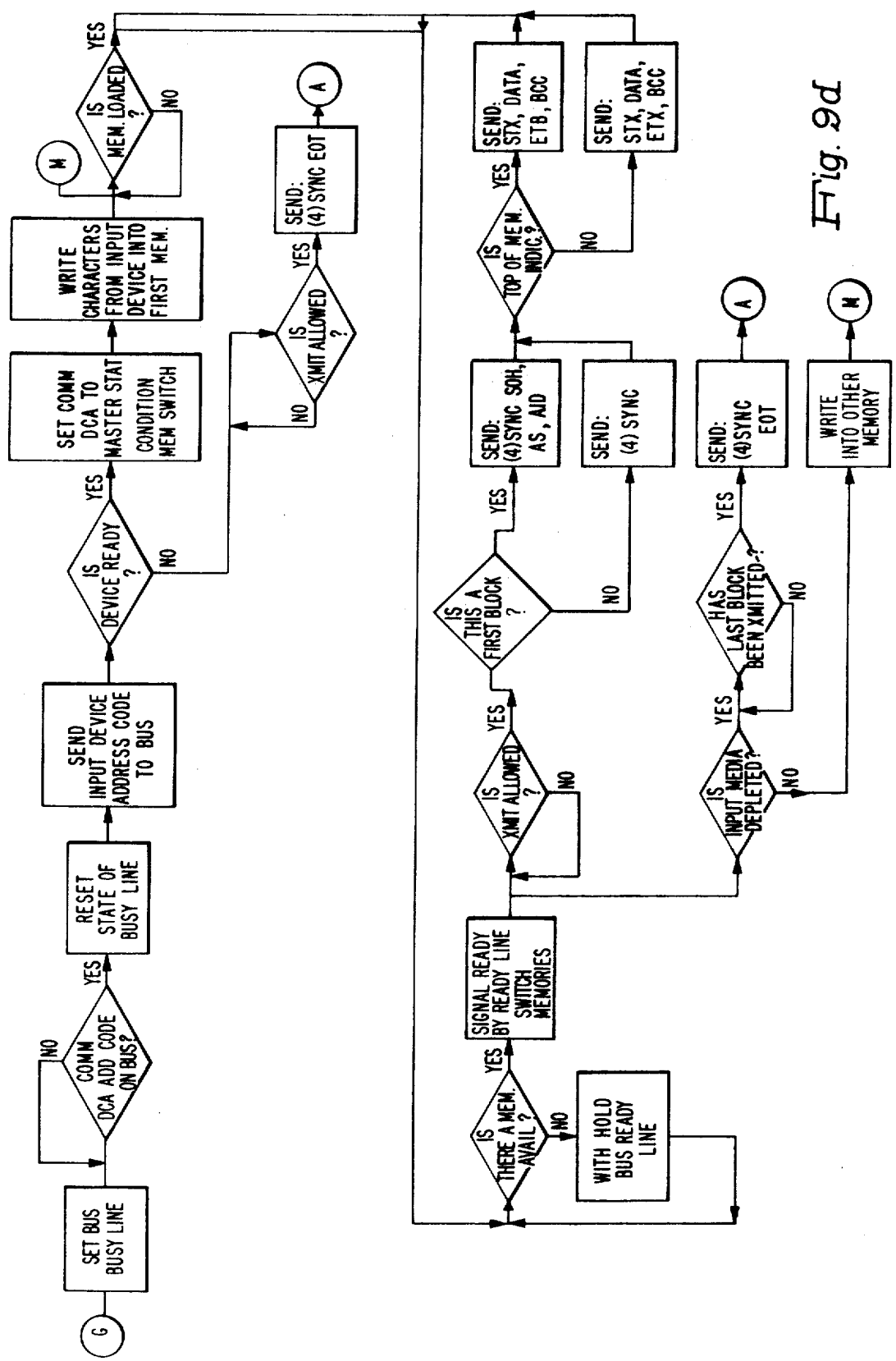
FIG. 9d is a flow chart illustrating the operations for processing a device poll request as it relates to a data transfer.

Referring to FIG. 9d, it will be noted that the procedure is equivalent to those of FIGS. 9b, and 9c. Briefly, the COMM DCA forces the busy line OSB130Z to a ZERO upon the decoding of an ENQ character. As mentioned, this enables the COMM DCA Ready Logic to respond to its address code when the scanner 100 applies it to the bus 150. When the COMM DCA changes the state of the ready line OSB170Z, the scanner 100 responds by generating a control pulse RBCON10, and switches its ACT flip-flop to its ONE state indicating that there is an active device (i.e. the COMM DCA). Also, the scanner 100 switches its Data Cycle flip-flop 300 to a ONE indicating that the next cycles are data cycles and not address cycles.

Also, at the same period of time when the ZERO address code of the COMM DCA is on the bus 150, and function RCACT00 is forced to a ZERO the COMM DCA via its Bus Busy Transmit Logic 3070 of FIG. 8c switches the busy line from a ZERO to a ONE signaling that the Bus 150 is not busy.

During the next ON-LINE bus cycle, the COMM DCA switches functions RCAAL10 and RCLAD10 to ONES via its Receive Command Logic of FIG. 8d. The function RCLAD10 permits the Device Address Register Contents to be applied to the bus 150. Also, the COMM DCA via its Data Cycle Control Logic 3060 of FIG. 8c forces function RBDCX00 to a ZERO signaling that this ON-LINE cycle is an address cycle.

Assuming the input device is ready, it will change the state of the ready line OSB170Z when its DCA detects its address code on the bus. The scanner 100 in response to the change in the ready line will generate a further control pulse RBCON00 which will switch the COMM DCA to a transmit status, force an acknowledgement function to a ONE and condition the Memory Switch to write into Memory 2. In particular, functions RBRDY10 and RBCON1C decoded from pulse RBCON00 condition the gates 2298 and 2250 of FIG. 8b to switch MMMSW flip-flop 2202 to its ONE state thereby conditioning Memory 2 for a writing operation. Simultaneous therewith, functions RCGOM10 and RBCONIC switch RSMST flip-flop 2654 to its ONE state placing the COMM DCA in its transmit status. And, function RSMST10 forced high by flip-flop 2654 forces acknowledgement function RRACK10 to a ONE. When the transfer function M2BTM10 is forced to a ONE by the Bus to Memory Transfer Logic of FIG. 8c, it conditions the Read/Write Timing Logic 2130 to force function M2ISL10 to a ONE. This switches M2RMC flip-flop which conditions the Memory 2 to cycle through a Read cycle followed by a Write Cycle during which time a first data character will be written into the first addressed memory location.

Thereafter, the Read/Write Timing Logic 2130 forces function M2INC10 to a ONE which increments the MAR 2148 by ONE.

As shown by FIG. 9d, the characters are written into Memory 2 until either the memory is filled (i.e. function M2TOM10 is a ONE) or until the Bus Interface logic detects an ETX character. At that time the M2MPC flipsflop of the logic 2292 switches to a ONE. And, with the memory 1 available (i.e. function M1BAV10 is a ONE), the Memory Switching Logic switches memories so that data characters are written into memory 1 while the characters are read from memory 2 to the I/O register 2960. When the COMM DCA is ready to transmit, the Message Logic of FIG. 8g conditions the character generator 2900 to transmit the header information SOH, AS, and AID during the first three message states. The message state counter is again set to its first state. The COMM DCA transmits a STX character in Message state 1, the data characters from Memory 2 in Message State 2 and ETB and BCC characters during message state 3.

When the data processing system acknowledges the message as good, the Memory Switch Logic of FIG. 8b is able to switch memories as soon as Memory 1 has been filled with data characters. As shown in FIG. 9d, the COMM DCA continues the transfer data characters from the input device until the device is released.

System Poll

As illustrated by FIGS. 9 and 9a, the data processing system may transmit a supervisory message coded to define a system poll wherein a block of data is transmitted from each ready input device in sequence when the terminal is set to the block mode. This request is distinguished from the device poll request by the special coding of the device address (Ad) character. That is, the device address code is a ZERO for a system poll operation. Accordingly, when the decoder 2402 decodes a ZERO device code it forces function RRCOO10 to a ONE which together with functions RSADM10 and RRAIO1A switch System Poll flip-flop 2441 to a ONE. This forces function RRASP10 to a ONE so that when the decoder 2402 decodes the ENQ character forcing function RRCEQ10 to a ONE, these functions switch the ENQ flip-flop 2416 to a ONE which ends the message sequence.

Figure 9E:
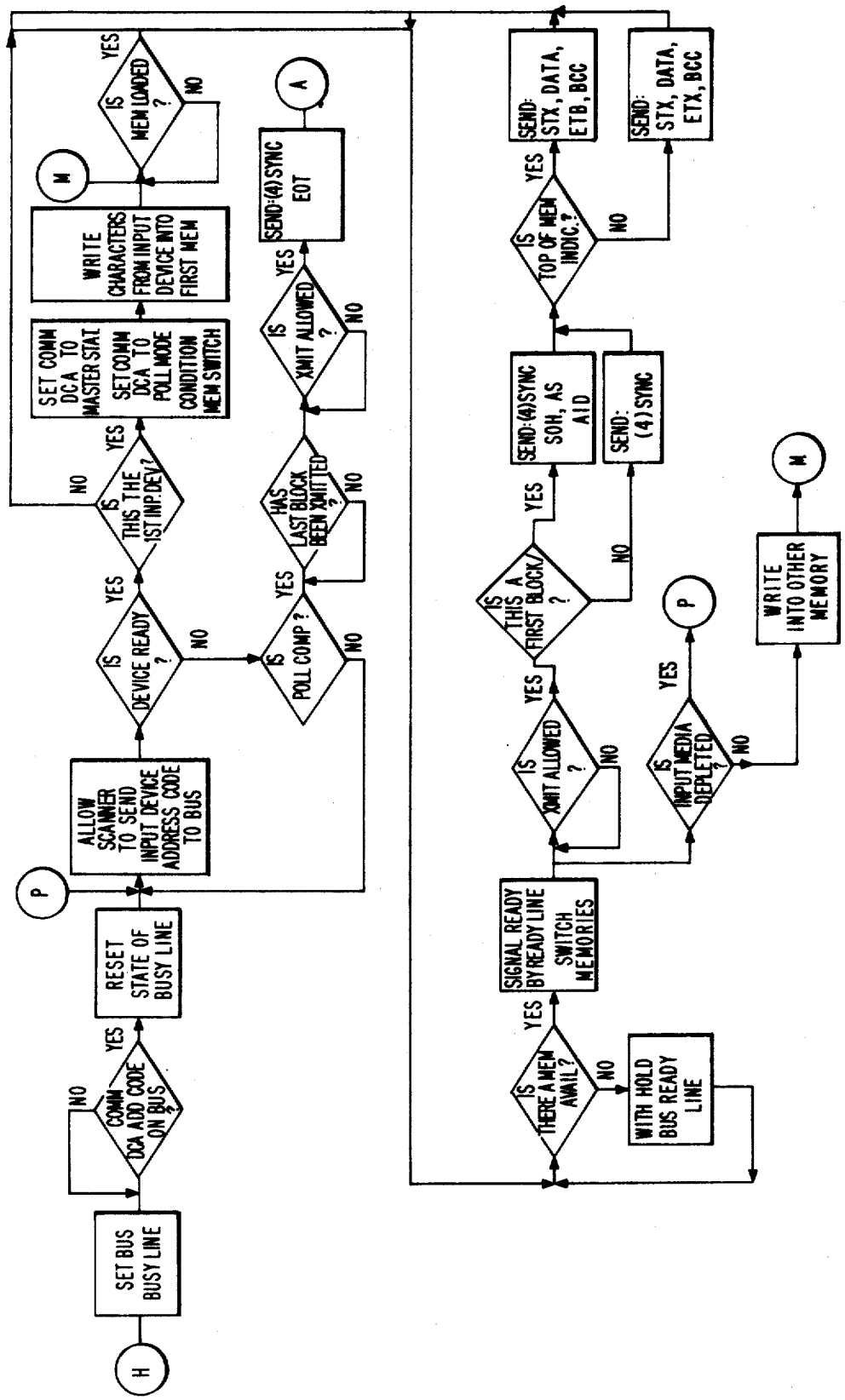
FIG. 9e is a flow chart illustrating the operations for processing a system poll request.

As shown in FIG. 9a, with the System Poll flip-flop in its ONE state and the System Status, AOD, AID flip-flops in their ZERO states, the COMM DCA will follow the procedure in the flow chart of FIG. 9e in processing the request.

Referring to FIG. 9e, it will be noted that the initial steps for processing the request are the same as those of FIGS. 9b, 9c and 9d. That is, the bus busy line is forced to a ZERO to inhibit the devices from responding to their address code while the scanner 100 increments its address counter. When the scanner 100 applies the all ZERO address code of the COMM DCA to the bus 150, the COMM DCA will switch its Active flip-flop to its ONE state and in turn force the busy line from a ZERO to a ONE. And, with the poll flip-flop 2441 in its ONE state, the COMM DCA ready logic 3120 of FIG. 8c will be inhibited by function RRASPOO from generating a ready response.

Also, the function RRASPOO inhibits the Data Cycle Control Logic 3060 from forcing function RBDCXOO to a ZERO so as to define an address cycle and apply the contents of the device address register to the bus 150. This continues until an input device whose address code is applied to the bus 150 signals via its DCA that it is ready. That is, the DCA of a ready input device will switch the ready line OSB170Z to a ZERO and also switch its on line state flip-flop to its ONE state. The scanner 100 will detect the response and switch its Active flip-flop and Data cycle flip-flop 300 to their ONE states. In addition to stopping its address counter, the scanner 100 will generate a control pulse RBCON10 acknowledging the input device response.

Referring to FIG. 8c, it will be noted that the function RBCONOO forces function RBCNL10 to a ONE which activates AND gate 3088 forcing function RBSDA1A to a ONE. At the same time, the Device Ready Logic 3080 activates AND gate 3081 forcing function RBDRY10 to a ONE. The function RBSDA1A causes the input device address code applied to the bus 150 to be loaded into the address register 2966 when gate 2572 is activated by bus function RBSTB1C forcing load function RCDAL10 to a ONE. And, the function RBDRY10 together with function RCAAL10 switches RCDRY flip-flop 2512 to a ONE. This forces function RCAAL10 to a ONE which forces function RCGOM10 forced to a ONE. Accordingly, when the Bus Control Timing Logic 3010 of FIG. 8c generates control pulse RBCON1C in response to scanner 100 pulse RBCONOO, this causes RSMST flip-flop 2654 to switch to its ONE state.

Additionally, the System Poll State flip-flop 2692 of FIG. 8f is switched to its ONE state by functions RRASP10 and RRENQ10 when RSMST flip-flop 2654 switches to a ONE. This places the COMM DCA in a transmit state. Simultaneously therewith, the ready function RBDRY10 together with pulse RBCON1C switches the MMMSW flip-flop 2202 of FIG. 8b to its ONE state wherein memory 2 is conditioned to write.

As FIG. 9e illustrates, the input device when ready will start placing data characters on to the bus 150 which the COMM DCA will write into memory 2 until the input device places an ETX character on the bus 150. When the ETX decoder of scanner 100 detects the ETX character, it forces the release line OSB140Z to a ZERO. Thereafter, the scanner 100 increments its address counter by one to the address code of the next input device. When another input device signals ready, the COMM DCA Bus Interface Logic of FIG. 8c as described above will store the address code of the device in its address store 2966 which will be arranged to accommodate two input address codes so that in the event that the block previously transmitted is acknowledged by the data processing system as being in error, the input device address code is available for retransmission as part of the header address information which normally preceds the data block.

From FIG. 9e, it will be noted that the data characters placed on the bus 150 by the input device are loaded into each of the memories as in the case of a device poll until the input device has depleted its media which manifests itself in the from of a release form the bus 150. As mentioned, when the terminal is arranged to operate in the BLOCK MODE, the input device will be released by the scanner 100 when it applies the aforementioned ETX character onto the bus 150. And, when the terminal is operated in the BATCH mode, the DCA of an input device will be released when its device generates an out of media signal as described earlier. For still further details regarding the manner in which devices are released from the terminal bus 150 reference may be made to the copending application of Robert E. Huettner and Edward B. Tymann titled a "Remote Terminal System."

When the scanner 100 has completed the scan of input devices by having incremented its address counter through one complete cycle, the COMM DCA will terminate the system poll operation by transmitting the sequence SYNC, SYNC, SYNC, SYNC and EOT. The COMM DCA terminates the poll by forcing function RCPLC10 to a ONE which switches RCEND flip-flop 2624 to its ONE state. That is, referring to FIG. 8e, when the Bus Interface Logic detects an all ZERO address code, it forces functions RBBAD10 and RBBLZ10 to ONES which activate AND gate 2522 of FIG. 8e. This forces function RCBAD10 to a ONE which in turn forces function RCBAS10 to a ONE. Since the COMM DCA is in a poll mode, functions RSASP10, RCBAS10 and RCACT10 switch RCEND flip-flop 2624 to a to a ONE. And, when the last block stored in memory is transmitted and acknowledged by the data processing system, the COMM DCA sends the termination message completing the system poll operation.

In accordance with the invention there has been illustrated a method and communications apparatus for polling peripheral devices of a remote terminal system utilizing a common message sequence. By expanding the established address identification portion of the control message sequence, the invention is able to designate one of a plurality of different types of requests to be processed.

It will be appreciated by those skilled in the art that sequences disclosed can be readily expanded to specify additional types of requests by substituting different USASCII character codes for the second address character. For example, the same sequence can be coded to specify messages to an operator which will activate the various indicators visual/audible (e.g. REQUEST and ALARM) located on the communications control panel.

Additionally, the communications apparatus in accordance with the invention may generate other types of messages for defining the status of a device. For example, in those situations where the communications apparatus determines that the control signal lines being sampled define illegal combinations of signal levels and when these levels remain for a predetermined period of time, eliminating the possibility of noise, it will generate still another message so indicating this to the data processing system.

It will also occur to those skilled in the art that to avoid excessive delays, the communications apparatus may generate, retransmit the same message or transmit an inquiry message after a predetermined period of time has elapsed. That is, the various conditions being tested relating to receiving messages illustrated in the flow charts (e.g. achieving SYNC, receiving a next character after terminal is addressed, messages acknowledgement data) may be assumed to be tested only for a predetermined period of time.

To prevent undue burdening the description with matter within the ken of those skilled in the art, a block diagram approach has been followed, with a detailed functional description of each block and specific identification of the circuitry it represents. The individual engineer is free to select elements and components such as flip-flop circuits, shift register, etc. from his own background or from available standard references such as Arithmetic Operations in Digital Computers by R. K. Richards (Van Nostrand Publishing Company), Computer Design Fundamentals by Chu (McGraw-Hill Book Company, Inc.), and Pulse, Digital and Switching Waveforms by Millman and Taub (McGraw-Hill Book Company, Inc.).

While in accordance with the provisions and statutes there has been illustrated and described the best form of the invention known, certain changes may be made to the system described without departing from the spirit of the invention as set forth in the appended claims and that in some cases, certain features of the invention may be used to advantage without a corresponding use of other features.

Having described the invention, what is claimed as new and novel and for which it is desired to secure Letters Patent is:

1. A method of polling a plurality of data handling devices of a remote station to process a plurality of different types of requests, said method comprising the steps of:

transmitting to said station first information item signals denoting an address identification of said station, and a designation as to whether said station is to transfer data or supply status information;

transmitting to said station second information item signal denoting an address identification of at least one of said devices, and a designation of whether said device is to transmit or receive data;

receiving said second information item signals at said station, in response to the address identification denoted by said first information item signals;

storing representations of said designation of said received information item signals of said station; and effecting an operation in said device at said station in response to and in correspondence with said stored representations.

2. The method of claim 1 further including the step of sensing control signals generated by said data handling device identified when said device is to supply status information and transmitting from said station a message indicating that said device is ready to transfer data, is busy and unable to transfer data, or is inoperative.

3. The method of claim 1 wherein said information item signals identifying said device are coded with a predetermined bit configuration for specifying that a plurality of said devices are to supply data.

4. The method of claim 3 wherein said predetermined bit configuration corresponds to a ZERO code.

5. The method of claim 1 wherein said first information item signals define a system address character, A$s$, including a status/data bit, S, and a plurality of station identification bits, A$t$, and said second information items signals define a device address character, A$d$, including an input/output bit, I/O, and a plurality of device identification bits, A$d$, said A$s$ and A$d$ characters being coded as follows for requesting data from a single addressed data handling device, all input devices, and status information from a single input or output device respectively:

1. $At$ = terminal station address, $S = 0$; $Ad \neq 0$, and $I/O = 1$;

2. $At$ = terminal station address, $S = 0$, $Ad = 0$ and $I/O =$ ; and

3. $At$ = terminal station address, $S = 1$, $Ad \neq 0$ and $I/O = 1$ or $0$.

6. The method of claim 5 wherein said As and Ad characters are coded as follows for requesting data be received by a single addressed data handling device:

$At$ = terminal station address, $S = 0$, $Ad \neq 0$, and $I/O = 0$.

7. The method of claim 5 wherein said Ad character includes at least one additional bit which is coded as the complement of said input/output bit.

8. The method of claim 5 wherein said As and Ad characters comprise a multicharacter multifunction polling sequence which further includes an end of transmission control character as a first character for initiating said station to a predetermined state and an enquiry control character as a last character.

9. The method of claim 1 further including the steps of:
   sensing the presence of a predetermined code; and,
   generating a first control signal for inhibiting the transmission of further data characters to a data processing system by said station in response to sensing said predetermined code until said station receives information signals from said data processing system acknowledging said transmission as good.

10. The method of claim 9 further including the steps of:
    sensing the number of data characters transmitted to said data processing system; and,
    generating a second control signal for inhibiting the transmission of further data characters when a predetermined number of said characters have been transmitted without said sensing of said first control signal until said station receives said acknowledgement signals.

11. The method according to claim 10 further including the steps of:
    transmitting information signals denoting address identification of said station and said device for each first group of data characters transferred by a device and each group of data characters in which said first control signal is sensed; and,
    inhibiting the transmission of said address identification signals when said second control signal is sensed.

12. The method according to claim 11 wherein said method further includes the steps of:
    transmitting an end of text character signals at the end of said data characters in response to said first control signal; and,
    transmitting an end of block character signals at the end of each group of data characters in response to each of said second control signals.

13. A method of polling a plurality of peripheral devices of a communications terminal by a remote data processing system to condition a communications control apparatus coupled to said terminal to process a plurality of different types of requests, said method comprising the steps of:
    generating a plurality of signals representing an initial message sequence coded to include a first address character for identifying said terminal and for specifying whether said terminal is to transfer data or supply status information, and a second address character coded to specify one or more of said devices, and whether each said device is to transmit or receive data;
    transmitting said message sequence to said terminal communications control apparatus;
    receiving said message sequence in response to said first address character according to said message sequence by said control apparatus;
    storing the results of said decoding by switching predetermined ones of a plurality of state bistable devices in accordance with said coding;
    combining the outputs of said bistable devices so as to define a plurality of procedures for processing said different requests; and,
    selecting a predetermined one of said procedures in accordance with the coding of said address information characters.

14. The method of claim 13 wherein said predetermined bit positions of said second address are coded to an unassigned predetermined code for specifying a plurality of devices.

15. The method of claim 14 wherein said predetermined device code is a ZERO code.

16. The method of claim 13 wherein predetermined bit positions within said message sequence are coded so as to be complementary of one another to protect against erroneous decoding of said message characters.

17. The method of claim 13 further including the steps of:
    sensing control signals generated by said device interrogated for status; and,
    transmitting to said remote data processing system one of a plurality of messages indicating that said device is ready to transfer data, is busy, or is inoperative.

18. The method of claim 17 wherein said plurality of messages for said responses include the following respective character sequences; DLE, $\phi$, DLE,A, and DLE,B.

19. The method of claim 13 wherein said first address character includes a status/data bit, S, and a plurality of terminal identification bits, At, and said second address character includes an input/output bit, I/O, and a plurality of identification bits, Ad, said first and second characters being coded as follows for specifying a device poll, a system poll and status poll respectively:

1. A$t$ = terminal address, S = 0, A$d$ = device address and I/O, = 1;

2. A$t$ = terminal address, S = 0, Ad = 0 and I/O = 1; and,

3. A$t$ = terminal address, S = 1,

Ad = device address and I/O = 1 or 0 for specifying either an input device or output device respectively.

20. The method of claim 13 wherein said first and second address characters are coded as follows for specifying a device selection request:

A$t$ = terminal address,

S = 0, Ad = device address and I/O = 0.

21. The method of claim 13 wherein said second address character includes at least one additional bit which is coded as the complement of said input/output bit.

22. The method of claim 13 wherein said first and second characters comprise a multicharacter multifunction polling sequence which further includes an end of transmission control character as a first character of said sequence for initializing said terminal to a predetermined state and an enquiry control character as a last character of said sequence.

23. The method of claim 22 wherein each of said characters of said polling sequence is coded in ASCII code.

24. The method of claim 13 further including the steps of:

sensing the presence of a predetermined code within said data characters being transmitted; and generating a first control signal for inhibiting the transmission of further data characters from said device to said data processing by said communications control apparatus in response to said predetermined code until said control apparatus receives information signals acknowledging said transmission as good.

25. The method of claim 24 further including the steps of:

sensing by said communications control apparatus the number of data characters transmitted to said data processing system; and, generating a second control signal for inhibiting the transmission of further data characters when a predetermined number of said characters have been transmitted in the absence of said first control signal until said communications apparatus receives said acknowledgement signals.

26. The method of claim 25 further including the steps of:

transmitting information signals denoting address identification of said terminal and said device by said communications apparatus for each first block of data characters transferred to said apparatus by said device and for each block of said data characters in which said first control signal is sensed; and, inhibiting the transmission of said address identification signals by said communications control means when said second signal is sensed.

27. The method of claim 26 wherein said address identification signals are transmitted as part of the sequence:

SOH, A$s$ and A$d$.

28. The method according to claim 26 wherein said method further includes the steps of:

transmitting an end of text character signals at the end of each block in response to said first control signal; and, transmitting an end of block signal within a series of blocks in response to each of said second control signals.

29. In a remote terminal system including a device scanner control means, a plurality of peripheral devices interconnected through one of a number of device control means to said scanner control means through a common bus, a communications control means for processing different types of polling requests transmitted over a communications channel from a control station defined by an initial message sequence including address characters identifying said terminal system and at least one device, said communications control means being coupled to said channel and said bus, said control means comprising:

decoding means connected to receive and decode each of the characters of said initial sequence in response to said terminal address character, said decoding means including a plurality of bistable storage means for storing indications of the results of decoding and information pertinent to the processing of a specified one of said different types of polling requests transmitted by said control station; and, receive subcommand generating means coupled to said decoding means for generating control signals to said bus for selectively conditioning said scanner control means and said devices control means for processing said different types of polling requests.

30. The system of claim 29 wherein the state of a first one of said bistable storage means defines a poll request;

the state of a second one of said bistable storage means defines a status poll request;

the state of a third one of said bistable storage means defines a multiple poll request; and, said communications control means further including a plurality of additional bistable storage means connected to store digital indications of said device address codes in response to predetermined types of said polling requests.

31. The system of claim 30 wherein said first bistable means is switched to a ONE only when a predetermined bit of one of said address characters is set to a predetermined state and said second bistable means is switched to a ONE only when said predetermined bit is set to a state complementary to said predetermined state.

32. The system of claim 30 wherein said third bistable means is switched to its ONE state only when predetermined bit positions of another one of said address characters are set to predetermined states.

33. The system of claim 30 further including a fourth bistable means, said fourth bistable means being switched to a ONE state for defining a selection request only when a predetermined bit position of said second address character is set to a state complementary to the state of said bits for defining said poll requests.

34. The system of claim 32 wherein said predetermined states are all ZEROS.

35. A remote system connected to process different types of polling requests in the form of an initial message sequence from a central station over a communications channel, said sequence including address characters coded to identify said terminal system and at least one device, said remote terminal system comprising:
  a bus including a plurality of data and control lines;
  a plurality of peripheral devices;
  a plurality of device control means for interconnecting at least one of said devices to communicate with said bus;
  a device scanner, said device scanner including address generating means for generating address codes of said plurality of input devices and decoding means coupled to said generating means connected to detect a predetermined character code and condition said address generating means to increment to the address code of a next input device;
  a communications control means coupled to said bus and to said communications channel, said communications control means including,
  decoding means coupled to said communications line and operative to decode each of the address characters of said initial sequence, said decoding means including storage means conditioned to store the results of said decoding and information pertinent to the processing of one of said different types of polling requests,
  subcommand generating means coupled to said decoding means and being conditioned to generate control signals for processing each of said requests, and
  bus logic means coupled to said subcommand generating means and to said bus, said bus logic means being conditioned by said generating means to selectively enable said scanner decoding means to condition said address generating means to poll each of the input peripheral devices for data in accordance with a predetermined state of said storage means.

36. In the system of claim 35 wherein predetermined ones of said storage means are in predetermined states to indicate a system poll request.

37. In the system of claim 35 wherein said scanner and device control means each include logic means for switching same to an active state for processing said requests, said communication means being operative in accordance with said state of said storage means to condition said bus logic means to apply a predetermined signal to said bus for inhibiting each of said logic means from switching said scanning means and said device control means to an active state when conditioned to process a status request.

38. The system of claim 37 wherein said bus logic means includes means coupled to said bus for sampling predetermined ones of said bus lines for determining the state of said device polled.

39. In the system of claim 35 wherein said communications means further includes:
  memory means coupled to said bus and to said communications line,
  memory means, said memory means being conditioned by said subcommand generating means during processing of a first type of request to transfer data characters to said communications line from each input device in sequence in response to a complete cycling of said scanner address generating means whereafter said communications means terminates processing of said request.

40. In the system of claim 39 wherein said memory means further includes:
  a first addressable storage means including a predetermined number of character locations;
  a second addressable storage means including a predetermined number of character storage locations; and,
  memory switching means coupled to said first and second storage means, said memory switching means being operative to transfer data characters from an input device to a predetermined one of said storage means, and said memory switching means including logic means coupled to said memory means and to said bus, for sensing when the one of said storage means into which data characters are being written is full and when the other one of said storage means is available, said sensing means being operative to condition said memory switching means to switch storage means for writing data characters into said other storage means whereby said transfers between said bus and said memory storage means and said communications line and said storage means proceed simultaneously.

41. In the system of claim 40 wherein said communications means further includes state control means coupled to said decoding means; and,
  message generation means coupled to said decoding means and to said memory switching means, said message generation means being conditioned by said memory switching logic means and state control means to generate information identifying the source of blocks of data characters for each of the first blocks of each block of data characters transferred by each input device for transmission to said central station.

* * * * *

UNITED STATES PATENT OFFICE
CERTIFICATE OF CORRECTION

Patent No. 3,725,871          Dated April 3, 1973

Inventor(s) Robert E. Heuttner, Edward B. Tymann and Richard Nolin

It is certified that error appears in the above-identified patent and that said Letters Patent are hereby corrected as shown below:

Column 5, line 25, delete "modular" and insert --modulator-

Column 6, line 60, change "SIGNAL" to --signal --.

Column 8, line 40, delete "an" and insert --a--.

Column 9, line 9, before PANEL", insert --CONTROL--.

Column 9, line 49, delete "BA010" and insert --BAC10--.

Column 20, line 42, delete "ISINP10" and insert --IGINP10--.

Column 20, line 45, before "transfer", insert --bus--.

Column 20, line 45, delete "frunction" and insert --function--.

Column 22, line 14, delete --[--.

Column 22, line 16, delete --]--.

Column 32, line 22, delete "MMRBElo" and insert --MMRBE10--.

Column 38, lines 12-20, delete lines 12-20 inclusive.

UNITED STATES PATENT OFFICE
CERTIFICATE OF CORRECTION

Patent No. 3,725,871  Dated April 3, 1973

Inventor(s) Robert E. Heuttner, Edward B. Tymann and Richard Nolin

It is certified that error appears in the above-identified patent and that said Letters Patent are hereby corrected as shown below:

Column 49, line 52, after "apply", insert --the--.

Column 64, line 30, delete "signal" and insert --signals--.

Column 64, line 44, delete "identified" and insert --identifying--.

Column 65, line 4, after "I/O =" insert --1--.

Column 65, line 26, delete "initiating" and insert --initializing--.

Column 65, line 62, delete "signals" and insert --signal--.

Column 66, line 28, delete "to" and insert --as--.

Column 68, line 7, delete "signals" and insert --signal--.

Column 68, line 37, delete "devices" and insert --device--.

Column 69, line 51, before "device", insert --said--.

Signed and sealed this 15th day of January 1974.

(SEAL)
Attest:

EDWARD M. FLETCHER, JR.
Attesting Officer

RENE D. TEGTMEYER
Acting Commissioner of Patents